(12) United States Patent
Okabe et al.

(10) Patent No.: US 10,340,532 B2
(45) Date of Patent: Jul. 2, 2019

(54) SEPARATOR FOR FUEL CELL, FUEL CELL AND METHOD OF MANUFACTURING FUEL CELL

(71) Applicant: TOYOTA JIDOSHA KABUSHIKI KAISHA, Aichi-ken (JP)

(72) Inventors: Hiroki Okabe, Okazaki (JP); Hiroya Nakaji, Toyota (JP); Makoto Yoshida, Toyota (JP); Shigetaka Hamada, Aichi-gun (JP); Takuya Kurihara, Toyota (JP); Kenji Sato, Kasugai (JP); Hideaki Tanaka, Toyota (JP); Nobuhiko Nakagaki, Nagoya (JP); Junji Ueda, Okazaki (JP); Katsuhiko Kinoshita, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 318 days.

(21) Appl. No.: 15/263,528

(22) Filed: Sep. 13, 2016

(65) Prior Publication Data

US 2016/0380277 A1 Dec. 29, 2016

Related U.S. Application Data

(63) Continuation of application No. 13/822,995, filed as application No. PCT/JP2010/005666 on Sep. 16, 2010, now abandoned.

(51) Int. Cl.
*H01M 8/0265* (2016.01)
*H01M 8/0271* (2016.01)
(Continued)

(52) U.S. Cl.
CPC ......... *H01M 8/0265* (2013.01); *H01M 8/026* (2013.01); *H01M 8/0254* (2013.01);
(Continued)

(58) Field of Classification Search
None
See application file for complete search history.

(56) References Cited

U.S. PATENT DOCUMENTS

| 3,372,743 A | 3/1968 | Pall et al. |
| 3,589,942 A | 6/1971 | Leitz, Jr. et al. |

(Continued)

FOREIGN PATENT DOCUMENTS

| CN | 2676422 Y | 2/2005 |
| EP | 0978891 A2 | 2/2000 |

(Continued)

OTHER PUBLICATIONS

Otani, JP 2005-243297 Machine Translation (Year: 2005).*

(Continued)

*Primary Examiner* — Ula C Ruddock
*Assistant Examiner* — Anna Korovina
(74) *Attorney, Agent, or Firm* — Sughrue Mion, PLLC

(57) ABSTRACT

A separator for fuel cell includes a corrugated portion formed to have a corrugated cross section where a first groove that is concave to a first surface to form a flow path for a first fluid on the first surface and a second groove that is concave to a second surface opposite to the first surface to form a flow path for a second fluid on the second surface are arranged alternately and repeatedly. Each of the second grooves has at least one shallower groove section formed to have a less depth from the second surface than depth of a remaining groove section and provided to form a communication flow channel on the first surface side, which is arranged to communicate between two flow path spaces for the first fluid that are adjacent to each other across the shallower groove section.

16 Claims, 28 Drawing Sheets

(51) Int. Cl.
 H01M 8/0258 (2016.01)
 H01M 8/0254 (2016.01)
 H01M 8/026 (2016.01)
 H01M 8/0276 (2016.01)
 H01M 8/0267 (2016.01)
 H01M 8/1018 (2016.01)
 H01M 8/241 (2016.01)
 H01M 8/0286 (2016.01)

(52) U.S. Cl.
 CPC ....... *H01M 8/0258* (2013.01); *H01M 8/0267* (2013.01); *H01M 8/0271* (2013.01); *H01M 8/0276* (2013.01); *H01M 8/1018* (2013.01); *H01M 8/241* (2013.01); *H01M 8/0286* (2013.01); *H01M 2008/1095* (2013.01); *Y02P 70/56* (2015.11)

(56) References Cited

U.S. PATENT DOCUMENTS

| | | |
|---|---|---|
| 6,410,178 B1 | 6/2002 | Matsukawa |
| 8,642,226 B2 | 2/2014 | Okabe |
| 2002/0146612 A1* | 10/2002 | Sugiura .................. H01M 8/04 429/414 |
| 2002/0168562 A1 | 11/2002 | Funatsu et al. |
| 2003/0203260 A1 | 10/2003 | Lee |
| 2003/0215695 A1 | 11/2003 | Suzuki et al. |
| 2004/0028959 A1 | 2/2004 | Horiuchi et al. |
| 2004/0081873 A1* | 4/2004 | Iwai ...................... H01M 8/241 429/434 |
| 2004/0157100 A1 | 8/2004 | Mizuno |
| 2004/0161658 A1* | 8/2004 | Mizuno ............... H01M 8/0265 429/483 |
| 2006/0019137 A1 | 1/2006 | Fukuda |
| 2006/0040164 A1 | 2/2006 | Vyas et al. |
| 2006/0093735 A1 | 5/2006 | Cheng et al. |
| 2006/0105227 A1 | 5/2006 | Kim et al. |
| 2007/0104988 A1 | 5/2007 | Nishii et al. |
| 2007/0202247 A1 | 8/2007 | Peters et al. |
| 2009/0029228 A1* | 1/2009 | Shibata ................. H01M 8/026 429/402 |
| 2009/0136805 A1 | 5/2009 | Sato et al. |
| 2009/0169964 A1 | 7/2009 | Ikeda |
| 2013/0177827 A1 | 7/2013 | Okabe et al. |

FOREIGN PATENT DOCUMENTS

| | | | |
|---|---|---|---|
| JP | 7-161365 A | | 6/1995 |
| JP | 2000113897 A | | 4/2000 |
| JP | 2000164230 A | | 6/2000 |
| JP | 2002-83610 A | | 3/2002 |
| JP | 2003-338300 A | | 11/2003 |
| JP | 2004-247061 A | | 9/2004 |
| JP | 2004319279 A | | 11/2004 |
| JP | 2005122976 A | | 5/2005 |
| JP | 2005-149880 A | | 6/2005 |
| JP | 2005-522856 A | | 7/2005 |
| JP | 2005243297 A | * | 9/2005 |
| JP | 2006-54198 A | | 2/2006 |
| JP | 2006-107862 A | | 4/2006 |
| JP | 2006228501 A | | 8/2006 |
| JP | 2006-318863 A | | 11/2006 |
| JP | 2007-5235 A | | 1/2007 |
| JP | 2007-53111 A | | 3/2007 |
| JP | 2007-149358 A | | 6/2007 |
| JP | 2007165257 A | | 6/2007 |
| JP | 2008-257930 A | | 10/2008 |
| JP | 2009170286 A | | 7/2009 |
| JP | 2010073626 A | | 4/2010 |
| JP | 2010086695 A | | 4/2010 |
| WO | 2012035585 A1 | | 3/2012 |

OTHER PUBLICATIONS

Communication dated Dec. 14, 2012 from the United States Patent and Trademark Office issued in U.S. Appl. No. 13/361,671.
Communication dated Jun. 5, 2012 from the United States Patent and Trademark Office issued in U.S. Appl. No. 13/361,671.
Kobayashi, Machine translation of JP 2006228501; 23 pages total.

* cited by examiner

Ra > Rb

θA < θB

Ra < Rb $d10 < d11 < d12$ $W10 < W11 < W12$ $d21 > d22 > d23 > d24$

Fig.35
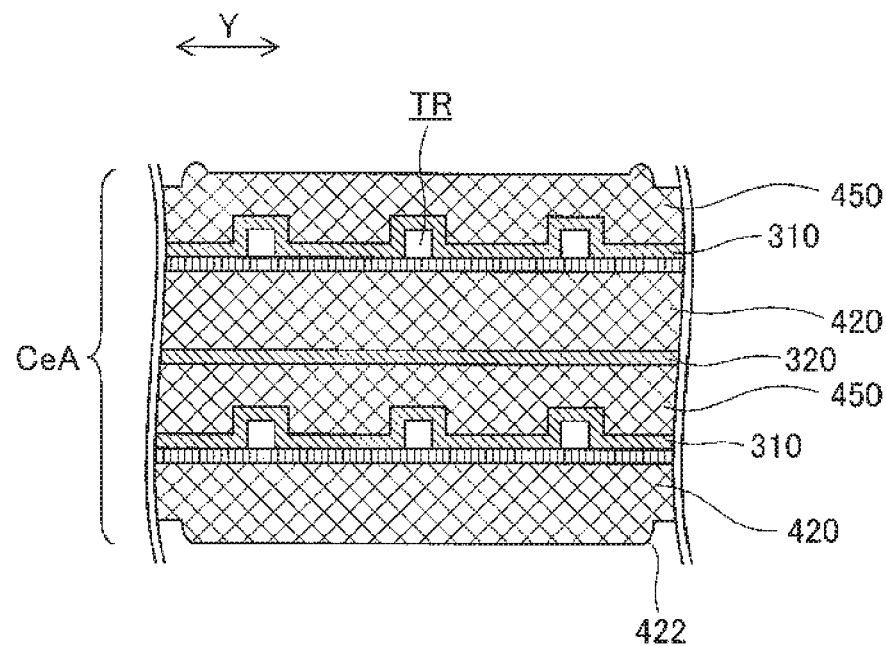
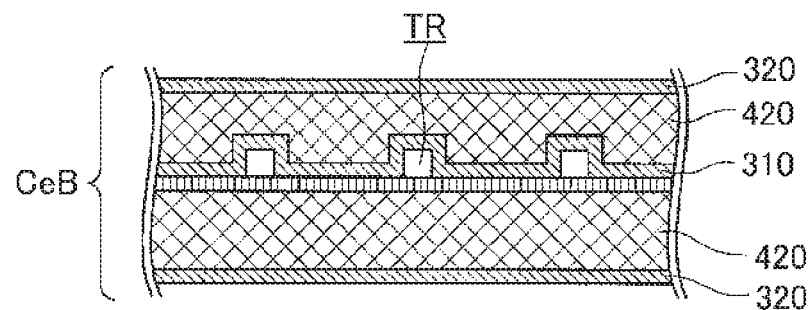

SEPARATOR FOR FUEL CELL, FUEL CELL AND METHOD OF MANUFACTURING FUEL CELL

CROSS REFERENCE TO RELATED APPLICATIONS

This is a continuation of U.S. patent application Ser. No. 13/822,995, filed Mar. 13, 2013, which is the National Stage of International Application No. PCT/JP2010/005666, filed Sep. 16, 2010. The entire disclosures of the prior applications are considered part of the disclosure of the accompanying continuation application, and are hereby incorporated by reference.

TECHNICAL FIELD

The present invention relates to a separator for fuel cell, a fuel cell, and a method of manufacturing a fuel cell.

BACKGROUND ART

A fuel cell, for example, a polymer electrolyte fuel cell, is generally used in a stacked structure where a plurality of power generation layers, each including an electrolyte membrane and a pair of electrodes (anode and cathode), are stacked via separators for separating a fuel gas and an oxidizing gas used as reactive gases from each other. Flow paths that allow fluids, such as the reactive gases and a cooling medium (e.g., coolant) to flow are formed inside of the fuel cell.

One known structure of the separator for fuel cell is manufactured by processing a plate-like member to have a corrugated cross section where first grooves that are concave to one surface and second grooves that are concave to the other surface are arranged alternately and repeatedly. In the separator of this structure, a flow path for one fluid (for example, coolant) is formed on one surface of the first groove, while a flow path for another fluid (for example, fuel gas) is formed on the other surface of the second groove. Another known structure of the separator for fuel cell has a series of rectangular projections arranged in the form of columns on the surface, where cavities between the projections are used as the flow path that allows a fluid to flow both horizontally and vertically.

SUMMARY

In the separator of the known corrugated structure described above, however, the flow direction in the flow path for one fluid formed on one surface and the flow direction in the flow path for another fluid formed on the other surface are limited to the mutually parallel directions. There is accordingly the less flexibility in arrangement of the flow paths for the fluids. The fuel cell using this separator accordingly has the limitation in arrangement of the respective manifolds and the less flexibility in thermal design in the cell plane. Addition of another separator may improve the flexibility in setting of the flow directions in the two flow paths for the two fluids. The increase in total number of parts, however, undesirably leads to weight expansion, size expansion and cost increase. In the separator of the known structure with rectangular projections, the flow path that allows a fluid to flow both horizontally and vertically is formed on the surface of the separator with these projections. On the other surface of the separator, however, the lattice-like projections are provided to prohibit formation of a flow path for a fluid. This separator alone can thus not form the flow paths for fluids on both the surfaces.

These problems are not restricted to the separator for polymer electrolyte fuel cell but are commonly found in general separators for fuel cells.

In order to solve the foregoing, the object of the invention is to provide a separator for fuel cell that allows flexible arrangement of flow paths for fluids without increasing the total number of parts.

In order to solve at least part of the above problems, the invention provides various aspects and embodiments described below.

First aspect: A separator for fuel cell, comprising: a corrugated portion formed to have a corrugated cross section where a first groove that is concave to a first surface to form a flow path for a first fluid on the first surface and a second groove that is concave to a second surface opposite to the first surface to form a flow path for a second fluid on the second surface are arranged alternately and repeatedly, wherein each of the second grooves has at least one shallower groove section formed to have a less depth from the second surface than depth of a remaining groove section and provided to form a communication flow channel on the first surface side, which is arranged to communicate between two flow path spaces for the first fluid that are adjacent to each other across the shallower groove section.

In the separator for fuel cell of this aspect, each of the second grooves has the shallower groove section formed to have the less depth from the second surface than the depth of the remaining groove section. The communication flow channel is formed on the first surface at the position of the shallower groove section to communicate between two flow path spaces for the first fluid that are adjacent to each other across the shallower groove section. This single separator for fuel cell can thus form both the flow path space for the first fluid and the flow path space for the second fluid, while enabling the flow direction of the first fluid to be set freely without being limited to the direction parallel to the flow direction of the second fluid. The separator for fuel cell thus allows the flexible arrangement of the flow paths for the fluids without increasing the total number of parts.

Second aspect: The separator according to the first aspect, wherein a combination of the first fluid and the second fluid is a combination of two out of a fuel gas, an oxidizing gas and a coolant.

The separator for fuel cell of this aspect enables formation of the flow path spaces for the combination of the first fluid and the second fluid, which is the combination of any two out of the fuel gas, the oxidizing gas and the coolant, while enabling the flow direction of the first fluid to be set freely without being limited to the direction parallel to the flow direction of the second fluid. This advantageously allows flexible arrangement of the flow paths for the first fluid and the second fluid without increasing the total number of parts.

Third aspect: The separator according to the first aspect, wherein the first fluid is a coolant.

The separator for fuel cell of this aspect enables the flow direction of the first fluid that is the coolant to be set freely without being limited to the direction parallel to the flow direction of the second fluid. This advantageously expands the possibility of thermal design of the fuel cell.

Fourth aspect: The separator according to the first aspect, the separator being formed in an approximately rectangular planar shape, wherein a first opening for defining a manifold for the first fluid and a second opening for defining a manifold for the second fluid are formed in proximity to two outer circumferential sides that are opposed to each other across the corrugated portion of the separator.

In the separator for fuel cell of this aspect, the respective manifolds are located in proximity to the two outer circumferential sides that are opposed to each other across the corrugated portion of the separator. This arrangement improves the rate of utilization of the electrodes in the fuel cell.

Fifth aspect: The separator according to the first aspect, wherein the shallower groove section included in each of the second grooves is formed at a position aligned with the shallower groove section included in another adjacent second groove, and the shallower groove section is formed to have a cross section with a larger curvature radius or a greater draft angle on a downstream side of flow of the first fluid in the communication flow channel than a curvature radius or a draft angle on an upstream side.

The separator for fuel cell of this aspect prevents stagnation of the first fluid in the flow path for the first fluid, while minimizing the reduction of the cross sectional area of the flow path for the second fluid.

Sixth aspect: The separator according to the first aspect, wherein the shallower groove section included in each of the second grooves is formed at a position aligned with the shallower groove section included in another adjacent second groove, and the shallower groove section is formed to have a cross section with a smaller curvature radius or a smaller draft angle on a downstream side of flow of the first fluid in the communication flow channel than a curvature radius or a draft angle on an upstream side.

The separator for fuel cell of this aspect interferes with the inflow of the first fluid into a portion of the flow path for the first fluid nearer to the second surface and regulates the flow of the first fluid, so as to minimize the increase of the pressure loss in the flow path.

Seventh aspect: The separator according to the third aspect, wherein the first surface of the corrugated portion is subjected to at least one of film-coating treatment to enhance corrosion resistance in a specific area of the first groove adjacent to the shallower groove section, water repellent treatment to enhance water repellency in the specific area of the first groove adjacent to the shallower groove section, and hydrophilic treatment to enhance hydrophilicity in the shallower groove section.

The separator for fuel cell of this aspect achieves at least one of the effect of enhancing the corrosion resistance in the specific area of the first groove adjacent to the shallower groove section, where the eluted substances tend to accumulate, in order to prevent corrosion, the effect of enhancing the water repellency in the specific area of the first groove adjacent to the shallower groove section, where the coolant tends to accumulate, in order to prevent accumulation of the coolant, and the effect of enhancing the hydrophilicity in the shallower groove section, which has a relatively small height and tends to have an increased of the pressure loss, in order to minimize the increase of the pressure loss.

Eighth aspect: The separator according to the first aspect, wherein each of the second grooves has a plurality of the shallower groove sections, each of the shallower groove sections included in each of the second grooves is formed at a position aligned with a shallower groove section included in another adjacent second groove, and the first surface of the corrugated portion has a wall member that is formed on a downstream side of the deeper groove section in a flow direction of the first fluid in the communication flow channel to be located on an extension of a boundary wall between the deeper groove section and the shallower groove section, and a floor member that is formed on the downstream side of the shallower groove section to be located on an extension of a floor surface of the shallower groove section.

The separator for fuel cell of this aspect prevents the first fluid passing through the communication flow channel from going around and flowing into a downstream area of the deeper groove section in the flow path for the first fluid on the downstream side and from flowing into a portion nearer to the second surface. This arrangement effectively regulates the flow of the first fluid and thereby minimizes the increase of the pressure loss in the flow path.

Ninth aspect: The separator according to the first aspect, wherein each of the second grooves has a plurality of the shallower groove sections, each of the shallower groove sections included in each of the second grooves is formed at a position aligned with a shallower groove section included in another adjacent second groove, and the first surface of the corrugated portion has a spacer located at a position in the first groove adjacent to the deeper groove section to fill a space.

The separator for fuel cell of this aspect prevents the first fluid passing through the communication flow channel from going around and flowing into a downstream area of the deeper groove section in the flow path for the first fluid on the downstream side. This arrangement effectively regulates the flow of the first fluid and thereby minimizes the increase of the pressure loss in the flow path.

Tenth aspect: The separator according to the first aspect, wherein each of the second grooves has a plurality of the shallower groove sections, which include a normal shallower groove section and a medium-depth shallower groove section having a greater depth than that of the normal shallower groove section, each of the shallower groove sections included in each of the second grooves is formed at a position aligned with a shallower groove section included in another adjacent second groove, and the medium-depth shallower groove section included in each of the second grooves is located at a position opposed to the normal shallower groove section included in the adjacent second groove.

The separator for fuel cell of this aspect prevents the first fluid passing through the communication flow channel formed at the position of the normal shallower groove section from flowing into the communication flow channel formed at the position of the medium-depth shallower groove section on the downstream side and facilitates the inflow of the first fluid into the flow path for the first fluid instead. This prevents an extreme turbulent flow of the first fluid, while preventing stagnation of the first fluid in the flow path for the first fluid.

Eleventh aspect: The separator according to the first aspect, wherein each of the second grooves has a plurality of the shallower groove sections, and a boundary wall between the deeper groove section and the shallower groove section that is adjacent to the deeper groove section on a downstream side of flow of the second fluid in the flow path for the second fluid in each of the second grooves is inclined, such that a position nearer to the second surface is located on a lower stream side of the flow of the second fluid.

The separator for fuel cell of this aspect advantageously prevents accumulation of water in the specific portion on the boundary wall. This arrangement advantageously protects the separator from corrosion.

Twelfth aspect: The separator according to the eleventh aspect, wherein the plurality of shallower groove sections included in each of the second grooves are arranged, such that the shallower groove section located on a lower stream side of the flow of the second fluid in the flow path for the second fluid has a greater depth and a greater width in a flow direction of the second fluid.

The separator for fuel cell of this aspect prevents the water accumulated in the specific portion on the boundary wall from dropping down and accumulating on another boundary wall on the downstream side in the course of moving downstream. This more effectively protects the separator from corrosion. Setting the shallower groove section located at the lower stream side to have a larger width reduces a decrease of the cross sectional area of the communication flow channel on the downstream side.

Thirteenth aspect: The separator according to the first aspect, wherein the corrugated portion includes multiple different types of shallower groove sections having different depths.

In the separator for fuel cell of this aspect, the power generation distribution and the temperature distribution of the fuel cell are equalized by adequately arranging multiple different types of shallower groove sections having different depths.

Fourteenth aspect: The separator according to the first aspect, wherein each of the second grooves has a plurality of the shallower groove sections, and a boundary wall between the deeper groove section and the shallower groove section that is adjacent to the deeper groove section on a downstream side of flow of the second fluid in the flow path for the second fluid in each of the second grooves is inclined, such that a position farther from the second surface is located on a lower stream side of the flow of the second fluid.

The separator for fuel cell of this aspect facilitates accumulation of water in the specific portion on the boundary wall. This arrangement effectively prevents the fuel cell from being dried up during high-temperature operation and minimizes the reduction of the power generation efficiency and the deterioration of the durability of the electrolyte membrane.

Fifteenth aspect: The separator according to the fourteenth aspect, wherein the second surface of the shallower groove sections in each of the second grooves is subjected to hydrophilic treatment to enhance hydrophilicity.

The separator for fuel cell of this aspect further facilitates accumulation of water in the specific portion on the boundary wall. This arrangement more effectively prevents the fuel cell from being dried up during high-temperature operation and minimizes the reduction of the power generation efficiency and the deterioration of the durability of the electrolyte membrane.

Sixteenth aspect: The separator according to the first aspect, wherein each of the second grooves has a plurality of the shallower groove sections, and a boundary wall between the deeper groove section and the shallower groove section included in each of the second grooves has a part inclined at a predetermined angle to a flow direction of the first fluid in the communication flow channel.

In the separator for fuel cell of this aspect, the flow direction of part of the first fluid in the communication flow channel formed at the position of the shallower groove section can be set to the oblique direction along the inclined part of the boundary wall between the deeper groove section and the shallower groove section. This allows the more flexible arrangement of the flow path for the first fluid.

Seventeenth aspect: The separator according to the sixteenth aspect, wherein each of the shallower groove sections included in each of the second grooves is arranged at a position shifted by a predetermined distance in a direction orthogonal to the flow direction of the first fluid in the communication flow channel, from position of the shallower groove section included in another adjacent second groove.

The separator for fuel cell of this aspect facilitates the first fluid passing through the communication flow channel to flow into the communication flow channel formed at the position of the obliquely-located shallower groove section on the downstream side. This accordingly enables the flow direction of part of the first fluid to be set to the oblique direction, thereby allowing the more flexible arrangement of the flow path for the first fluid.

Eighteenth aspect: The separator according to the first aspect, wherein each of the second grooves has a plurality of the shallower groove sections, and each of the shallower groove sections included in each of the second grooves is formed at a position shifted by a predetermined distance in a direction orthogonal to a flow direction of the first fluid in the communication flow channel, from position of the shallower groove section included in another adjacent second groove.

In the separator for fuel cell of this aspect, the first fluid passing through the communication flow channel does not directly move downstream but flows through the flow path for the first fluid into the communication flow channel formed at the position of the obliquely-located shallower groove section on the downstream side. This effectively prevents stagnation of the first fluid in the flow path for the first fluid.

Nineteenth aspect: The separator according to the first aspect, wherein each of the second grooves has a plurality of the shallower groove sections, and the deeper groove section included in the second groove has a larger diameter than diameter of the shallower groove section.

The separator for fuel cell of this aspect reduces the volume of a specific part adjacent to the deeper groove section in the flow path for the first fluid formed at the position of the first groove. This effectively prevents stagnation of the first fluid in the flow path for the first fluid. Additionally, the greater diameter of the deeper groove section that is in contact with a member opposed to the first surface in stacking advantageously reduces the load stacked per unit area on the surface of the deeper groove section. This also prevents the potential damage of the electrodes in the fuel cell as well as the inequality of the power generation distribution due to the concentration of the load.

Twentieth aspect: A fuel cell, comprising: a power generation layer including an electrolyte membrane, an anode formed on one side of the electrolyte membrane and a cathode formed on the other side of the electrolyte membrane; and the separators according to any one of the first to nineteenth aspects that are placed across the power generation layer.

The fuel cell of this aspect allows flexible arrangement of flow paths for the fluids without increasing the total number of parts included in the separator.

Twenty-first aspect: The fuel cell according to the twentieth aspect, further comprising: a detector configured to determine that a pressure loss in the flow path for the first fluid is less than a predetermined threshold value and thereby detect an abnormality in the flow path for the first fluid.

The fuel cell of this aspect enables the occurrence of an abnormality in the flow path for the first fluid, for example, the presence of contamination or air bubbles trapped in the flow path for the first fluid, to be detected by the simple configuration.

Twenty-second aspect: A method of manufacturing a fuel cell, the fuel cell comprising: a power generation layer including an electrolyte membrane, an anode formed on one side of the electrolyte membrane and a cathode formed on the other side of the electrolyte membrane; and the separators according to the third aspect that are placed across the power generation layer, the method comprising the steps of: exposing the first surface of the first groove in the separator to a coolant; and stacking the separator and the power generation layer, after the exposing step.

The method of this aspect effectively prevents accumulation of the air in the cavities on the first surface of the first groove and prevents destabilization of the temperature and the flow rate of the coolant due to accumulation of the air. This arrangement further reduces the non-uniformity of the temperature distribution of the fuel cell, thereby preventing the resulting local dry-up or local flooding and minimizing the deterioration of the durability of the electrolyte membrane.

Twenty-third aspect: A fuel cell, comprising: a plurality of power generation layers, each including an electrolyte membrane, an anode formed on one side of the electrolyte membrane and a cathode formed on the other side of the electrolyte membrane; the separator according to the first aspect that is located on an anode side of each of the power generation layers; and a second separator in a flat plate-like shape that is located on a cathode side of each of the power generation layers.

The fuel cell of this aspect causes the pressure loss in the flow path for the first fluid to be determined by only the shape of one separator, thus more readily reducing a variation in pressure loss in the flow path for the first fluid of the respective cells. The fuel cell of this aspect also causes no substantial loss of the contact area between the separators due to the positional misalignment during stacking, thus readily ensuring the sufficient contact area. Additionally, the fuel cell of this aspect reduces a variation in contact pressure applied to the power generation layer and prevents the occurrence of a clearance between the respective layer components of the power generation layer. This arrangement reduces the possibility of accumulation of water and minimizes the concentration polarization. In the fuel cell of this aspect, this arrangement also facilitates the manufacture of the separators and allows cost reduction.

Twenty-fourth aspect: The fuel cell according to the twenty-third aspect, wherein the separator is manufactured by press-forming a plate-like member, and the second separator is formed to have a less thickness than thickness of the plate-like member used for manufacturing the separator.

The fuel cell of this aspect advantageously allows thickness reduction and weight reduction of the respective cells in the fuel cell, while ensuring the good press formability.

Twenty-fifth aspect: The fuel cell according to either one of the twenty-third aspect and twenty-fourth aspect, further comprising: a seal formed to seal between the separator and the second separator opposed to the separator without intervention of the power generation layer at least at a position where the separator has concavity and convexity and arranged to adhere to the separator and to be pressed against the second separator, so as to ensure sealing.

In the fuel cell of this aspect, the effective seal line is formed by the seal even at the position where the separator has concavity and convexity.

Twenty-sixth aspect: The fuel cell according to the twenty-fifth aspect, the fuel cell being manufactured by alternately stacking a first cell including an even number of the power generation layers and a second cell including an odd number of the power generation layers, wherein the seal is provided on the first cell but is not provided on the second cell, prior to stacking of the first cell and the second cell to manufacture the fuel cell.

The fuel cell of this aspect ensures the sufficient sealing property and is manufactured by alternately stacking the first cell with the seal and the second cell without the seal. This arrangement advantageously improves the repairability of the fuel cell.

Twenty-seventh aspect: A fuel cell, comprising: a plurality of power generation layers, each including an electrolyte membrane, an anode formed on one side of the electrolyte membrane and a cathode formed on the other side of the electrolyte membrane; the separator according to the first aspect that is located on an anode side of each of the power generation layers; a second separator in a flat plate-like shape that is located on a cathode side of each of the power generation layers; a first seal formed to seal between the separator and the second separator opposed to the separator without intervention of the power generation layer; and a second seal formed to seal between the anode side and the cathode side at an edge of each of the power generation layers, wherein at least one of the separator and the power generation layer has a tunnel flow path-forming member to form a tunnel flow path that runs under a seal line formed by the first seal and communicates between a flow path space for the second fluid and a flow path space opposed to the flow path space for the second fluid across the first seal, and the tunnel flow path-forming member is located inside of the second seal along a planar direction of the power generation layer.

The fuel cell of this aspect effectively prevents the seal from entering and blocking the tunnel flow path and thereby satisfies both the requirements of the effective sealing and the sufficient flow path space for the second fluid without increasing the total number of parts.

Twenty-eighth aspect: The fuel cell according to the twenty-seventh aspect, wherein the tunnel flow path-forming member includes a third groove that is formed in the separator and is concave to the second surface, and the third groove is formed to have a less depth than depth of the deeper groove section included in the second groove.

In the fuel cell of this aspect, the seal formed to seal between the separators is located on the first surface of the third groove.

Twenty-ninth aspect: The fuel cell according to either one of the twenty-seventh aspect and the twenty-eighth aspect, wherein the tunnel flow path-forming member includes a thin-walled part that has a surface of the power generation layer opposed to the separator and recessed from surface of a remaining part of the power generation layer.

In the fuel cell of this aspect, there is no requirement of providing a part that is convex to the first surface of the separator even at the location where the tunnel flow path is formed. This advantageously minimizes the height reduction of the seal at the location of the tunnel flow path, thus ensuring the good sealing property.

Thirtieth aspect: The fuel cell according to any one of the twenty-seventh to twenty-ninth aspects, wherein the separator has a plurality of the tunnel flow path-forming members, and the plurality of the tunnel flow path-forming members are arranged, such that the tunnel flow path-forming member located at a lowermost position in a direction of gravity in use of the fuel cell is extended to a location nearest to the flow path space for the second fluid.

The fuel cell of this aspect causes the produced water to be drawn into the tunnel flow path located at the lowermost position in the direction of gravity and prevents the produced water from being drawn into the other tunnel flow paths, thereby keeping the other tunnel flow paths open. This arrangement thus facilitates drainage of the produced water and effectively prevents all the tunnel flow paths from being blocked.

The invention is achievable by any of various applications, for example, a separator for fuel cell, a fuel cell equipped with the separator for fuel cell, a method of manufacturing the fuel cell, a fuel cell system including the fuel cell and a moving body, such as an automobile, equipped with the fuel cell system.

BRIEF DESCRIPTION OF THE DRAWINGS

FIG. 35 is an explanatory diagram illustrating the structure of a fuel cell 100 according to an eighteenth embodiment.

DESCRIPTION OF EMBODIMENTS

The following describes embodiments of the present invention.

A. First Embodiment

Figure 1:
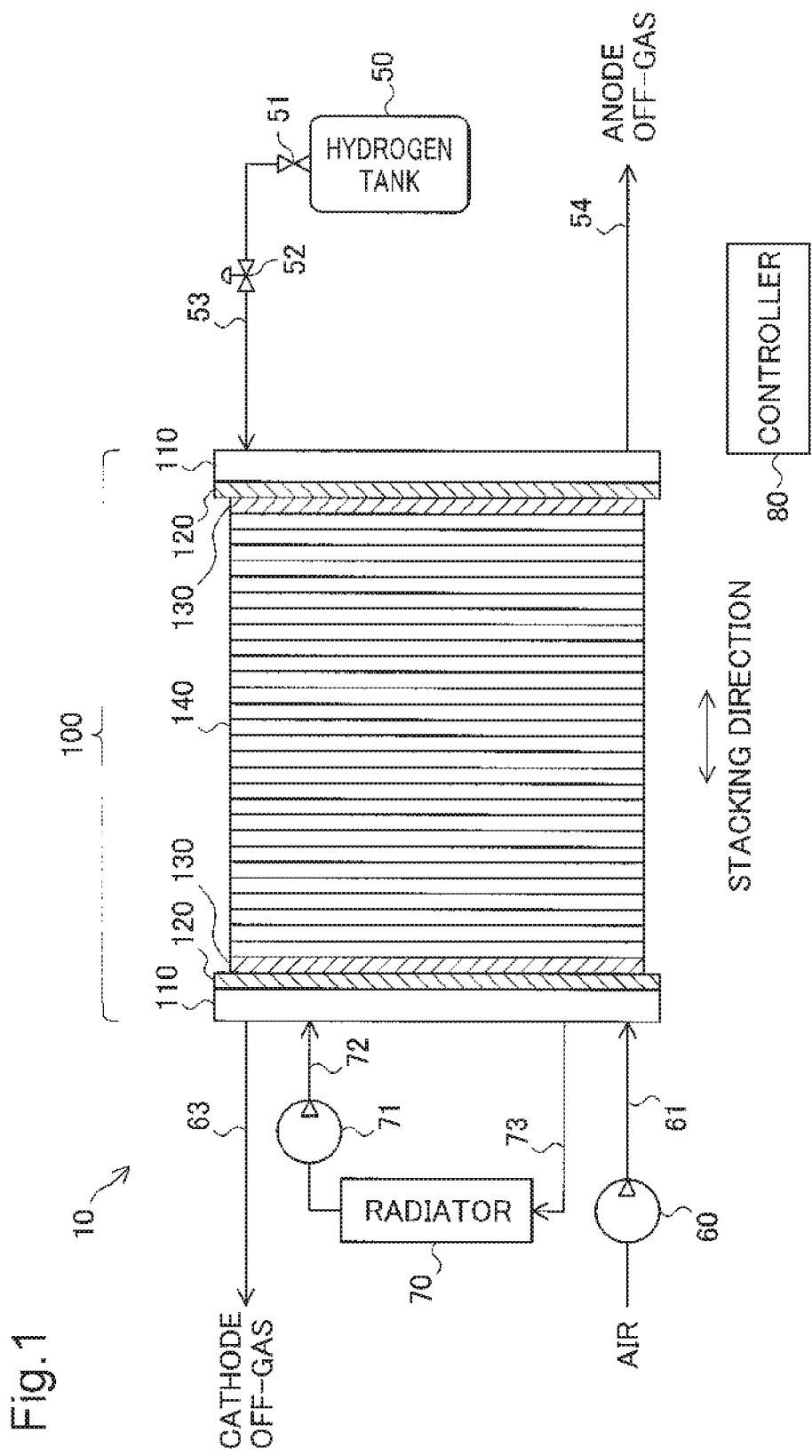
FIG. 1 s is an explanatory diagram illustrating the schematic configuration of a fuel cell system 10 according to a first embodiment of the invention.

FIG. 1 is an explanatory diagram illustrating the schematic configuration of a fuel cell system 10 according to a first embodiment of the invention. The fuel cell system 10 includes a fuel cell 100. The fuel cell 100 has a stack structure formed by stacking an end plate 110, an insulator plate 120, a collector plate 130, a plurality of unit cells 140, a collector plate 130, an insulator plate 120 and an end plate 110 in this sequence.

Hydrogen as a fuel gas is supplied from a hydrogen tank 50 for storing high-pressure hydrogen to the fuel cell 100 via a shut-off valve 51, a regulator 52, and a piping 53. The supplied hydrogen is distributed into the respective unit cells 140 via a fuel gas supply manifold (described later) and is used for power generation by the respective unit cells 140. The hydrogen that is not used by the respective unit cells 140 (anode off-gas) is collected via a fuel gas exhaust manifold (described later) and is discharged through an exhaust piping 54 out of the fuel cell 100. The fuel cell system 10 may have a recirculation mechanism to recirculate the anode off-gas to the supply piping 53.

The air as an oxidizing gas is also supplied to the fuel cell 100 via an air pump 60 and a piping 61. The supplied air is distributed into the respective unit cells 140 via an oxidizing gas supply manifold (described later) and is used for power generation by the respective unit cells 140. The air that is not used by the respective unit cells 140 (cathode off-gas) is collected via an oxidizing gas exhaust manifold (described later) and is discharged through a piping 63 out of the fuel cell 100. The fuel gas and the oxidizing gas are also called reactive gases.

Additionally, a coolant that is cooled down by a radiator 70 is supplied via a water pump 71 and a piping 72 to the fuel cell 100, in order to cool down the respective unit cells 140 of the fuel cell 100. The coolant is introduced into the respective unit cells 140 via a coolant supply manifold (described later) to cool down the respective unit cells 140. The coolant used to cool down the respective unit cells 140 is collected via a coolant discharge manifold (described later) and is circulated to the radiator 70 via a piping 73. For example, water, antifreeze such as ethylene glycol or the air may be used for the coolant. According to this embodiment, a liquid coolant (cooling liquid) is used as the coolant.

The fuel cell system 10 also includes a controller 80. The controller 80 is implemented by a computer including a CPU and memories (not shown). The controller 80 is configured to receive signals from, for example, temperature sensors, pressure sensors and voltmeters provided at various locations in the fuel cell system 10 and control the overall fuel cell system 10 based on the received signals.

Figure 2:
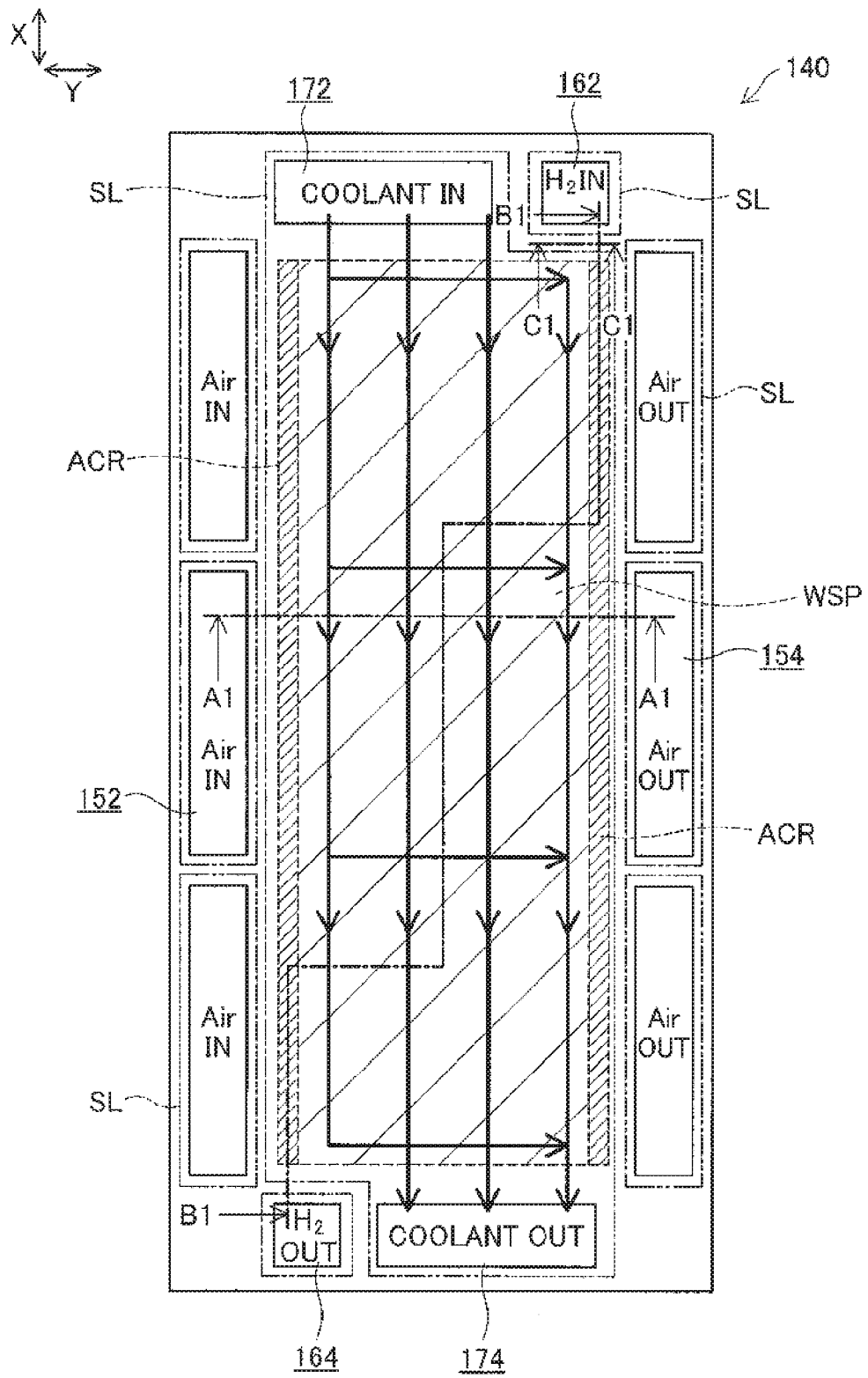
FIG. 2 is an explanatory diagram illustrating the planar structure of the fuel cell 100.
Figure 3:
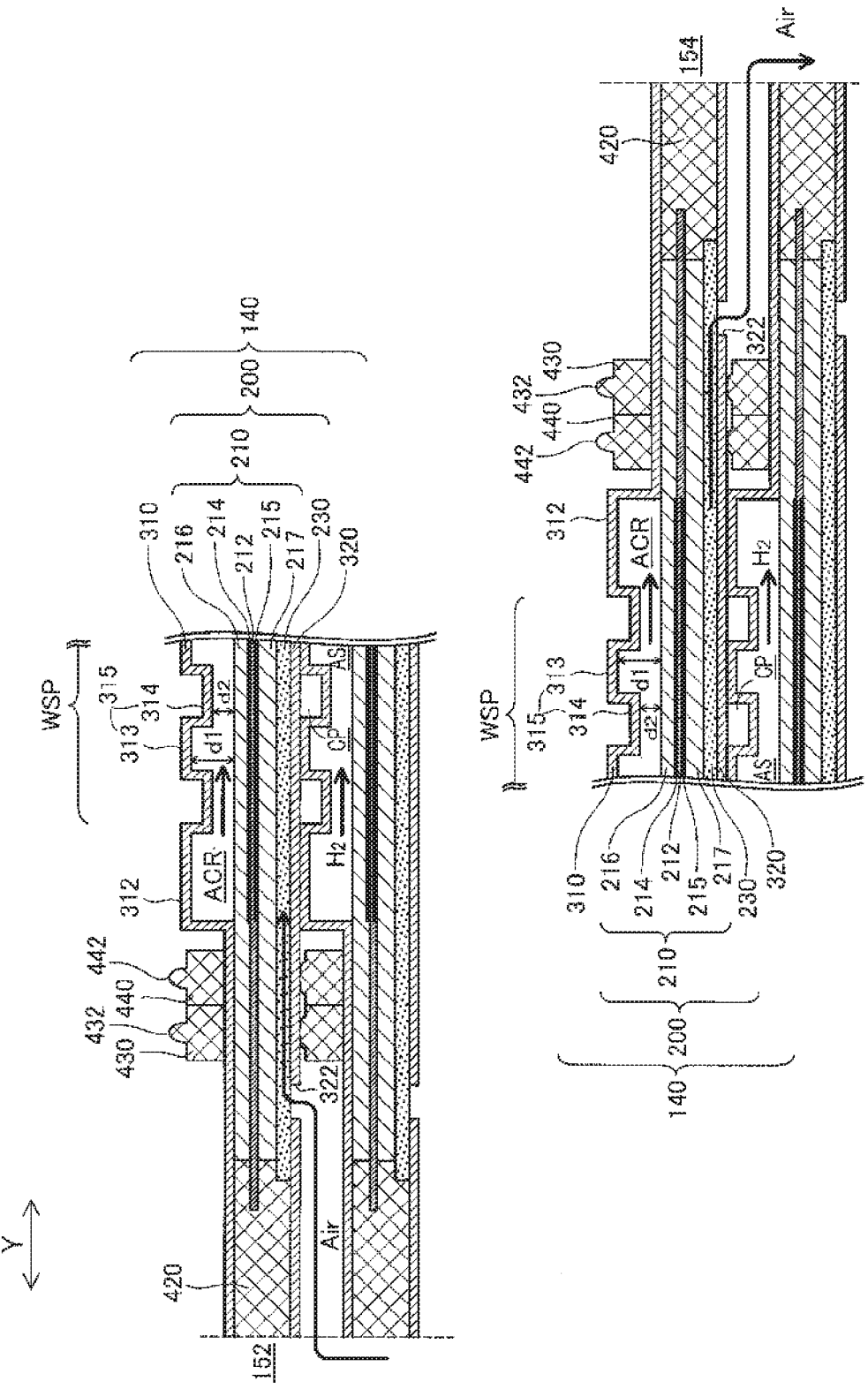
FIG. 3 is an explanatory diagram illustrating the cross sectional structure of the fuel cell 100.
Figure 4:
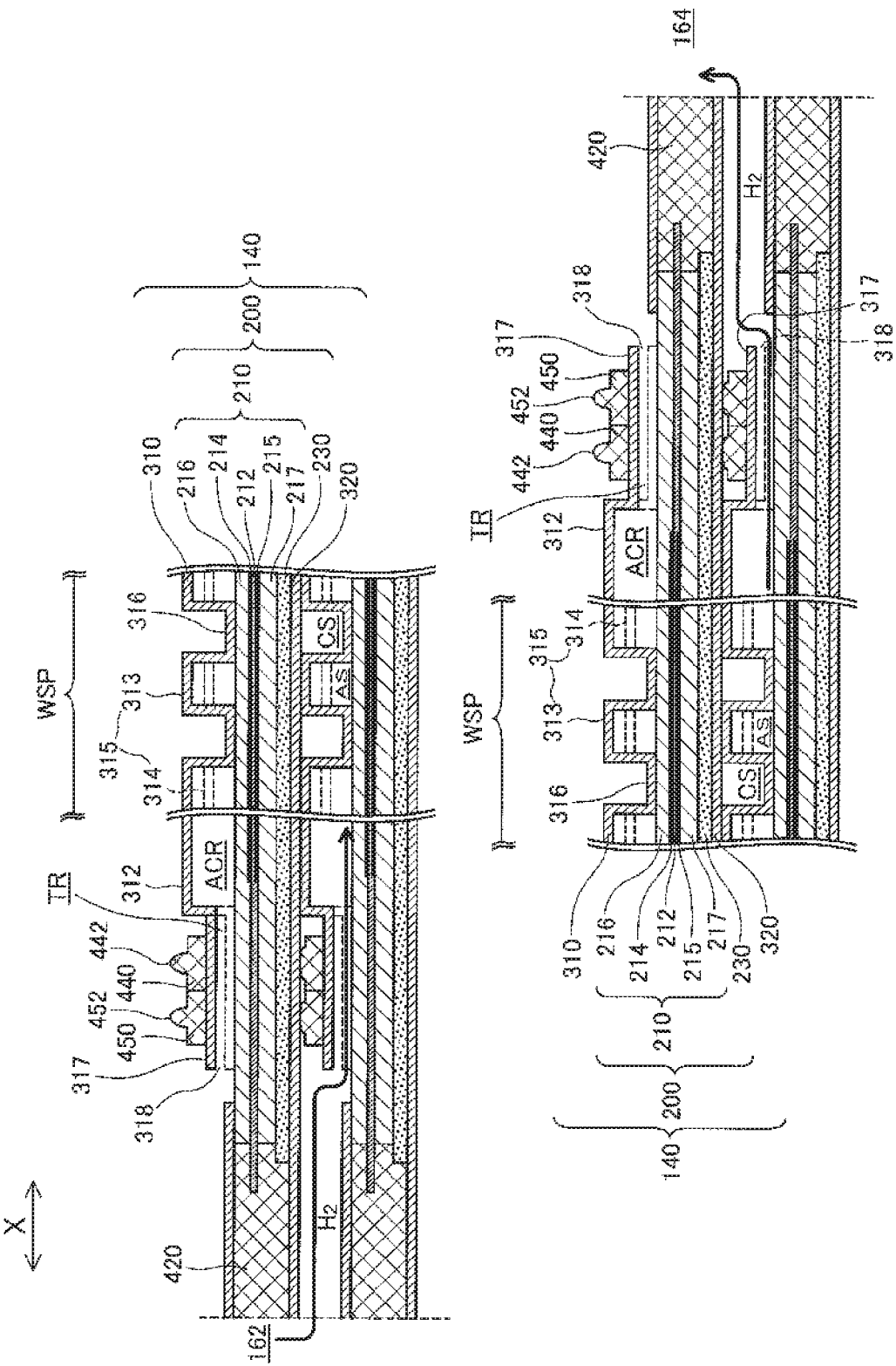
FIG. 4 is an explanatory diagram illustrating the cross sectional structure of the fuel cell 100.
Figure 5:
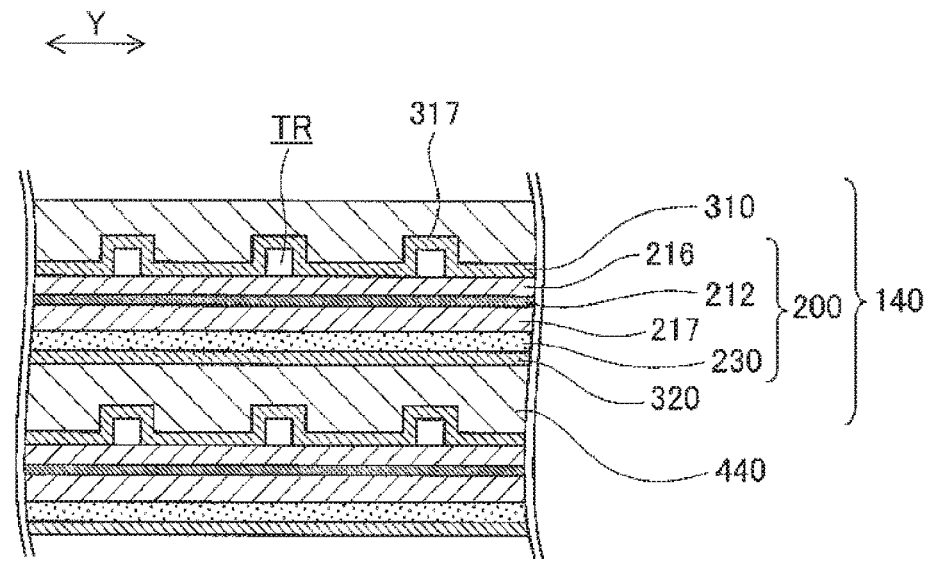
FIG. 5 is an explanatory diagram illustrating the cross sectional structure of the fuel cell 100.

FIG. 2 is an explanatory diagram illustrating the planar structure of the fuel cell 100. FIGS. 3 to 5 are explanatory diagrams illustrating the cross sectional structures of the fuel cell 100. FIG. 3 shows a partial cross section of the fuel cell 100 at a position A1-A1 in FIG. 2. FIG. 4 shows a partial cross section of the fuel cell 100 at a position B1-B1 in FIG. 2. FIG. 5 shows a partial cross section of the fuel cell 100 at a position C1-C1 in FIG. 2.

A fuel gas supply manifold 162 arranged to distribute the hydrogen as the fuel gas supplied to the fuel cell 100 into the respective unit cells 140, an oxidizing gas supply manifold 152 arranged to distribute the air as the oxidizing gas supplied to the fuel cell 100 into the respective unit cells 140, a fuel gas exhaust manifold 164 arranged to collect the fuel gas that is not used by the respective unit cells 140 and discharge the collected unused fuel gas out of the fuel cell 100, an oxidizing gas exhaust manifold 154 arranged to collect the air that is not used by the respective unit cells 140 and discharge the collected unused air out of the fuel cell 100, a coolant supply manifold 172 arranged to distribute the coolant supplied to the fuel cell 100 into the respective unit cells 140, and a coolant discharge manifold 174 arranged to collect the coolant discharged from the respective unit cells 140 and discharge the collected coolant out of the fuel cell 100 are formed inside the fuel cell 100 as shown in FIG. 2. Each of the manifolds is provided as a flow channel extended in a direction substantially parallel to the stacking direction of the fuel cell 100 (i.e., direction substantially perpendicular to the planar direction of each unit cell 140).

As shown in FIG. 2, each unit cell 140 is in an approximately rectangular planar shape, and the respective manifolds are disposed in proximity to the outer circumferential sides (i.e. outer edges) of the plane of the unit cell 140. More specifically, the fuel gas supply manifold 162 and the coolant supply manifold 172 are located adjacent to one short side out of the outer circumferential sides of the unit cell 140, while the fuel gas exhaust manifold 164 and the coolant discharge manifold 174 are located adjacent to the other short side out of the outer circumferential sides of the unit cell 140. The positional relationship between the fuel gas supply manifold 162 and the coolant supply manifold 172 in the short-side direction of the outer circumference of the unit cell 140 is opposite to the positional relationship between the fuel gas exhaust manifold 164 and the coolant discharge manifold 174. The oxidizing gas supply manifold 152 is located adjacent to substantially the whole of one long side out of the outer circumferential sides of the unit cell 140 (farther long side from the fuel gas supply manifold 162), while the oxidizing gas exhaust manifold 154 is located adjacent to substantially the whole of the other long side out of the outer circumferential sides of the unit cell 140 (nearer long side from the fuel gas supply manifold 162).

In the specification hereof, the direction of stacking the unit cells 140 in the fuel cell 100 is called "stacking direction", and the direction parallel to the primary surface of each unit cell 140 (i.e., direction substantially perpendicular to the stacking direction) is called "planar direction". In the planar direction, a direction parallel to the long sides of the unit cell 140 is called X direction, while a direction parallel to the short sides of the unit cell 140 (i.e., direction substantially perpendicular to the X direction) is called Y direction.

As shown in FIGS. 3 to 5, in each unit cell 140 of the fuel cell 100, a power generation layer 200 including a membrane electrode assembly (MEA) 210 having an anode (anode electrode layer) 214 and a cathode (cathode electrode layer) 215 formed on the respective surfaces of an electrolyte membrane 212 is located between a pair of separators (a cathode-side separator 320 and an anode-side separator 310). The membrane electrode assembly 210 further includes an anode diffusion layer 216 formed outside of the anode 214 and a cathode diffusion layer 217 formed outside of the cathode 215. The power generation layer 200 additionally has a cathode-side porous flow path layer 230 arranged outside of the cathode diffusion layer 217 of the membrane electrode assembly 210.

The electrolyte membrane 212 is a solid polymer membrane made of a fluororesin material or a hydrocarbon resin material and has good proton conductivity in the wet state. The cathode 215 and the anode 214 may contain, for example, platinum or an alloy of platinum and another metal as the catalyst. The cathode diffusion layer 217 and the anode diffusion layer 216 may be made of, for example, carbon cloth woven of carbon fiber yarns, carbon paper or carbon felt. The cathode-side porous flow path layer 230 is made of a porous material having gas diffusivity and electrical conductivity, such as a metal porous body (e.g., expanded metal) or a carbon porous body. The cathode-side porous flow path layer 230 has the higher porosity than that of the cathode diffusion layer 217 and thereby the lower internal gas flow resistance, so as to serve as an oxidizing gas flow path, which allows the flow of the oxidizing gas.

The cathode-side separator 320 and the anode-side separator 310 are manufactured from metal plates. More specifically, the cathode-side separator 320 is manufactured by drilling a metal plate to form, for example, openings for the respective manifolds. As shown in FIGS. 3 to 5, the cathode-side separator 320 has a flat plate-like shape. The anode-side separator 310 is manufactured, on the other hand, by drilling a metal plate to form, for example, openings for the respective manifolds and bending and press-forming the metal plate to form a portion of a corrugated cross section. As shown in FIGS. 3 and 4, the anode-side separator 310 has a corrugated portion WSP of a corrugated cross section. The position of the corrugated portion WSP of the anode-side separator 310 in the plane of the unit cell 140 is shown by hatching in FIG. 2.

Figure 6:
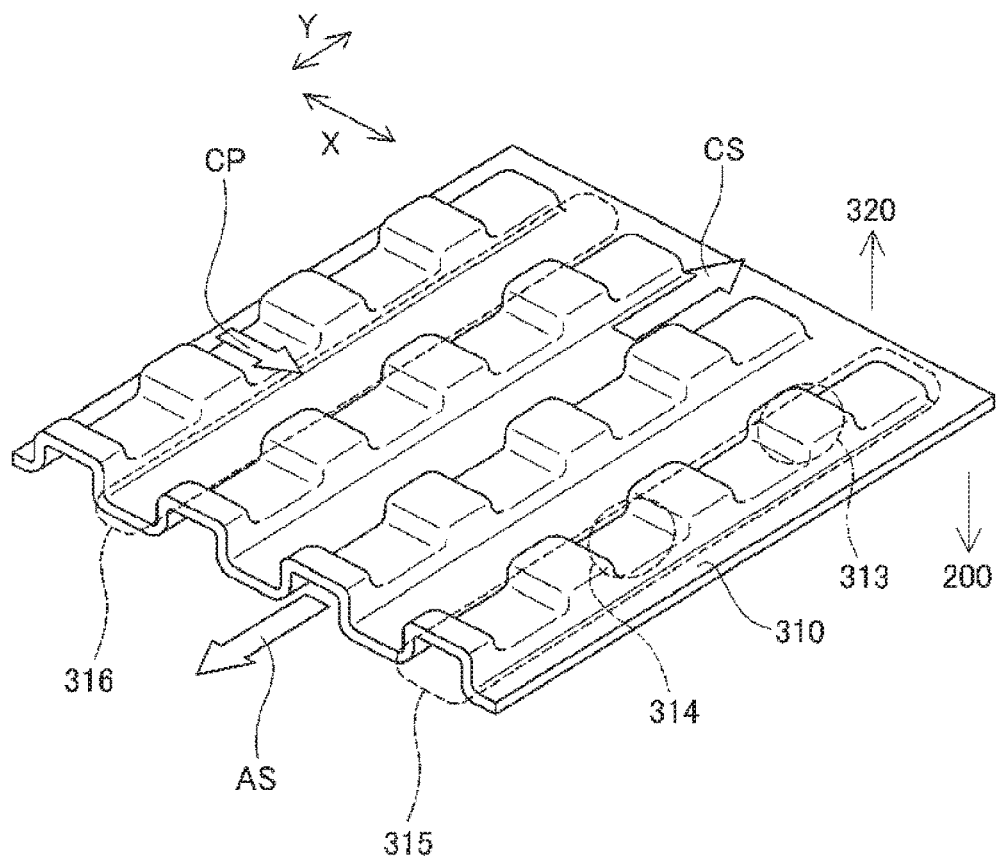
FIG. 6 is a perspective view illustrating the structure of the corrugated portion WSP of the anode-side separator 310.

FIG. 6 is a perspective view illustrating the structure of the corrugated portion WSP of the anode-side separator 310. In FIG. 6, the upper side is a side opposed to the cathode-side separator 320 of another adjacent unit cell 140, while the lower side is a side opposed to the power generation layer 200. As shown in FIG. 6 and FIG. 4, the corrugated portion WSP of the anode-side separator 310 has a corrugated cross section including first grooves 316 concave to the surface opposed to the cathode-side separator 320 (hereinafter referred to as "first surface") and second grooves 315 concave to the surface opposed to the power generation layer 200 (hereinafter referred to as "second surface"), which are arranged alternately and repeatedly in the X direction. Each of the first grooves 316 and each of the second grooves 315 respectively have planar shapes extended in the Y direction.

As shown in FIG. 6 and FIG. 4, the corrugated portion WSP of the anode-side separator 310 defines flow path spaces CS for the coolant on the first surface (surface opposed to the cathode-side separator 320) of the first grooves 316. The flow path spaces CS for the coolant are the spaces bounded by the first grooves 316 of the corrugated portion WSP of the anode-side separator 310 and the surface of the cathode-side separator 320. The corrugated portion WSP of the anode-side separator 310 also defines flow path spaces AS for the fuel gas on the second surface (surface opposed to the power generation layer 200) of the second grooves 315. The flow path spaces AS for the fuel gas are the spaces bounded by the second grooves 315 of the corrugated portion WSP of the anode-side separator 310 and the surface of the power generation layer 200. The first grooves 316 and the second grooves 315 are extended in the Y direction, so that the flow path spaces CS for the coolant and the flow path spaces AS for the fuel gas are defined as the spaces extended in the Y direction.

As shown in FIG. 6 and FIGS. 3 and 4, each of the second grooves 315 of the corrugated portion WSP of the anode-side separator 310 has shallower groove sections 314. The shallower groove sections 314 are short-depth portions having a shorter depth d2 from the second surface (surface opposed to the power generation layer 200) than a depth d1 of the other portions (hereinafter called "deeper groove sections 313). The depth of the second groove 315 (deeper groove section 313 and shallower groove section 314) means the distance in the stacking direction from the position of the outermost part on the second surface of the anode-side separator 310 (i.e., part that is in contact with the power generation layer 200) to the position of the outermost part on the first surface of the second groove 315 (i.e., part of the second groove 315 that is substantially perpendicular to the stacking direction). The flow path space AS for the fuel gas formed on the second surface of the second groove 315 accordingly has the greater depth at the positions of the deeper groove sections 313 and the less depth at the positions of the shallower groove sections 314. In the fuel cell 100 formed by stacking a plurality of the unit cells 140, the anode-side separator 310 is in contact with the surface of the cathode-side separator 320 at the positions of the respective deeper groove sections 313, while being not in contact at the positions of the respective shallower groove sections 314. Communication flow channels CP that cause two flow path spaces CS for the coolant adjoining to each other across the shallower groove sections 314 to be communicated with each other are accordingly formed between the surface of the cathode-side separator 320 and the first surface of the corrugated portion WSP of the anode-side separator 310 at the positions of the shallower groove sections 314. As shown in FIG. 6, according to this embodiment, a plurality of shallower groove sections 314 are formed in each of the second grooves 315. The shallower groove sections 314 of each second groove 315 are aligned with the corresponding shallower groove sections 314 of another second groove 315 adjacent in the X direction.

As shown in FIG. 6 and FIG. 4, on the other hand, each of the first grooves 316 of the anode-side separator 310 has a fixed depth from the first surface (surface opposed to the cathode-side separator 320). The depth of the first groove 316 means the distance in the stacking direction from the position of the outermost part on the first surface of the corrugated portion WSP of the anode-side separator 310 (i.e., part that is in contact with the cathode-side separator 320) to the position of the outermost part on the second surface of the first groove 316 (i.e., part of the first groove 316 that is substantially perpendicular to the stacking direction). The flow path space CS for the coolant formed on the first surface of the first groove 316 accordingly has a fixed depth. In the fuel cell 100 formed by stacking a plurality of the unit cells 140, the anode-side separator 310 is in contact with the surface of the power generation layer 200 at the positions of the whole surfaces of the respective first grooves 316.

As shown in FIG. 3, the anode-side separator 310 has fourth grooves 312, which are concave to the first surface, at positions adjoining to both ends of the corrugated portion WSP in the Y direction. The fourth groove 312 is formed continuously in the X direction to be adjacent to the whole length of the corrugated portion WSP as shown in FIG. 4. The depth of the fourth groove 312 is equal to the depth of the deeper groove sections 313 of the second groove 315. In the fuel cell 100 formed by stacking a plurality of the unit cells 140, the anode-side separator 310 is thus additionally in contact with the surface of the cathode-side separator 320 at the positions of the fourth grooves 312. The fourth groove 312 forms a common rail ACR for the fuel gas working as a continuous flow path space, which allows the flow of the fuel gas in the X direction, on the second surface (surface opposed to the power generation layer 200). The positions of the common rails ACR for the fuel gas in the plane of the unit cell 140 are shown by hatching in FIG. 2. As shown in FIG. 3, the common rail ACR for the fuel gas communicates with the flow path spaces AS for the fuel gas formed by the respective second grooves 315 of the corrugated portion WSP.

As shown in FIGS. 3 and 4, a seal (gasket) 420 is formed along the outer periphery of the power generation layer 200 of each unit cell 140 to prevent cross leakage between the cathode side and the anode side. The seal 420 may be formed by injection molding a sealing material, for example, silicon rubber, butyl rubber, or fluorine rubber.

Various seals (gaskets) to form seal lines SL surrounding the respective manifolds and a seal line SL surrounding the flow area of the coolant shown in FIG. 2 are provided on the surface of the anode-side separator 310 opposed to the cathode-side separator 320. More specifically, as shown in FIG. 3, the anode-side separator 310 has seals 430 (FIG. 3) for forming seal lines SL surrounding the oxidizing gas supply manifold 152 and the oxidizing gas exhaust manifold 154, seals 450 (FIG. 4) for forming seal lines SL surrounding the fuel gas supply manifold 162 and the fuel gas exhaust manifold 164, and a seal 440 (FIGS. 3 and 4) for forming a seal line SL surrounding the flow area of the coolant between the anode-side separator 310 and the cathode-side separator 320. The respective seals have lips of convex cross sections (432, 442 and 452). When the respective unit cells 140 are stacked, the individual lips are compressed and deformed by the opposed cathode-side separator 320 to tightly adhere to the surface of the cathode-side separator 320 and thereby form the seal lines SL.

As shown in FIGS. 4 and 5, third grooves 317 that are concave to the second surface (surface opposed to the power generation layer 200) are formed in proximity to the fuel gas supply manifold 162 and the fuel gas exhaust manifold 164 of the anode-side separator 310. The depth of the third grooves 317 is less than the depth of the fourth grooves 312 and the depth of the deeper groove sections 313 of the second grooves 315. The depth of the third groove 317 means the distance in the stacking direction from the position of the outermost part on the second surface of the anode-side separator 310 (i.e., part that is in contact with the power generation layer 200) to the position of the outermost part on the first surface of the third groove 317 (i.e., part of the third groove 317 that is substantially perpendicular to the stacking direction). The third groove 317 has one end continuous with the fourth groove 312 that forms the common rail ACR for the fuel gas and the other end having an opening 318 formed therein.

The third groove 317 thus structured forms a tunnel flow path TR that runs below the seal lines SL formed by the seals 440 and 450 (on the side of the power generation layer 200) to communicate between the common rail ACR for the fuel gas connecting with the flow path space AS for the fuel gas and the fuel gas supply manifold 162 and between the common rail ACR for the fuel gas and the fuel gas exhaust manifold 164. The third groove 317 for forming the tunnel flow path TR is entirely located inside of the seal 420 in the planar direction, which is formed along the outer periphery of the power generation layer 200. The tunnel flow path TR is thus not at all opposed to the seal 420 but is entirely opposed to the anode diffusion layer 216 of the power generation layer 200. According to the embodiment, the third grooves 317 form a plurality of tunnel flow paths TR extended in the X direction and arranged in the Y direction.

As indicated by the arrows in FIGS. 3 and 4, hydrogen as the fuel gas supplied to the fuel gas supply manifold 162 flows in from the opening 318 and runs through the tunnel flow path TR on the upstream side (on the supply side), is introduced into the common rail ACR for the fuel gas on the upstream side to be diffused in the X direction through the common rail ACR for the fuel gas and enters the flow path spaces AS for the fuel gas communicating with the common rail ACR for the fuel gas to flow through the flow path spaces AS for the fuel gas in the Y direction. This flow of hydrogen is used for power generation by the membrane electrode assembly 210. The hydrogen that is not used for power generation flows from the flow path space AS for the fuel gas into the common rail ACR for the fuel gas on the downstream side (on the exhaust side), runs through the common rail ACR for the fuel gas to reach the tunnel flow path TR on the downstream side and is discharged from the opening 318 of the tunnel flow path TR to the fuel gas exhaust manifold 164.

As indicated by the arrows in FIG. 3, on the other hand, the air as the oxidizing gas supplied to the oxidizing gas supply manifold 152 flows from an opening 322 on the upstream side (on the supply side), which is formed in the cathode-side separator 320 at a position opposed to the power generation layer 200, to enter the cathode-side porous flow path layer 230 and is diffusively flowed in the cathode-side porous flow path layer 230. This flow of the air is used for power generation by the membrane electrode assembly 210. The air that is not used for power generation is discharged from an opening 322 on the downstream side (exhaust side), which is formed in the cathode-side separator 320 at a position opposed to the power generation layer 200, to the oxidizing gas exhaust manifold 154.

As indicated by the arrows in FIG. 2, the coolant supplied to the coolant supply manifold 172 flows both horizontally and vertically throughout the flow path spaces CS for the coolant and the communication flow channels CP (FIGS. 3, 4 and 6) formed on the first surface of the anode-side separator 310 (surface opposed to the cathode-side separator 320) to cool down the unit cell 140 and is discharged to the coolant discharge manifold 174.

As described above, according to this embodiment, the anode-side separator 310 has the corrugated portion WSP of the corrugated cross section where the first grooves 316 that are concave to the first surface and the second grooves 315 that are concave to the second surface are arranged alternately and repeatedly. The flow path spaces CS for the coolant are formed on the first surface of the first grooves 316, while the flow path spaces AS for the fuel gas are formed on the second surface of the second grooves 315. Each of the second grooves 315 has the shallower groove sections 314 having the less depth from the second surface than the depth of the other sections (deeper groove sections 313). The communication flow channels CP that cause two flow path spaces CS for the coolant adjoining to each other across the shallower groove sections 314 to be communicated with each other are formed on the first surface at the positions of the shallower groove sections 314. The configuration of the embodiment can thus form both the flow path spaces CS for the coolant and the flow path spaces AS for the fuel gas by using only one single part, i.e., the anode-side separator 310. The configuration of the embodiment forms the flow path spaces CS for the coolant and the communication flow channels CP and thereby enables the flow direction of the coolant to be set freely without being limited to the direction parallel to the flow direction of the fuel gas. This allows the flexible arrangement of the flow paths for the fluids without increasing the total number of parts. For example, using the anode-side separator 310 of the embodiment increase the flexibility of location of the respective manifolds and expands the possibility of thermal design inside the respective unit cells 140, while enabling weight reduction, size reduction and cost reduction of the fuel cell 100.

In the fuel cell 100 of the embodiment, the anode-side separator 310 has the corrugated portion WSP of the corrugated cross section, while the cathode-side separator 320 has a flat plate-like shape. The fuel cell 100 of the embodiment accordingly has the following advantages over the fuel cell with the cathode-side separator 320 that is also formed to have a corrugated portion WSP of the corrugated cross section. The structure of the fuel cell 100 according to the embodiment causes the pressure loss in the flow path for the coolant to be determined by only the shape of the anode-side separator 310, thus more readily reducing a variation in pressure loss in the flow path for the coolant of the respective unit cells 140. The structure of the fuel cell 100 according to the embodiment also causes no substantial loss of the contact area between the separators due to the positional misalignment during stacking, thus readily ensuring the sufficient contact area. Additionally, the structure of the fuel cell 100 according to the embodiment reduces a variation in contact pressure applied to the membrane electrode assemblies 210 and prevents the occurrence of a clearance between the diffusion layer and the catalyst layer, thereby reducing the possibility of accumulation of water and minimizing the concentration polarization. The structure of the fuel cell 100 according to the embodiment also facilitates manufacture of the separators and enables cost reduction.

In the fuel cell 100 of this embodiment, it is preferable that the thickness of the metal plate used for manufacturing the cathode-side separator 320 is less than the thickness of the metal plate used for manufacturing the anode-side separator 310. The anode-side separator 310 is manufactured by press-forming, so that the limitation of thickness reduction depends on the press formability. It is accordingly impossible to reduce the thickness of the metal plate to the limit value based on the required strength. The cathode-side separator 320, on the other hand, has a flat plate-like shape, so that a thinner metal plate is usable for the cathode-side separator 320. Setting the thickness of the metal plate used for manufacturing the cathode-side separator 320 to be less than the thickness of the metal plate used for manufacturing the anode-side separator 310 enables thickness reduction and weight reduction of each unit cell 140, while ensuring good press formability.

According to the embodiment, the third groove 317 for forming the tunnel flow path TR is entirely located inside of the seal 420 in the planar direction, which is formed along the outer periphery of the power generation layer 200. This arrangement effectively prevents the seal 420 from entering and blocking the tunnel flow path TR and thereby satisfies both the requirements of the effective sealing and the sufficient flow path space for the reactive gas without increasing the total number of parts. According to the embodiment, the depth of the third groove 317 for forming the tunnel flow path TR is less than the depth of the deeper groove sections 313 of the second groove 315. This arrangement enables the seal 440 between the anode-side separator 310 and the cathode-side separator 320 for surrounding the flow area of the coolant to be located on the side of the cathode-side separator 320 of the third groove 317.

In the fuel cell 100 of the embodiment, the flow direction of the fuel gas is reverse to the flow direction of the oxidizing gas in the area of each unit cell 140 opposed to the corrugated portion WSP. This counter flow arrangement causes water (moisture) produced by the electrochemical reaction on the cathode side to move from a downstream area in the flow direction of the oxidizing gas on the cathode side to an upstream area in the flow direction of the fuel gas on the anode side and further move with the flow of the fuel gas through the anode side, so as to prevent the whole fuel cell 100 from being dried and thereby reduce degradation of the power generation performance. In the fuel cell 100 of the embodiment, the flow path for the oxidizing gas is provided by the cathode-side porous flow path layer 230 having the greater pressure loss than the pressure loss of the flow path space AS for the fuel gas formed by the second groove 315. The flow direction of the oxidizing gas is, however, along the short-side direction of the unit cell 140 and thereby ensures good gas distribution in the planar direction of the unit cell 140.

In assembly of each of the unit cells 140 in the fuel cell 100 of the embodiment (including reassembly after disassembly), the coolant is injected on the first surface of the first grooves 316 of the anode-side separator 310 (surface opposed to the cathode-side separator 320) with, for example, a dropper or a syringe, before the anode-side separator 310 and the power generation layer 200 are stacked. During stacking, care should be taken to prevent the injected coolant from being flowed out. This arrangement thus effectively prevents accumulation of the air in the cavities on the first surface of the first groove 316 and prevents destabilization of the temperature and the flow rate of the coolant due to accumulation of the air in the manufactured fuel cell 100. This arrangement further reduces the non-uniformity of the temperature distribution of the fuel cell 100, thereby preventing the resulting local dry-up or local flooding and minimizing the deterioration of the durability of the electrolyte membrane 212. Any step of exposing the first surface of the first grooves 316 to the coolant may be performed, prior to the stacking step. For example, the anode-side separator 310 may be entirely soaked in the coolant placed in a vessel.

B. Second Embodiment

Figure 7:
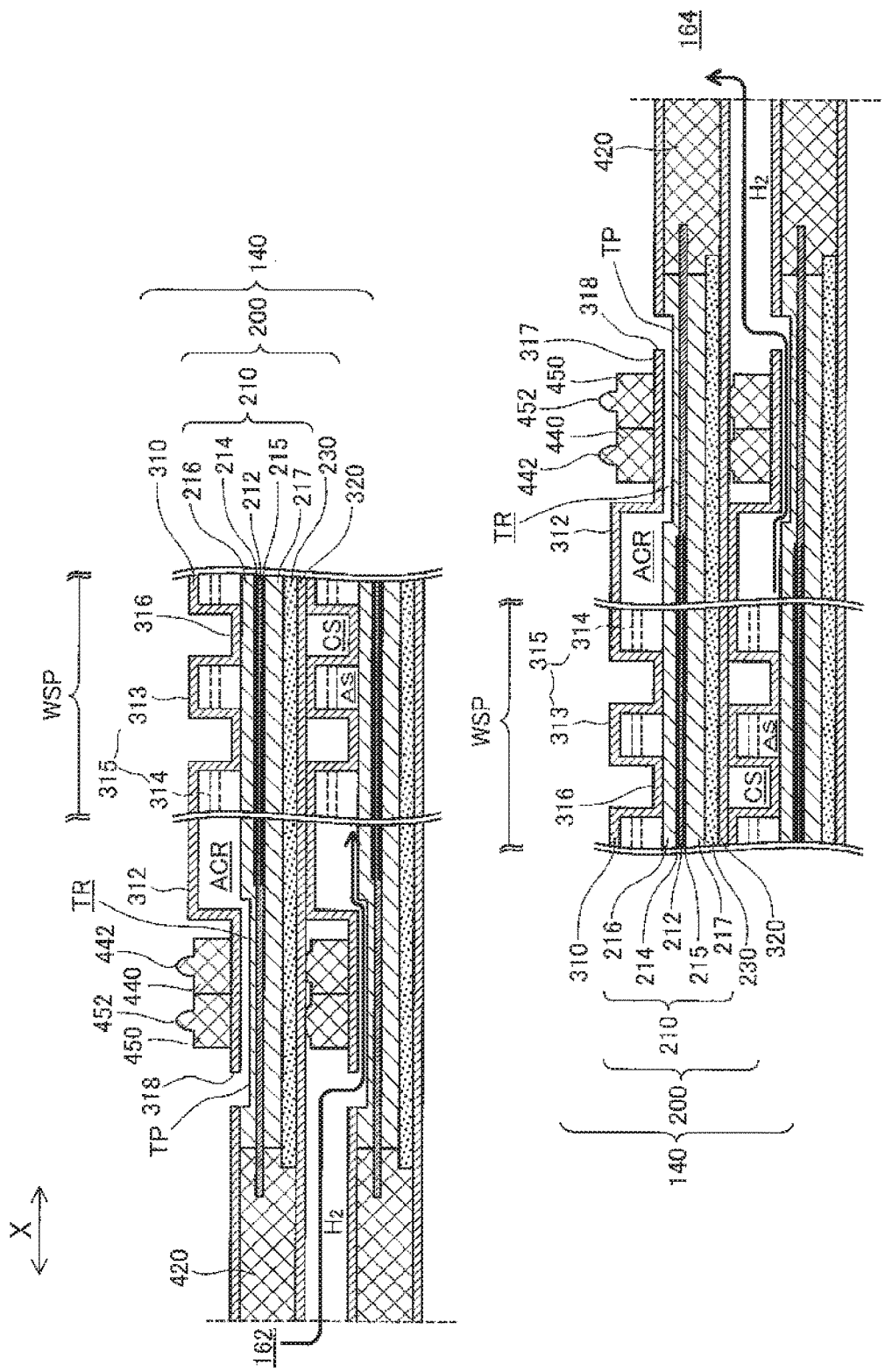
FIG. 7 is an explanatory diagram illustrating the cross sectional structure of a fuel cell 100 according to a second embodiment.

FIG. 7 is an explanatory diagram illustrating the cross sectional structure of a fuel cell 100 according to a second embodiment. FIG. 7 shows a partial cross section of the fuel cell 100 at the position of B1-B1 in FIG. 2. The fuel cell 100 of the seventh embodiment differs in the arrangement of tunnel flow paths TR from the fuel cell 100 of the first embodiment (FIG. 4), but otherwise has the similar structure to that of the fuel cell 100 of the first embodiment. The tunnel flow path TR is a flow path that runs below the seal lines SL formed by the seals 440 and 450 (on the side of the power generation layer 200). Like the first embodiment, the tunnel flow path TR of the second embodiment is provided as a flow path that communicates between the fuel gas supply manifold 162 and the common rail ACR for the fuel gas and between the fuel gas exhaust manifold 164 and the common rail ACR for the fuel gas.

In the fuel cell 100 of the first embodiment, the tunnel flow path TR is formed by providing the third groove 317 in the anode-side separator 310 as shown in FIG. 4. In the fuel cell 100 of the second embodiment, on the other hand, the tunnel flow path TR is formed by providing a thin-walled part TP in the anode diffusion layer 216, which has the surface on the side opposed to the anode-side separator 310 recessed from the surface of the other part as shown in FIG. 7. The thin-walled part TP may be formed by partly cutting or compressing the anode diffusion layer 216. The thin-walled part TP is formed continuously in the X direction from the position opposed to the common rail ACR for the fuel gas through the downside of the seals 440 and 450 to the position outside of the seals 440 and 450 (on the side near to the fuel gas supply manifold 162) and communicates with the opening 318 formed in the anode-side separator 310 at this outside position. Like the first embodiment shown in FIG. 5, a plurality of tunnel flow paths TR are arranged in the Y direction.

In the fuel cell 100 of the second embodiment, as indicated by the arrows in FIG. 7, hydrogen as the fuel gas supplied to the fuel gas supply manifold 162 flows in from the opening 318 and runs through the tunnel flow path TR on the upstream side (on the supply side), is introduced into the common rail ACR for the fuel gas on the upstream side to be diffused in the X direction through the common rail ACR for the fuel gas and enters the flow path spaces AS for the fuel gas communicating with the common rail ACR for the fuel gas to flow through the flow path spaces AS for the fuel gas in the Y direction. This flow of hydrogen is used for power generation by the membrane electrode assembly 210. The hydrogen that is not used for power generation flows from the flow path space AS for the fuel gas into the common rail ACR for the fuel gas on the downstream side (on the exhaust side), runs through the common rail ACR for the fuel gas to reach the tunnel flow path TR on the downstream side and is discharged from the opening 318 of the tunnel flow path TR to the fuel gas exhaust manifold 164.

As described above, in the fuel cell 100 of the second embodiment, the tunnel flow path TR is formed by providing the thin-walled part TP in the anode diffusion layer 216. There is accordingly no requirement of providing a part that is convex to the first surface of the anode-side separator 310 (surface opposed to the cathode-side separator 320) even at the location where the tunnel flow path TR is formed. This minimizes the height reduction of the seals 440 and 450 at the location of the tunnel flow path TR, thus ensuring the good sealing property. In the fuel cell 100 of the second embodiment, like the first embodiment, this arrangement effectively prevents the seal 420 from entering and blocking the tunnel flow path TR and thereby satisfies both the requirements of the effective sealing and the sufficient flow path space for the reactive gas without increasing the total number of parts.

The tunnel flow path TR may be formed by providing the third groove 317 in the anode-side separator 310 like the fuel cell 100 of the first embodiment (FIG. 4) and additionally providing the thin-walled part TP in the anode diffusion layer 216 to be opposed to the third groove 317. Such modification ensures the sufficient height of the tunnel flow path TR, while adequately controlling both the depth of the third groove 317 and the thickness reduction of the thin-walled part TP of the anode diffusion layer 216 (i.e., difference in thickness from the other part). This arrangement accordingly satisfies both the requirement of minimizing the increase of the overall thickness of the anode diffusion layer 216 and the reduction of the strength of the anode diffusion layer 216 and the requirement of minimizing the height reduction of the seals 440 and 450.

C. Third Embodiment

Figure 8:
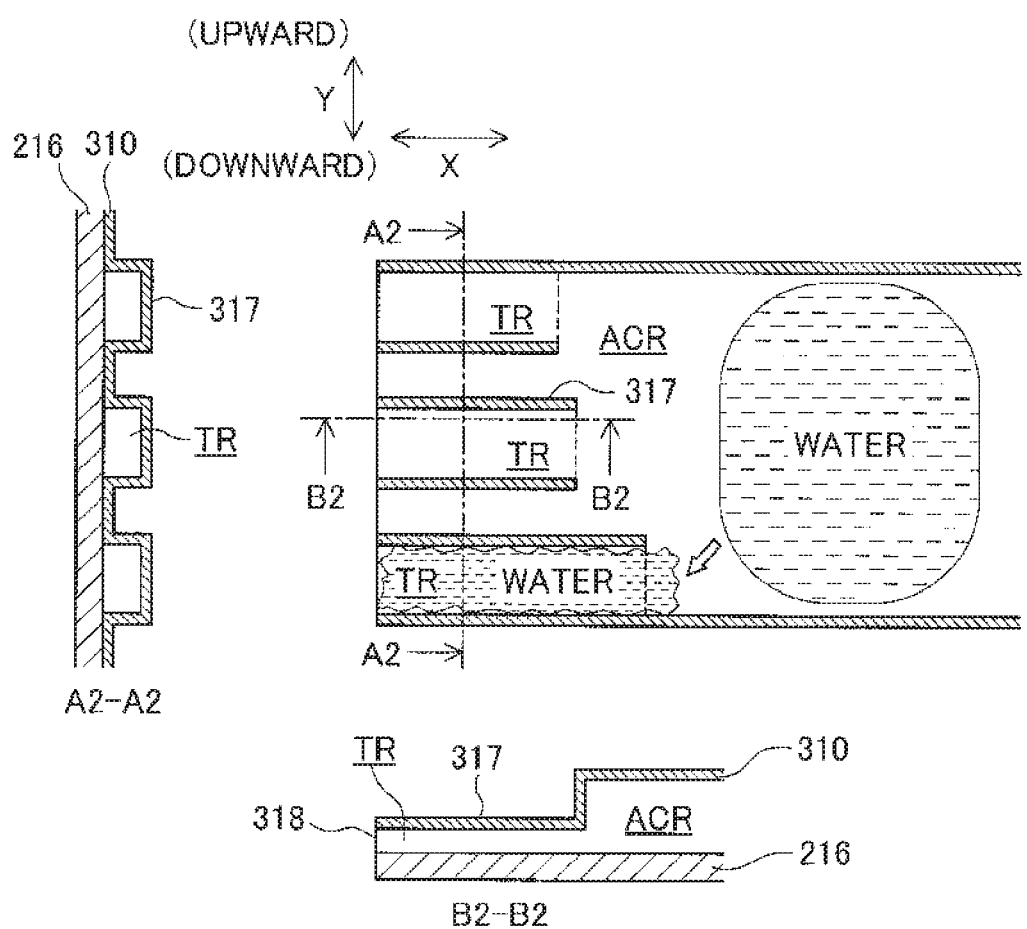
FIG. 8 is an explanatory diagram illustrating the structure around tunnel flow paths TR in a fuel cell 100 according to a third embodiment.

FIG. 8 is an explanatory diagram illustrating the structure around tunnel flow paths TR in a fuel cell 100 according to a third embodiment. FIG. 8 shows the plane of the tunnel flow paths TR and the common rail ACR for the fuel gas communicating with the tunnel flow paths TR and the cross sections at a position A2-A2 and at a position B2-B2 on the plane. The fuel cell 100 of the third embodiment differs in the arrangement of the tunnel flow paths TR from the fuel cell 100 of the first embodiment, but otherwise has the similar structure to that of the fuel cell 100 of the first embodiment. Each of the tunnel flow paths TR is provided as a flow path that runs below the seal lines SL formed by the seals 440 and 450 (on the side of the power generation layer 200) to communicate between the fuel gas supply manifold 162 and the common rail ACR for the fuel gas and between the fuel gas exhaust manifold 164 and the common rail ACR for the fuel gas.

As shown in FIG. 8, in the fuel cell 100 of the third embodiment, like the first embodiment (FIG. 5), three tunnel flow paths TR are formed by three third grooves 317 to be arranged in the Y direction. In the fuel cell 100 of the third embodiment, the lowermost third groove 317 out of the three third grooves 317 shown in FIG. 8 is located in use at the lowermost position in the direction of gravity. According to the third embodiment, the lowermost third groove 317 shown in FIG. 8 is formed to be extended to the nearest position (rightward position in FIG. 8) to the common rail ACR for the fuel gas communicating with the flow path spaces AS for the fuel gas.

Water produced during power generation enters the common rail ACR for the fuel gas. The produced water entering the common rail ACR for the fuel gas moves with the flow of the fuel gas. The produced water moves to the boundary of the common rail ACR for the fuel gas with the tunnel flow path TR and comes into contact with the tunnel flow path TR to be drawn into the tunnel flow path TR by capillarity. According to the embodiment, the tunnel flow path TR formed by the third groove 317 located at the lowermost position in the direction of gravity is extended to the nearest position to the common rail ACR for the fuel gas, so that the produced water is drawn into the tunnel flow path TR located at the lowermost position in the direction of gravity. This arrangement, on the other hand, prevents the produced water from being drawn into the other tunnel flow paths TR and thereby keeps the other tunnel flow paths TR open without being blocked by the produced water. This arrangement of the fuel cell 100 according to the third embodiment thus facilitates water drainage from the common rail ACR for the fuel gas and prevents all the tunnel flow paths TR from being blocked. When the tunnel flow paths TR are fully blocked, there may be a failed restart of the fuel cell 100 in the sub-zero temperatures. The arrangement of this embodiment effectively avoids such a failure.

Figure 9A:
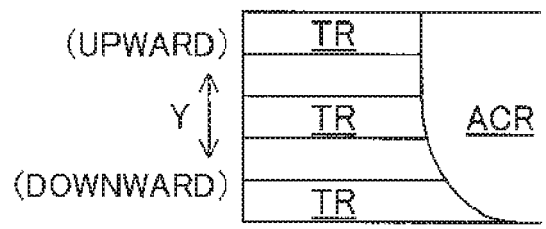
FIGS. 9A to 9C schematically show the positional relationships at the boundaries between the common rail ACR for the fuel gas and the respective tunnel flow paths TR.
Figure 9B:
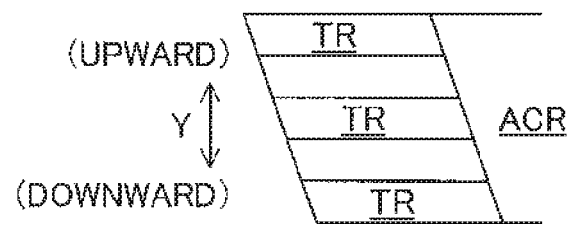
Figure 9C:
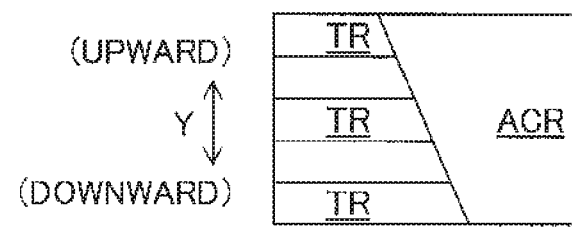

FIGS. 9A to 9C are explanatory diagrams illustrating the structures around tunnel flow paths TR according to some modifications of the third embodiment. FIGS. 9A to 9C schematically show the positional relationships at the boundaries between the common rail ACR for the fuel gas and the respective tunnel flow paths TR. The upward direction in FIG. 9 corresponds to the upper side in the direction of gravity, while the downward direction in FIG. 9 corresponds to the lower side in the direction of gravity. As shown in the structure of FIG. 9A, the length of only the tunnel flow path TR located at the lowermost position in the direction of gravity may be made greater than the lengths of the other tunnel flow paths TR, so that the tunnel flow path TR located at the lowermost position in the direction of gravity is extended to the nearest position to the common rail ACR for the fuel gas. As shown in the structure of FIG. 9B, the tunnel flow paths TR may be formed to have substantially the same length but to be shifted in position along the X direction, so that the tunnel flow path TR located at the lowermost position in the direction of gravity is extended to the nearest position to the common rail ACR for the fuel gas. As shown in the structure of FIG. 9C, the tunnel flow path TR located at the lower position in the direction of gravity may be formed to have the greater length, so that the tunnel flow path TR located at the lowermost position in the direction of gravity is extended to the nearest position to the common rail ACR for the fuel gas.

The arrangement of the tunnel flow paths TR shown in FIG. 8 may be adopted only for the side near to the fuel gas exhaust manifold 164, while the arrangement of the tunnel flow paths TR having the boundaries with the common rail ACR for the fuel gas at substantially the same position may be adopted for the side near to the fuel gas supply manifold 162. FIG. 8 illustrates the arrangement of forming the tunnel flow paths TR by providing the third grooves 317 in the anode-side separator 310. In the arrangement of forming the tunnel flow paths TR by providing the thin-walled parts TP in the anode diffusion layer 216 as described in the second embodiment (FIG. 7), extending the tunnel flow path TR formed by the thin-walled part TP located at the lowermost position in the direction of gravity to the nearest position to the common rail ACR for the fuel gas effectively prevents all the tunnel flow paths TR from being blocked.

D. Fourth Embodiment

Figure 10:
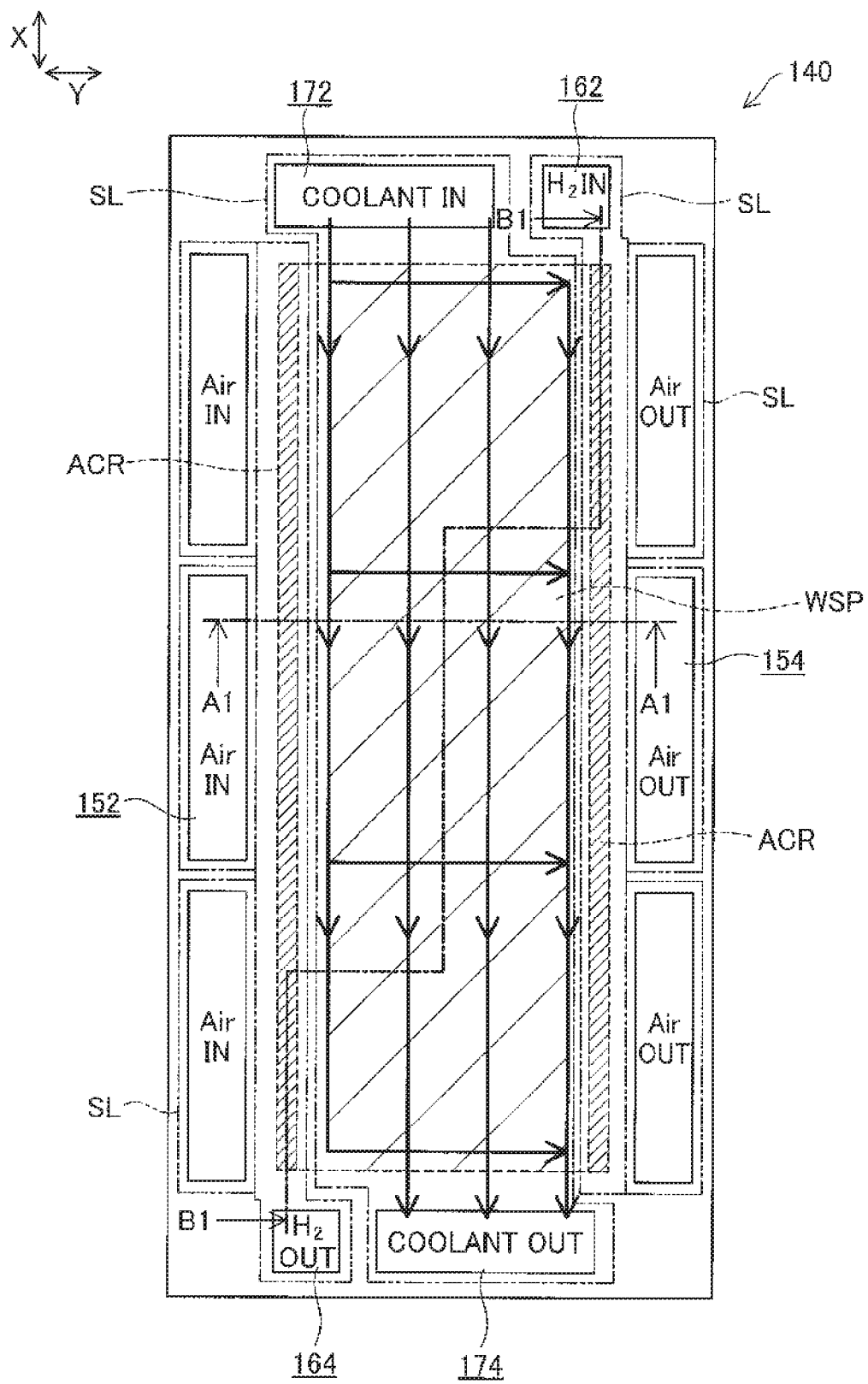
FIG. 10 is an explanatory diagram illustrating the planar structure of a fuel cell 100 according to a fourth embodiment.
Figure 11:
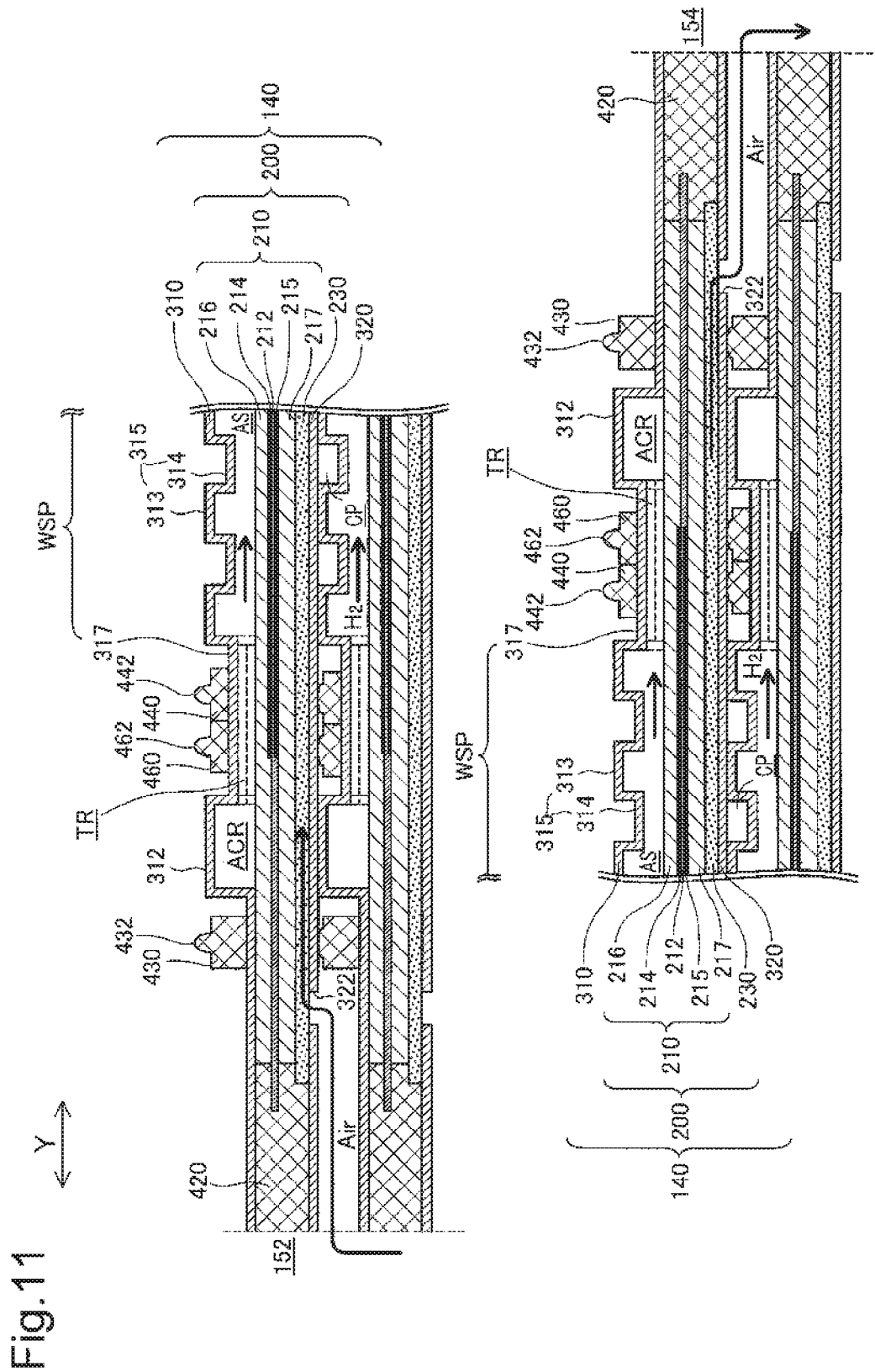
FIG. 11 is an explanatory diagram illustrating the cross sectional structure of the fuel cell 100 of the fourth embodiment.
Figure 12:
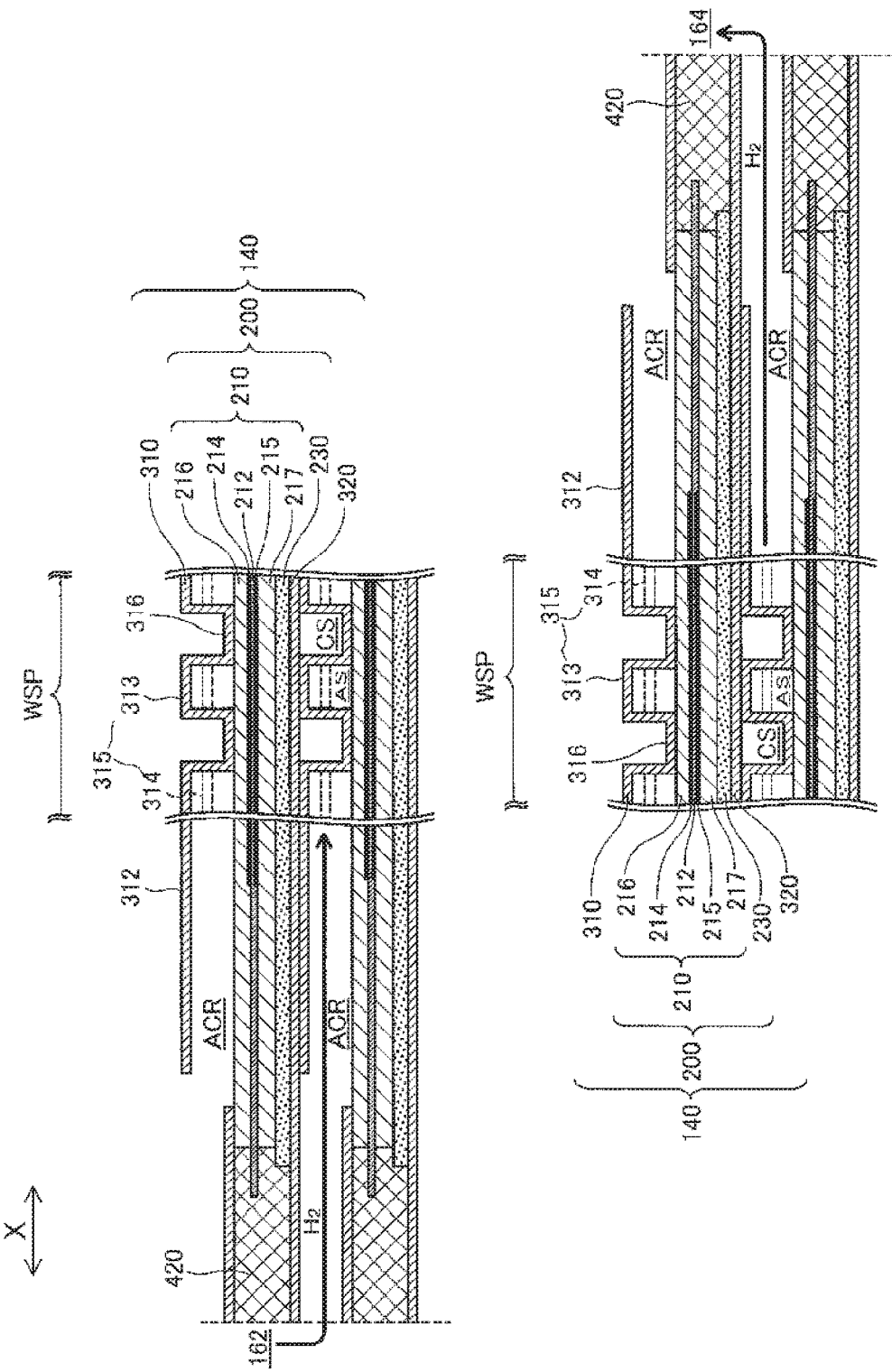
FIG. 12 is an explanatory diagram illustrating the cross sectional structure of the fuel cell 100 of the fourth embodiment.

FIG. 10 is an explanatory diagram illustrating the planar structure of a fuel cell 100 according to a fourth embodiment. FIGS. 11 and 12 are explanatory diagrams illustrating the cross sectional structures of the fuel cell 100 of the fourth embodiment. FIG. 11 shows a partial cross section of the fuel cell 100 at a position A1-A1 in FIG. 10, and FIG. 12 shows a partial cross section of the fuel cell 100 at a position B1-B1 in FIG. 10.

The fuel cell 100 of the fourth embodiment differs in the relationship between tunnel flow paths TR and a common rail ACR for the fuel gas from the fuel cell 100 of the first embodiment, but otherwise has the similar structure to that of the fuel cell 100 of the first embodiment. As shown in FIGS. 10 and 11, in the fuel cell 100 of the fourth embodiment, a seal 440 for forming the seal line SL that surrounds the flow area of the coolant is located not outside but inside of the common rails ACR for the fuel gas. In the description hereof, the inside of the common rails ACR for the fuel gas means the side downstream of the common rail ACR for the fuel gas on the supply side (on the upstream side) but the side upstream of the common rail ACR for the fuel gas on the exhaust side (on the downstream side). There are a seal 460 arranged to surround the fuel gas supply manifold 162 and the common rail ACR for the fuel gas on the supply side and a seal 460 arranged to surround the fuel gas exhaust manifold 164 and the common rail ACR for the fuel gas on the exhaust side.

As shown in FIG. 11, tunnel flow paths TR that run below the seal lines SL formed by the seals 450 and 460 (on the side of the power generation layer 200) to communicate between the common rails ACR for the fuel gas and the flow path spaces AS for the fuel gas are formed by providing the third grooves 317 between the respective common rails ACR for the fuel gas and the corrugated portion WSP. The tunnel flow paths TR are formed at a plurality of positions along the direction of extension of the common rails ACR for the fuel gas.

As indicated by the arrows in FIGS. 11 and 12, hydrogen as the fuel gas supplied to the fuel gas supply manifold 162 is introduced into the common rail ACR for the fuel gas on the supply side (on the upstream side) to be diffused in the X direction through the common rail ACR for the fuel gas and flows through the tunnel flow paths TR to enter the flow path spaces AS for the fuel gas and flow in the Y direction through the flow path spaces AS for the fuel gas. This flow of hydrogen is used for power generation by the membrane electrode assembly 210. The hydrogen that is not used for power generation flows from the flow path space AS for the fuel gas through the tunnel flow paths TR to enter the common rail ACR for the fuel gas on the downstream side (on the exhaust side) and flows through the common rail ACR for the fuel gas to be discharged to the fuel gas exhaust manifold 164.

As described above, in the fuel cell 100 of the fourth embodiment, the seal 440 for forming the seal line SL that surrounds the flow area of the coolant is located inside of the common rails ACR for the fuel gas. The tunnel flow paths TR are also formed inside of the common rails ACR for the fuel gas. This arrangement effectively reduces the pressure loss in the flow path, compared with the fuel cell 100 of the first embodiment where the tunnel flow paths TR are located outside of the common rails ACR for the fuel gas.

In the fuel cell 100 of the fourth embodiment, other common rails may additionally be provided inside of the tunnel flow paths TR that are located inside of the common rails ACR for the fuel gas. This modification further improves the distribution of the fuel gas. In the fuel cell 100 of the first embodiment, like the fourth embodiment, other tunnel flow paths TR may additionally be provided inside of the common rails ACR for the fuel gas.

E. Fifth Embodiment

Figure 13:
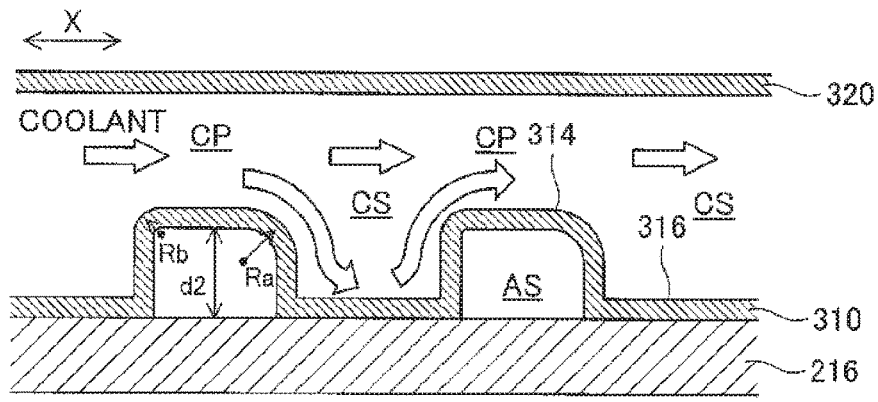
FIG. 13 is an explanatory diagram illustrating the cross sectional structure of an anode-side separator 310 in a fuel cell 100 according to a fifth embodiment.

FIG. 13 is an explanatory diagram illustrating the cross sectional structure of an anode-side separator 310 in a fuel cell 100 according to a fifth embodiment. FIG. 13 shows the cross section of the anode-side separator 310 in the X direction at the position of shallower groove sections 314 (FIGS. 4 and 6). The arrows in FIG. 13 indicate the flow direction of the coolant through a corrugated flow path for the coolant defined by communication flow channels CP formed between the shallower groove sections 314 of the anode-side separator 310 and the cathode-side separator 320 and flow path spaces CS for the coolant formed between the first grooves 316 and the cathode-side separator 320. In the illustrated example of FIG. 13, the left side of the drawing corresponds to the upstream side and the right side of the drawing corresponds to the downstream side.

The fuel cell 100 of the fifth embodiment differs in the shape of the shallower groove sections 314 of the anode-side separator 310 from the fuel cell 100 of the first embodiment, but otherwise has the similar structure to that of the fuel cell 100 of the first embodiment. According to the fifth embodiment, as shown in FIG. 13, the cross sectional shape of the shallower groove section 314 is controlled to have a larger curvature radius Ra on the downstream side of the flow of the coolant in each of the communication flow channels CP than a curvature of radius Rb on the upstream side.

The anode-side separator 310 having the shallower groove sections 314 of this cross sectional shape may be manufactured by press-forming a metal plate. The anode-side separator 310 may be manufactured by machining a metal plate or a carbon resin plate or by etching a metal plate. The anode-side separator 310 may otherwise be manufactured by injection molding carbon resin material.

Setting the larger curvature radius Ra on the downstream side of the flow of the coolant in each of the communication flow channels CP facilitates the coolant flowing through the communication flow channel CP to flow into a portion nearer to (the anode diffusion layer 216 of) the power generation layer 200 (i.e., portion on the lower side in the drawing), rather than directly passing through a portion nearer to the cathode-side separator 320 (portion on the upper side in the drawing) in the flow path space CS for the coolant on the downstream side. Simply increasing the curvature radius Ra on the downstream side of the flow of the coolant in each of the communication flow channels CP, however, reduces the cross sectional area of the flow path space AS for the fuel gas at the positions of the shallower groove sections 314 on the side of the power generation layer 200. In the fuel cell 100 of the fifth embodiment, the cross sectional shape of the shallower groove sections 314 is accordingly controlled to have the larger curvature radius Ra on the downstream side of the flow of the coolant in the communication flow channel CP than the curvature radius Rb on the upstream side. This arrangement effectively prevents stagnation of the coolant in the flow path spaces CS for the coolant and thereby reduces degradation of the cooling performance of the fuel cell 100, while minimizing the reduction of the cross sectional area of the flow path spaces AS for the fuel gas. For example, when the depth d2 of the shallower groove sections 314 is equal to 1 mm, it is preferable that the curvature radius Ra on the downstream side is greater than 0.5 and that the curvature radius Rb on the upstream side is smaller than 0.1.

Figure 14:
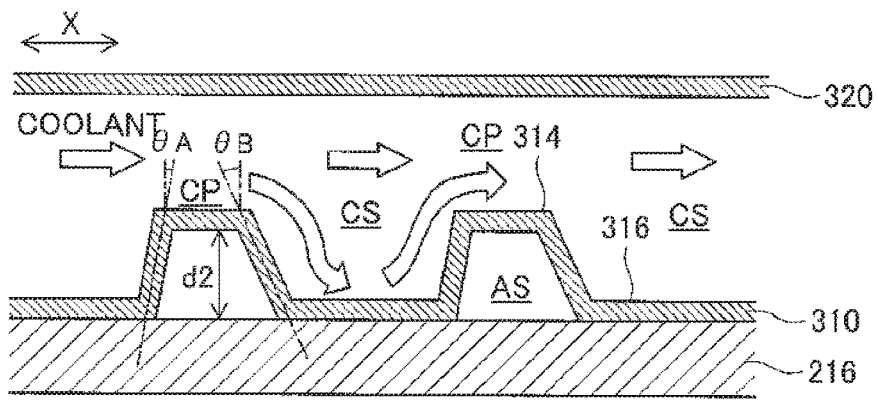
FIG. 14 is an explanatory diagram illustrating the cross sectional structure of an anode-side separator 310 in a fuel cell 100 according to one modification of the fifth embodiment.

FIG. 14 is an explanatory diagram illustrating the cross sectional structure of an anode-side separator 310 in a fuel cell 100 according to one modification of the fifth embodiment. In the modification of the fifth embodiment, as shown in FIG. 14, the cross sectional shape of the shallower groove section 314 is controlled to have a greater draft angle θB on the downstream side of the flow of the coolant in the communication flow channel CP than a draft angle θA on the upstream side. The draft angle herein means an angle of the center line of the wall member of the shallower groove section 314 forming the boundary between the communication flow channel CP and the flow path space CS for the coolant to the vertical direction.

Setting the greater draft angle θB on the downstream side of the flow of the coolant in the communication flow channel CP than the draft angle θA on the upstream side similarly facilitates the coolant flowing through the communication flow channel CP to flow into a portion nearer to the power generation layer 200 (i.e., portion on the lower side in the drawing) in the flow path space CS for the coolant on the downstream side. This arrangement effectively prevents stagnation of the coolant in the flow path spaces CS for the coolant and thereby reduces degradation of the cooling performance of the fuel cell 100, while minimizing the reduction of the cross sectional area of the flow path spaces AS for the fuel gas. It is preferable that the draft angle θB on the downstream side is greater than 45 degrees and that the draft angle θA on the upstream side is less than 30 degrees.

F. Sixth Embodiment

Figure 15:
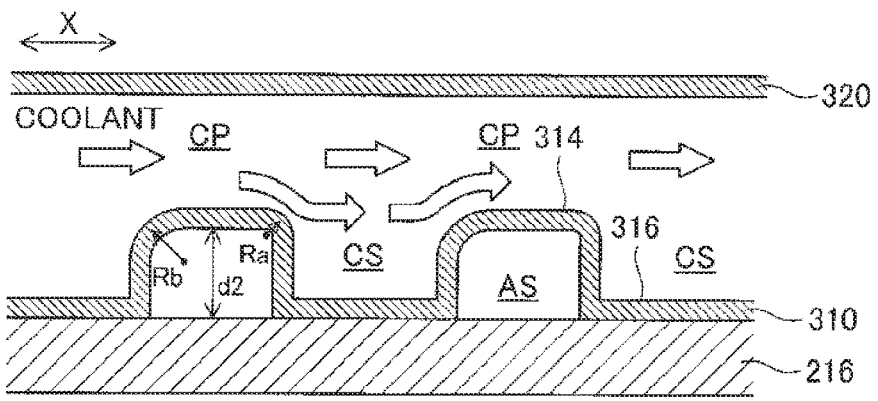
FIG. 15 is an explanatory diagram illustrating the cross sectional structure of an anode-side separator 310 in a fuel cell 100 according to a sixth embodiment.

FIG. 15 is an explanatory diagram illustrating the cross sectional structure of an anode-side separator 310 in a fuel cell 100 according to a sixth embodiment. FIG. 15 shows the cross section of the anode-side separator 310 in the X direction at the position of shallower groove sections 314 (FIGS. 4 and 6). The arrows in FIG. 15 indicate the flow direction of the coolant through a corrugated flow path for the coolant defined by communication flow channels CP formed between the shallower groove sections 314 of the anode-side separator 310 and the cathode-side separator 320 and flow path spaces CS for the coolant formed between the first grooves 316 and the cathode-side separator 320. In the illustrated example of FIG. 15, the left side of the drawing corresponds to the upstream side and the right side of the drawing corresponds to the downstream side.

The fuel cell 100 of the sixth embodiment differs in the shape of the shallower groove sections 314 of the anode-side separator 310 from the fuel cell 100 of the fifth embodiment shown in FIG. 13, but otherwise has the similar structure to that of the fuel cell 100 of the fifth embodiment. According to the sixth embodiment, as shown in FIG. 15, the cross sectional shape of the shallower groove section 314 is controlled to have a smaller curvature radius Ra on the downstream side of the flow of the coolant in each of the communication flow channels CP than a curvature of radius Rb on the upstream side.

Setting the smaller curvature radius Ra on the downstream side of the flow of the coolant in each of the communication flow channels CP interferes with the inflow of the coolant through the communication flow channel CP into a portion nearer to (the anode diffusion layer 216 of) the power generation layer 200 (i.e., portion on the lower side in the drawing) in the flow path space CS for the coolant on the downstream side and thereby regulates the flow of the coolant. The inflow of the coolant into the portion nearer to the power generation layer 200 in the flow path space CS for the coolant causes the turbulent flow of the coolant to increase the pressure loss in the flow path. This results in increasing the load of the water pump 71 and reducing the fuel consumption. In the fuel cell 100 of the sixth embodiment, the cross sectional shape of the shallower groove sections 314 is accordingly controlled to have the smaller curvature radius Ra on the downstream side of the flow of the coolant in the communication flow channel CP than the curvature radius Rb on the upstream side. This arrangement effectively prevents the inflow of the coolant into the portion nearer to the power generation layer 200 in the flow path space CS for the coolant, thereby regulating the flow of the coolant and minimizing the increase of the pressure loss in the flow path. For example, when the depth d2 of the shallower groove sections 314 is equal to 1 mm, it is preferable that the curvature radius Ra on the downstream side is smaller than 0.1 and that the curvature radius Rb on the upstream side is larger than 0.5.

Figure 16:
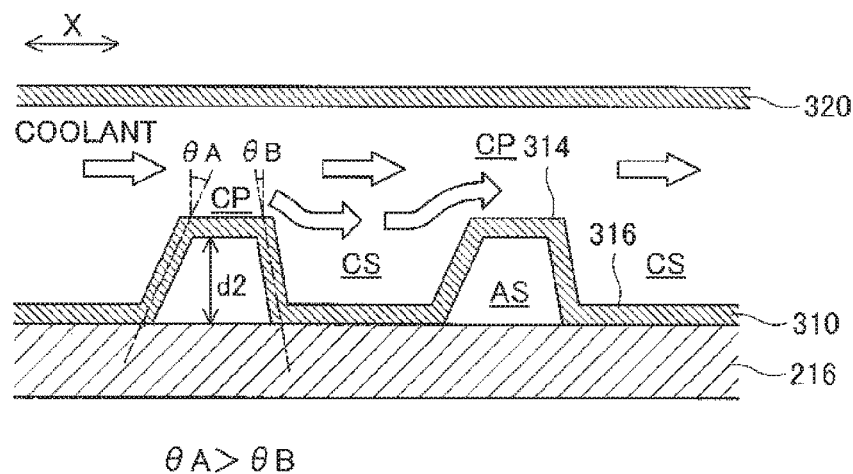
FIG. 16 is an explanatory diagram illustrating the cross sectional structure of an anode-side separator 310 in a fuel cell 100 according to one modification of the sixth embodiment.

FIG. 16 is an explanatory diagram illustrating the cross sectional structure of an anode-side separator 310 in a fuel cell 100 according to one modification of the sixth embodiment. In the modification of the sixth embodiment, as shown in FIG. 16, the cross sectional shape of the shallower groove section 314 is controlled to have a smaller draft angle θB on the downstream side of the flow of the coolant in the communication flow channel CP than a draft angle θA on the upstream side.

Setting the smaller draft angle θB on the downstream side of the flow of the coolant in the communication flow channel CP than the draft angle θA on the upstream side similarly prevents the inflow of the coolant into the portion nearer to the power generation layer 200 in the flow path space CS for the coolant, thereby regulating the flow of the coolant and minimizing the increase of the pressure loss in the flow path.

G. Seventh Embodiment

Figure 17:
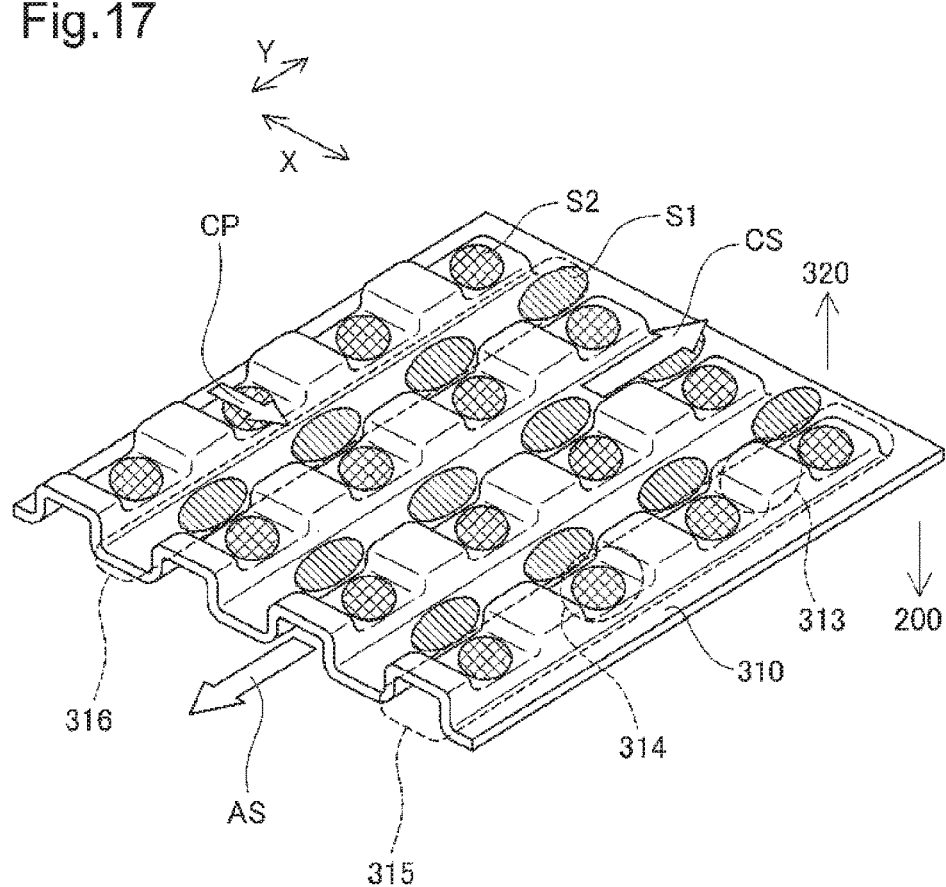
FIG. 17 is an explanatory diagram illustrating the structure of an anode-side separator 310 in a fuel cell 100 according to a seventh embodiment.

FIG. 17 is an explanatory diagram illustrating the structure of an anode-side separator 310 in a fuel cell 100 according to a seventh embodiment. The fuel cell 100 of the seventh embodiment differs in the first surface of the anode-side separator 310 (surface opposed to the cathode-side separator 320) subjected to specific surface treatment from the fuel cell 100 of the first embodiment, but otherwise has the similar structure to that of the fuel cell 100 of the first embodiment.

According to the seventh embodiment, the manufacturing process of the anode-side separator 310 makes the entire first surface of the corrugated portion WSP subjected to honing as hydrophilic treatment and subsequently makes the entire first surface subjected to immersion plating. After the plating, the anode-side separator 310 is dried with the first surface up, so that the plating solution flows into the first grooves 316 to thicken the plated layer. The manufacturing process subsequently sprays a water repellent agent, such as Teflon (registered trademark), into areas 51 of the first grooves 316 adjoining to the shallower groove sections 314 to enhance the water repellency in the areas S1. The anode-side separator 310 manufactured by this process has high corrosion resistance and high water repellency in the areas S1 of the first grooves 316 adjoining to the shallower groove sections 314 on the first surface of the corrugated portion WSP, while having high hydrophilicity in surface areas S2 of the shallower groove sections 314.

The eluted substances from various parts of the fuel cell system 10 tend to accumulate in the areas S1 of the first grooves 316 adjoining to the shallower groove sections 314. In the anode-side separator 310 of the seventh embodiment, however, the high corrosion resistance in the areas S1 effectively protects the anode-side separator 310 from corrosion. The communication flow channels CP formed by the shallower groove sections 314 have relatively less height and thereby tend to increase the pressure loss. In the anode-side separator 310 of the seventh embodiment, however, the high hydrophilicity in the surface areas S2 of the shallower groove sections 314 decreases the friction coefficient of pipe and thereby minimizes the increase of the pressure loss. The coolant also tends to accumulate in the areas S1 of the first grooves 316 adjoining to the shallower groove sections 314. The accumulated coolant may run over to reduce the workability during disassembly of the unit cells 140 for the purpose of, for example, repair. In the anode-side separator 310 of the seventh embodiment, however, the high water repellency in the areas S1 improves the removability of the coolant and interferes with accumulation of the coolant, so as to minimize the reduction of the workability during disassembly.

The manufacturing process of the anode-side separator 310 may alternatively perform the following treatment to have the similar advantageous effects to those of the seventh embodiment described above. The manufacturing process of the anode-side separator 310 may make the entire first surface of the corrugated portion WSP subjected to carbon coating as corrosion resistant treatment, subsequently makes the entire first surface subjected to UV treatment to make the surface hydrophilic, and makes the areas S1 of the first grooves 316 adjoining to the shallower groove sections 314 subjected to resin coating to enhance the water repellency. The anode-side separator 310 manufactured by this process also has high corrosion resistance and high water repellency in the areas S1 of the first grooves 316 adjoining to the shallower groove sections 314 on the first surface of the corrugated portion WSP, while having high hydrophilicity in the surface areas S2 of the shallower groove sections 314.

H. Eighth Embodiment

Figure 18A:
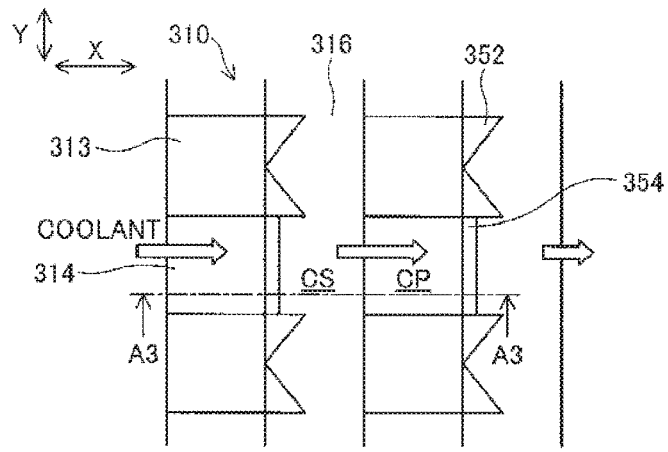
FIGS. 18A to 18D are explanatory diagrams illustrating the structure of an anode-side separator 310 in a fuel cell 100 according to an eighth embodiment.
Figure 18B:
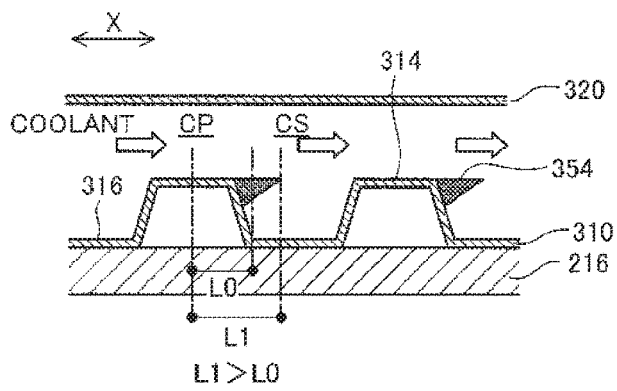
Figure 18C:
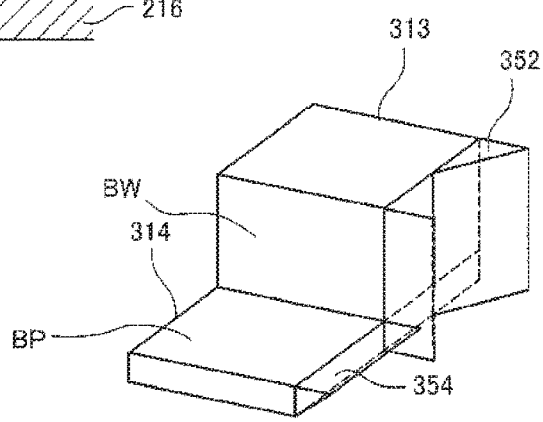

FIGS. 18A to 18D are explanatory diagrams illustrating the structure of an anode-side separator 310 in a fuel cell 100 according to an eighth embodiment. FIG. 18A shows the planar structure of part of the first surface of the anode-side separator 310 (surface opposed to the cathode-side separator 320). FIG. 18B shows the cross sectional structure at a position A3-A3 in FIG. 18A. FIG. 18C is a perspective view showing the structure around a deeper groove section 313 and a shallower groove section 314.

The fuel cell 100 of the eighth embodiment differs in additional formation of wall members 352 and floor members 354 on the first surface of the corrugated portion WSP of the anode-side separator 310 from the fuel cell 100 of the first embodiment, but otherwise has the similar structure to that of the fuel cell 100 of the first embodiment. More specifically, in the anode-side separator 310 of the eighth embodiment, the wall member 352 is formed on the downstream side of the deeper groove section 313 in the flow direction of the coolant in the communication flow channel CP to be located on the extension of a boundary wall BW between the deeper groove section 313 and the shallower groove section 314. According to this embodiment, the wall member 352 is provided as a separate part made of the same material (metal material in this embodiment) as that of the anode-side separator 310 and adheres to the surface of the first groove 316 in the anode-side separator 310. The wall member 352 is formed in the shape of a triangular prism to ensure the sufficient area for adhesion.

In the anode-side separator 310 of the eighth embodiment, the floor member 354 is formed on the downstream side of the shallower groove section 314 to be located on the extension of a floor surface BP of the shallower groove section 314. According to this embodiment, the floor member 354 is provided as a separate part made of the same material (metal material in this embodiment) as that of the anode-side separator 310 and adheres to the downstream wall surface of the shallower groove section 314 in the anode-side separator 310. The floor member 354 is formed in the shape of a triangular prism to ensure the sufficient area for adhesion. It is preferable that the downstream edge of the floor member 354 is located downstream of the downstream end of the shallower groove section 314. In other words, it is preferable that a distance L1 is greater than a distance L0 in FIG. 18B.

In the fuel cell 100 of the eighth embodiment, additional formation of the wall member 352 and the floor member 354 in the corrugated portion WSP of the anode-side separator 310 prevents the coolant flowing through the communication flow channel CP from going around and flowing into the area on the downstream side of the deeper groove section 313 in the flow path space CS for the coolant on the downstream side and from flowing into the portion nearer to (the anode diffusion layer 216 of) the power generation layer 200 in the flow path space CS for the coolant on the downstream side, thereby regulating the flow of the coolant. The structure of the fuel cell 100 according to the eighth embodiment thus effectively prevents the turbulent flow of the coolant, thus minimizing the increase of the pressure loss in the flow path, the increase of the load of the water pump 71 and the reduction of the fuel consumption.

Figure 18D:
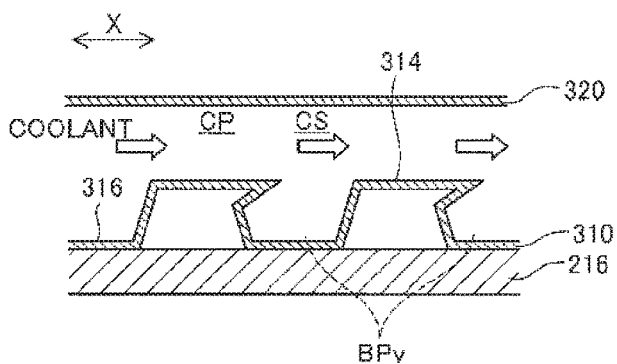

The shape of the wall member 352 is not limited to the shape of a triangular prism but may be any shape of the wall located on the extension of the boundary wall BW. The material of the wall member 352 is not limited to the metal material. Similarly, the shape of the floor member 354 is not limited to the shape of a triangular prism but may be any shape of the floor located on the extension of the floor surface BP. The material of the floor member 354 is also not limited to the metal material. The wall members 352 and the floor members 354 may be formed integrally with the anode-side separator 310 in the process of press-forming the anode-side separator 310. FIG. 18D shows the structure of the floor members 354 formed integrally with the anode-side separator 310 in the process of press-forming the anode-side separator 310. This advantageously saves the working step.

I. Ninth Embodiment

Figure 19A:
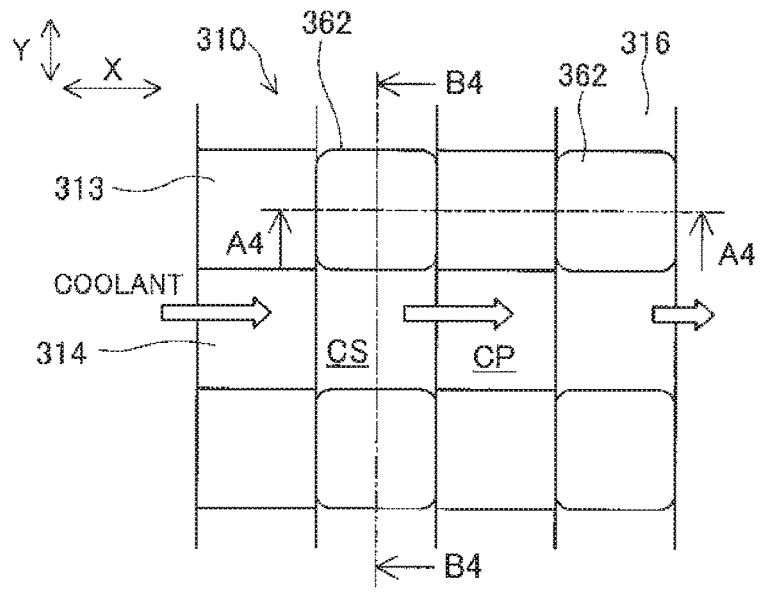
FIGS. 19A to 19C are explanatory diagrams illustrating the structure of an anode-side separator 310 in a fuel cell 100 according to a ninth embodiment.
Figure 19B:
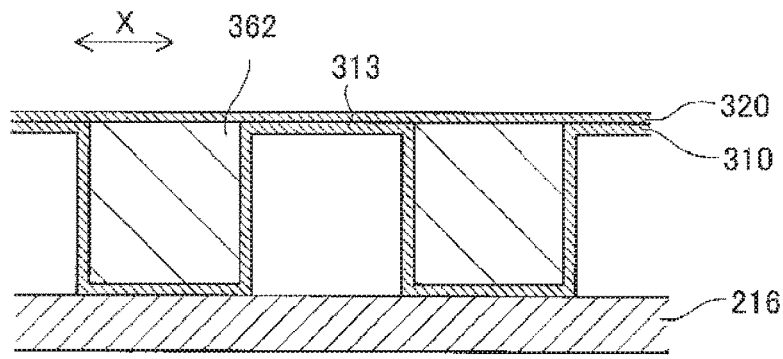
Figure 19C:
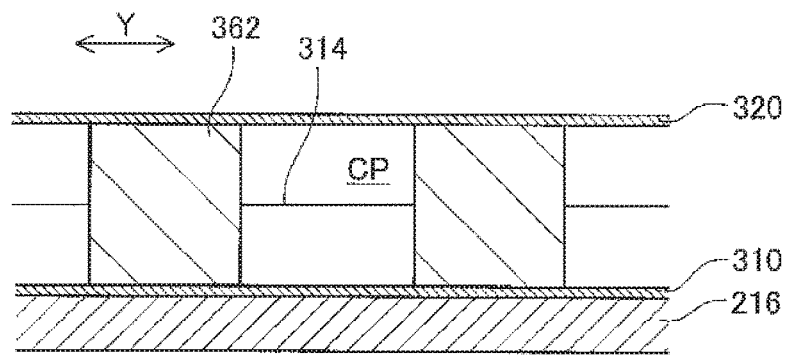

FIGS. 19A to 19C are explanatory diagrams illustrating the structure of an anode-side separator 310 in a fuel cell 100 according to a ninth embodiment. FIG. 19A shows the planar structure of part of the first surface of the anode-side separator 310 (surface opposed to the cathode-side separator 320). FIG. 19B shows the cross sectional structure at a position A4-A4 in FIG. 19A. FIG. 19C shows the cross sectional structure at a position B4-B4 in FIG. 19A.

The fuel cell 100 of the ninth embodiment differs in additional placement of spacers 362 on the first surface of the corrugated portion WSP of the anode-side separator 310 from the fuel cell 100 of the first embodiment, but otherwise has the similar structure to that of the fuel cell 100 of the first embodiment. More specifically, in the anode-side separator 310 of the ninth embodiment, the spacers 362 are located to fill the space at specific positions in the first groove 316 adjoining to the deeper groove sections 313. The spacer 362 is preferably made of an electrically conductive material (for example, metal or carbon material) but may be made of a non-conductive material (for example, resin). The spacer 362 may be placed to entirely block the flow path space CS for the coolant formed on the first surface of the first groove 316 or may alternatively be placed to block a portion of the flow path space CS for the coolant nearer to the power generation layer 200 while opening the remaining portion nearer to the cathode-side separator 320.

In the fuel cell 100 of the ninth embodiment, the additional placement of the spacer 362 in the corrugated portion WSP of the anode-side separator 310 prevents the coolant flowing through the communication flow channel CP from going around and flowing into the area on the downstream side of the deeper groove section 313 in the flow path space CS for the coolant on the downstream side to regulate the flow of the coolant, while preventing accumulation of the coolant in the area on the downstream side of the deeper groove section 313. The structure of the fuel cell 100 according to the ninth embodiment thus effectively prevents the turbulent flow of the coolant, so as to minimize the increase of the pressure loss in the flow path, the increase of the load of the water pump 71 and the reduction of the fuel consumption, while protecting the anode-side separator 310 from corrosion due to accumulation of the coolant.

The spacers 362 may be formed integrally with the anode-side separator 310 in the process of press-forming the anode-side separator 310. Alternatively the surface of the cathode-side separator 320 opposed to the anode-side separator 310 may be press-formed. During the stacking assembly of the fuel cell 100, convexes formed on the surface of the cathode-side separator 320 may be inserted into specific positions in the first groove 316 adjoining to the deeper groove sections 313 in the anode-side separator 310 to serve as the spacers 362.

J. Tenth Embodiment

Figure 20:
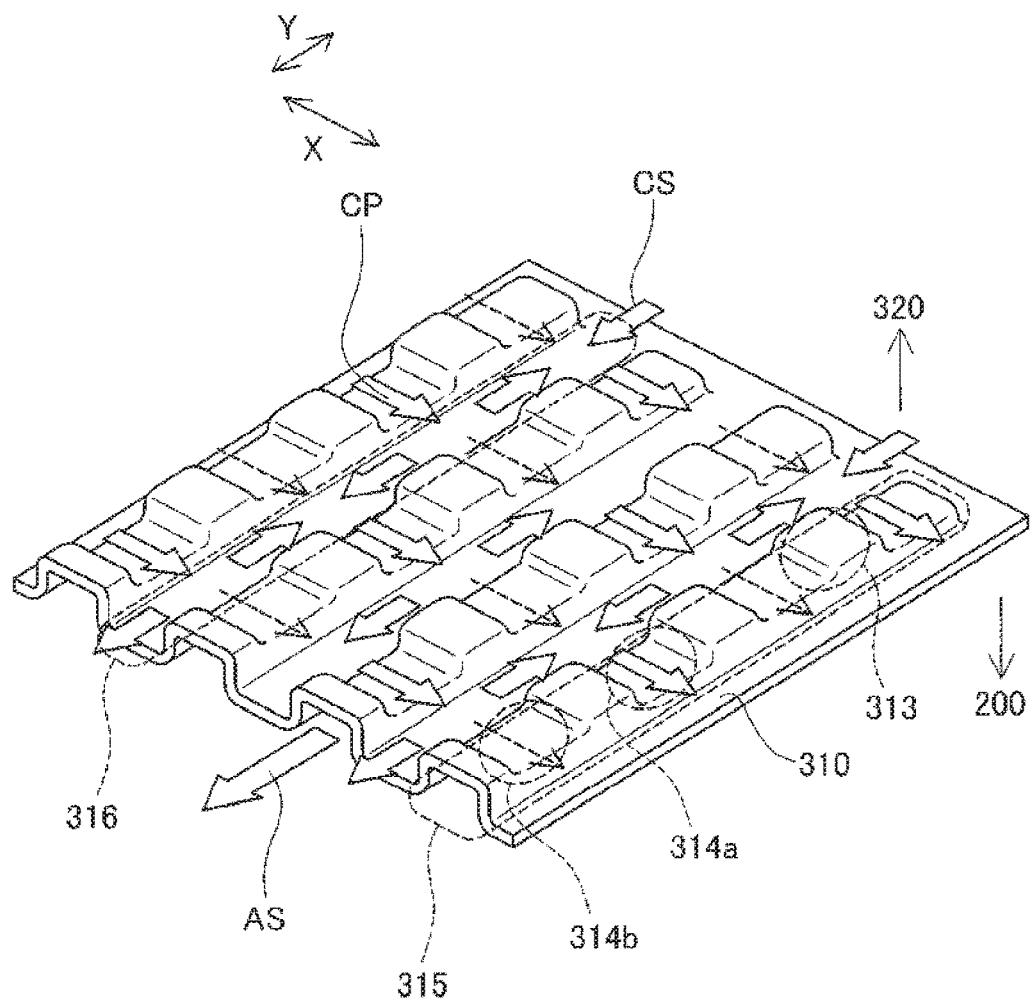
FIG. 20 is an explanatory diagram illustrating the structure of an anode-side separator 310 in a fuel cell 100 according to a tenth embodiment.

FIG. 20 is an explanatory diagram illustrating the structure of an anode-side separator 310 in a fuel cell 100 according to a tenth embodiment. The fuel cell 100 of the tenth embodiment differs in the structure of the second grooves 315 in the anode-side separator 310 from the fuel cell 100 of the first embodiment, but otherwise has the similar structure to that of the fuel cell 100 of the first embodiment.

As shown in FIG. 20, according to the tenth embodiment, like the first embodiment, each of the second grooves 315 in the anode-side separator 310 has a plurality of shallower groove sections 314. Each of the shallower groove sections 314 is formed at a specific position to be aligned with the corresponding shallower groove section 314 formed in another adjacent second groove 315. The structure of the tenth embodiment differs from the structure of the first embodiment in the way that the plurality of shallower groove sections 314 formed in each of the second grooves 315 include normal shallower groove sections 314a and medium-depth shallower groove sections 314b that have the greater depth than that of the normal shallower groove sections 314a. The medium-depth shallower groove section 314b has the intermediate depth between the depth of the normal shallower groove section 314a and the depth of the deeper groove section 131. The cross sectional area of the communication flow channel CP formed at the position of the medium-depth shallower groove section 314b is accordingly smaller than the cross sectional area of the communication flow channel CP formed at the position of the normal shallower groove section 314a. As described above, the depth of the second groove 315 (deeper groove section 313 and shallower groove section 314) means the distance in the stacking direction from the position of the outermost part on the second surface of the anode-side separator 310 to the position of the outermost part on the first surface of the second groove 315. The medium-depth shallower groove section 314b in each of the second grooves 315 is arranged at the position opposed to the normal shallower groove section 314a in an adjacent second groove 315. The communication flow channel CP formed at the position of the normal shallower groove section 314a is accordingly located upstream of the communication flow channel CP formed at the position of the medium-depth shallower groove section 314b.

In the fuel cell 100 of the tenth embodiment, the communication flow channel CP of the larger cross section formed at the position of the normal shallower groove section 314a is located upstream of the communication flow channel CP of the smaller cross section formed at the position of the medium-depth shallower groove section 314b. This arrangement prevents the coolant flowing through the communication flow channel CP formed at the position of the normal shallower groove section 314a from flowing into the communication flow channel CP formed at the position of the medium-depth shallower groove section 314b on the downstream side and facilitates the inflow of the coolant into the flow path space CS for the coolant instead. The presence of the communication flow channel CP that has the small cross sectional area at the position of the medium-depth shallower groove section 314b prevents the extreme turbulent flow of the coolant, thereby minimizing the increase of the pressure loss in the flow path, the increase of the load of the water pump 71 and the reduction of the fuel consumption due to the turbulent flow. The structure of the fuel cell 100 according to the tenth embodiment thus prevents both the extreme turbulent flow of the coolant and stagnation of the coolant in the flow path space CS for the coolant, thus minimizing the degradation of the cooling performance of the fuel cell 100.

According to the tenth embodiment, as shown in FIG. 20, it is preferable that the normal shallower groove sections 314a and the medium-depth shallower groove sections 314b are arranged alternately in each of the second grooves 315. This configuration pattern effectively prevents stagnation of the coolant in the flow path space CS for the coolant over the whole area of the corrugated portion WSP, while equalizing the flow rate of the coolant, so as to improve the cooling performance of the fuel cell 100. The medium-depth shallower groove sections 314b may be arranged at the higher density in an area nearer to the inlet of the oxidizing gas (i.e., area nearer to the oxidizing gas supply manifold 152). This arrangement enables the area nearer to the inlet of the oxidizing gas to be more effectively cooled down and thereby prevents the unit cell 140 from being dried. The configuration pattern of the normal shallower groove sections 314a and the medium-depth shallower groove sections 314b in each of the second grooves 315 may be set arbitrarily. For example, the configuration pattern may have two normal shallower groove sections 314a and one medium-depth shallower groove section 314b arranged alternately and repeatedly.

Figure 21:
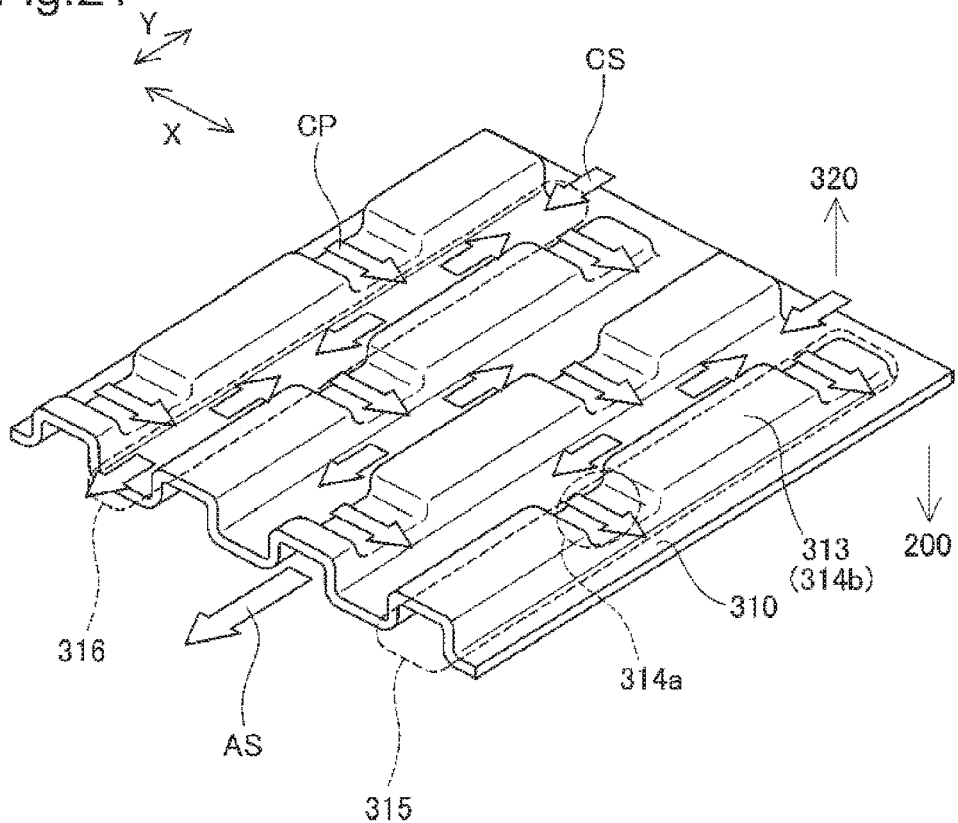
FIG. 21 is an explanatory diagram illustrating the structure of an anode-side separator 310 in a fuel cell 100 according to one modification of the tenth embodiment.

FIG. 21 is an explanatory diagram illustrating the structure of an anode-side separator 310 in a fuel cell 100 according to one modification of the tenth embodiment. In the anode-side separator 310 of the modification of the tenth embodiment shown in FIG. 21, the depth of the medium-depth shallower groove section 314b included in the anode-side separator 310 of the tenth embodiment shown in FIG. 20 is set equal to the depth of the deeper groove section 313. In other words, the medium-depth shallower groove section 314b is integrated with the deeper groove section 313 in the modification of the tenth embodiment. This structure of the modification of the tenth embodiment also facilitates the coolant flowing through the communication flow channel CP formed at the position of the normal shallower groove section 314a to flow into the flow path space CS for the coolant on the downstream side, so as to prevent stagnation of the coolant in the flow path space CS for the coolant and minimize the degradation of the cooling performance of the fuel cell 100.

K. Eleventh Embodiment

Figure 22:
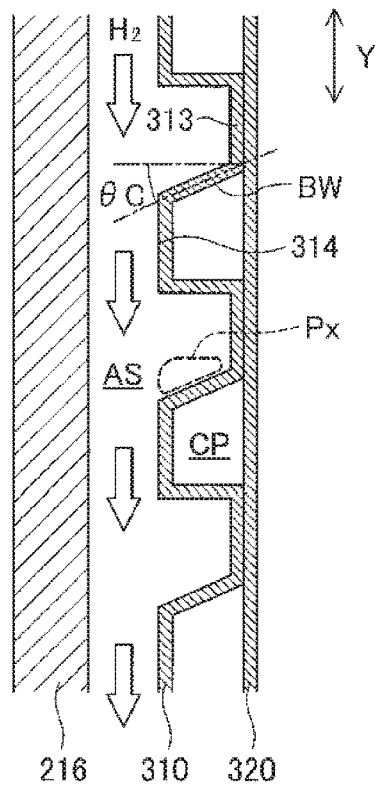
FIG. 22 is an explanatory diagram illustrating the structure of an anode-side separator 310 in a fuel cell 100 according to an eleventh embodiment.

FIG. 22 is an explanatory diagram illustrating the structure of an anode-side separator 310 in a fuel cell 100 according to an eleventh embodiment. FIG. 22 shows the cross section of the anode-side separator 310 in the Y direction at the position of the second groove 315 (FIGS. 4 and 6). The arrows in FIG. 22 indicate the flow direction of hydrogen in the flow path space AS for the fuel gas formed between the second groove 315 (deeper groove section 313 and shallower groove section 314) of the anode-side separator 310 and (the anode diffusion layer 216 of) the power generation layer 200. In the illustrated example of FIG. 22, the upper side of the drawing corresponds to the upstream side and the lower side of the drawing corresponds to the downstream side. The fuel cell 100 of the eleventh embodiment differs in the structure of the anode-side separator 310 from the fuel cell 100 of the first embodiment, but otherwise has the similar structure to that of the fuel cell 100 of the first embodiment.

As shown in FIG. 22, according to the eleventh embodiment, like the first embodiment, each of the second grooves 315 in the anode-side separator 310 has a plurality of shallower groove sections 314. The structure of the eleventh embodiment differs from the structure of the first embodiment in the way that a boundary wall BW between the deeper groove section 313 and the shallower groove section 314 that is adjacent to the deeper groove section 313 on the downstream side of the flow of hydrogen in the flow path space AS for the fuel gas is inclined, such that the position nearer to the second surface (surface opposed to the power generation layer 200) is located on the lower stream side. In other words, in the structure of the eleventh embodiment, the boundary wall BW is inclined at a predetermined angle θC to the stacking direction.

In the anode-side separator 310, when the boundary wall BW is arranged parallel to the stacking direction, water tends to accumulate in a portion Px on the boundary wall BW that is on the downstream side of the deeper groove section 313 in the flow path space AS for the fuel gas at the position of the deeper groove section 313. Such accumulation of water may cause corrosion of the anode-side separator 310. Especially, a larger amount of water tends to accumulate in the portion Px on the lower stream side of the flow path space AS for the fuel gas. In the structure of the eleventh embodiment, the boundary wall BW between the deeper groove section 313 and the shallower groove section 314 on the downstream side that is adjacent to the deeper groove section 313 is inclined, such that the position nearer to the second surface is located on the lower stream side. This structure effectively prevents accumulation of water in the portion Px on the boundary wall BW and thereby protects the anode-side separator 310 from corrosion.

Figure 23:
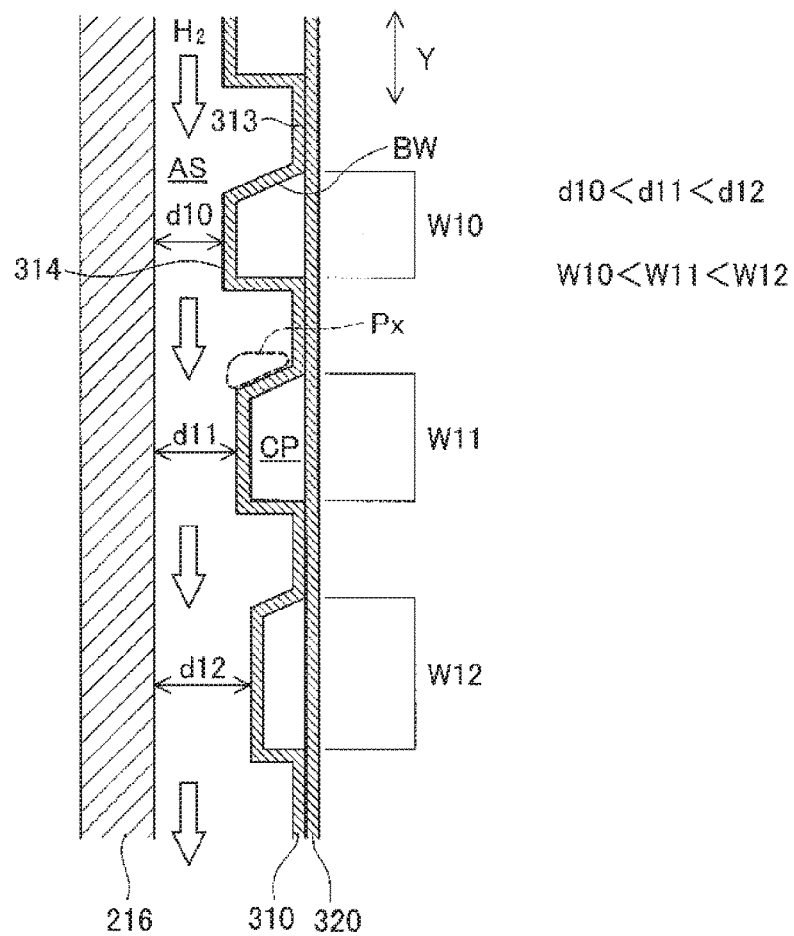
FIG. 23 is an explanatory diagram illustrating the structure of an anode-side separator 310 in a fuel cell 100 according to one modification of the eleventh embodiment.

FIG. 23 is an explanatory diagram illustrating the structure of an anode-side separator 310 in a fuel cell 100 according to one modification of the eleventh embodiment. According to the modification of the eleventh embodiment shown in FIG. 23, a boundary wall BW between the deeper groove section 313 and the shallower groove section 314 that is adjacent to the deeper groove section 313 on the downstream side of the flow of hydrogen in the flow path space AS for the fuel gas is inclined, such that the position nearer to the second surface is located on the lower stream side. In the modification of the eleventh embodiment, as shown in FIG. 23, the shallower groove section 314 in each of the second grooves 315 located on the lower stream side of the flow of hydrogen in the flow path space AS for the fuel gas is formed to have the greater depth d (i.e., d10<d11<d12). The structure of the modification of the eleventh embodiment accordingly prevents the water accumulated in the portion Px on the boundary wall BW from dropping down and accumulating on another boundary wall BW on the downstream side in the course of moving downstream. This arrangement more effectively protects the anode-side separator 310 from corrosion. In the modification of the eleventh embodiment, as shown in FIG. 23, the shallower groove section 314 located on the lower stream side is also formed to have the larger width W (i.e., W10<W11<W12). The structure of the modification of the eleventh embodiment forms the shallower groove section 314 located on the lower stream side to have the greater depth d. This decreases the height of the communication flow channel CP formed on the first surface of the shallower groove section 314 (surface opposed to the cathode-side separator 320). The structure of this modification, however, forms the shallower groove section 314 located on the lower stream side to have the larger width W, so as to minimize the reduction of the cross sectional area of the communication flow channel CP on the downstream side.

L. Twelfth Embodiment

Figure 24:
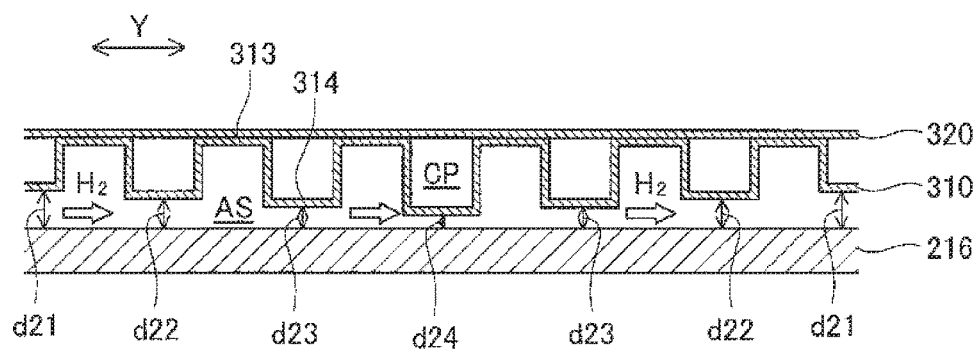
FIG. 24 is an explanatory diagram illustrating the structure of an anode-side separator 310 in a fuel cell 100 according to a twelfth embodiment.

FIG. 24 is an explanatory diagram illustrating the structure of an anode-side separator 310 in a fuel cell 100 according to a twelfth embodiment. FIG. 24 shows the cross section of the anode-side separator 310 in the Y direction at the position of the second groove 315 (FIGS. 4 and 6). The arrows in FIG. 24 indicate the flow direction of hydrogen in the flow path space AS for the fuel gas formed between the second groove 315 (deeper groove section 313 and shallower groove section 314) of the anode-side separator 310 and (the anode diffusion layer 216 of) the power generation layer 200. The fuel cell 100 of the twelfth embodiment differs in the structure of the anode-side separator 310 from the fuel cell 100 of the first embodiment, but otherwise has the similar structure to that of the fuel cell 100 of the first embodiment.

As shown in FIG. 24, according to the twelfth embodiment, like the first embodiment, each of the second grooves 315 in the anode-side separator 310 has a plurality of shallower groove sections 314. In the structure of the twelfth embodiment, the plurality of shallower groove sections 314 include multiple different types of shallower groove sections 314 having different depths d. In the illustrated example of FIG. 24, the depth d of the shallower groove sections 314 varies according to the relation of d21>d22>d23>d24.

For example, at the position of the shallower groove section 314 having the relatively large depth d21, the flow path space AS for the fuel gas formed on the second surface of the anode-side separator 310 (surface opposed to the power generation layer 200) has the relatively low flow rate of hydrogen (i.e., relatively small pressure), which causes the small current density and the small amount of heat generation. At the same position, the communication flow channel CP formed on the first surface of the anode-side separator 310 (surface opposed to the cathode-side separator 320) has the relatively low flow rate of the coolant, which causes the small heat quantity for cooling. At the position of the shallower groove section 314 having the relatively small depth d24, on the other hand, the flow path space AS for the fuel gas formed on the second surface of the anode-side separator 310 has the relatively high flow rate of hydrogen (i.e., relatively large pressure), which causes the large current density and the large amount of heat generation. At the same position, the communication flow channel CP formed on the first surface of the anode-side separator 310 has the relatively high flow rate of the coolant, which causes the large heat quantity for cooling.

As described above, the different depths of the shallower groove sections 314 cause the different current densities and the different amounts of heat generation during power generation as well as the different heat quantities for cooling by the coolant at the respective positions of the shallower groove sections 314. In general, each unit cell 140 of the fuel cell 100 has unequal distributions of the concentration of the reactive gas and the humidity in the plane of the unit cell 140, which cause unequal distribution of the amount of heat generation during power generation. In the structure of this embodiment, the plurality of shallower groove sections 314 include multiple different types of shallower groove sections 314 having different depths d. The power generation distribution and the temperature distribution in each unit cell 140 can thus be equalized by adequately arranging these different types of shallower groove sections 314.

M. Thirteenth Embodiment

Figure 25:
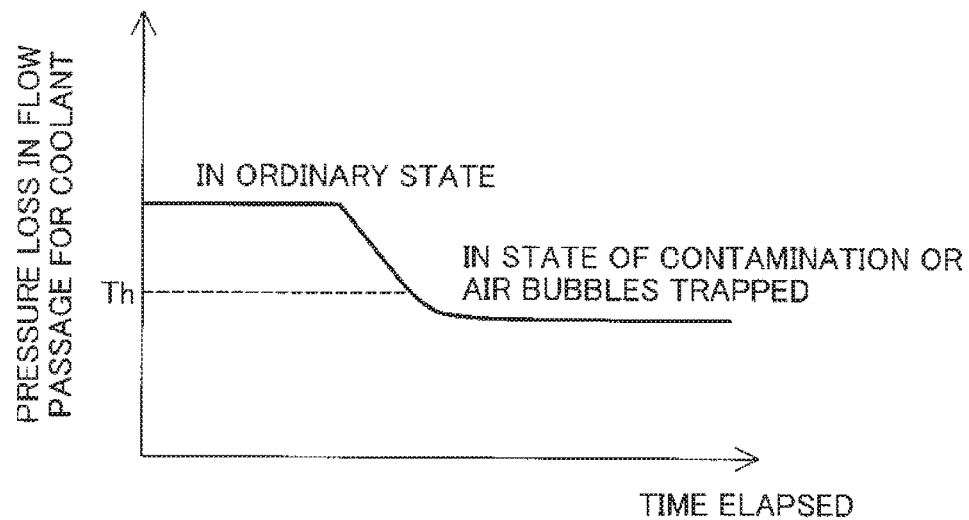
FIG. 25 is an explanatory diagram illustrating a control method of the fuel cell 100 according to a thirteenth embodiment.

FIG. 25 is an explanatory diagram illustrating a control method of the fuel cell 100 according to a thirteenth embodiment. The presence of the first grooves 316 and the second grooves 315 in the anode-side separator 310 in combination with the presence of the deeper groove sections 313 and the shallower groove sections 314 in the second grooves 315 causes contamination or air bubbles to be trapped in specific portions of the flow path spaces AS for the fuel gas that are adjacent to the deeper groove sections 313 during operation of the fuel cell 100. The contamination or air bubbles trapped in such portions interfere with the turbulent flow of the coolant and thereby reduce the pressure loss in the flow path for the coolant as shown in FIG. 25.

According to this embodiment, the controller 80 of the fuel cell system 10 measures the pressure loss in the flow path for the coolant and detects whether the measured pressure loss is less than a predetermined threshold value Th. When detecting that the pressure loss that is less than the predetermined threshold value Th, the controller 80 outputs a signal that informs the user of the occurrence of an abnormality in the flow path for the coolant. The user accordingly recognizes that contamination or air bubbles are trapped in the flow path space AS for the fuel gas in the anode-side separator 310. The embodiment can detect the occurrence of an abnormality in the flow path for the coolant by this simple configuration.

N. Fourth Embodiment

Figure 26:
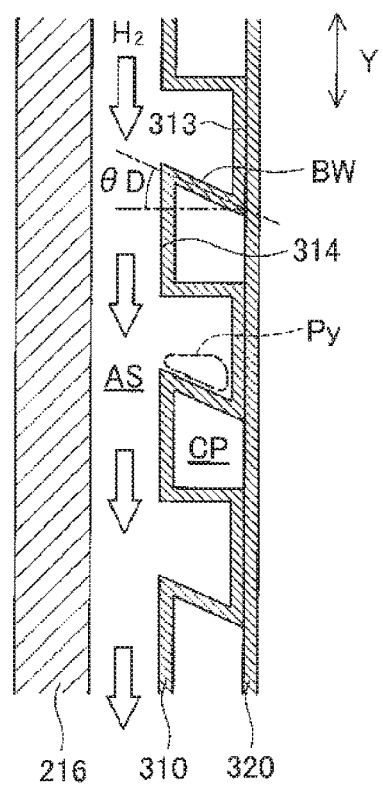
FIG. 26 is an explanatory diagram illustrating the structure of an anode-side separator 310 in a fuel cell 100 according to a fourteenth embodiment.

FIG. 26 is an explanatory diagram illustrating the structure of an anode-side separator 310 in a fuel cell 100 according to a fourteenth embodiment. FIG. 26 shows the cross section of the anode-side separator 310 in the Y direction at the position of the second groove 315 (FIGS. 4 and 6). The arrows in FIG. 26 indicate the flow direction of hydrogen in the flow path space AS for the fuel gas formed between the second groove 315 (deeper groove section 313 and shallower groove section 314) of the anode-side separator 310 and (the anode diffusion layer 216 of) the power generation layer 200. In the illustrated example of FIG. 26, the upper side of the drawing corresponds to the upstream side and the lower side of the drawing corresponds to the downstream side. The fuel cell 100 of the fourteenth embodiment differs in the structure of the anode-side separator 310 from the fuel cell 100 of the first embodiment, but otherwise has the similar structure to that of the fuel cell 100 of the first embodiment.

As shown in FIG. 26, according to the fourteenth embodiment, like the first embodiment, each of the second grooves 315 in the anode-side separator 310 has a plurality of shallower groove sections 314. The structure of the fourteenth embodiment differs from the structure of the first embodiment in the way that a boundary wall BW between the deeper groove section 313 and the shallower groove section 314 that is adjacent to the deeper groove section 313 on the downstream side of the flow of hydrogen in the flow path space AS for the fuel gas is inclined, such that the position farther from the second surface (surface opposed to the power generation layer 200) is located on the lower stream side. In other words, in the structure of the eleventh embodiment, the boundary wall BW is inclined at a predetermined angle θD to the stacking direction.

In the structure of the fourteenth embodiment, the boundary wall BW between the deeper groove section 313 and the shallower groove section 314 on the downstream side that is adjacent to the deeper groove section 313 is inclined, such that the position farther from the second surface is located on the lower stream side. This structure accelerates accumulation of water in a portion Py on the boundary wall BW. The structure of the fourteenth embodiment can thus prevent the fuel cell 100 from being dried up during high-temperature operation, thereby minimizing the reduction of the power generation efficiency and deterioration of the durability of the electrolyte membrane 212.

In the fourteenth embodiment, the hydrophilicity of the surface of the deeper groove sections 313 in the anode-side separator 310 opposed to the flow path space AS for the fuel gas may be enhanced to accelerate accumulation of water in the portion Py on the boundary wall BW. The hydrophilicity may be enhanced by hydrophilic treatment or by roughening the surface of the anode-side separator 310.

O. Fifteenth Embodiment

Figure 27:
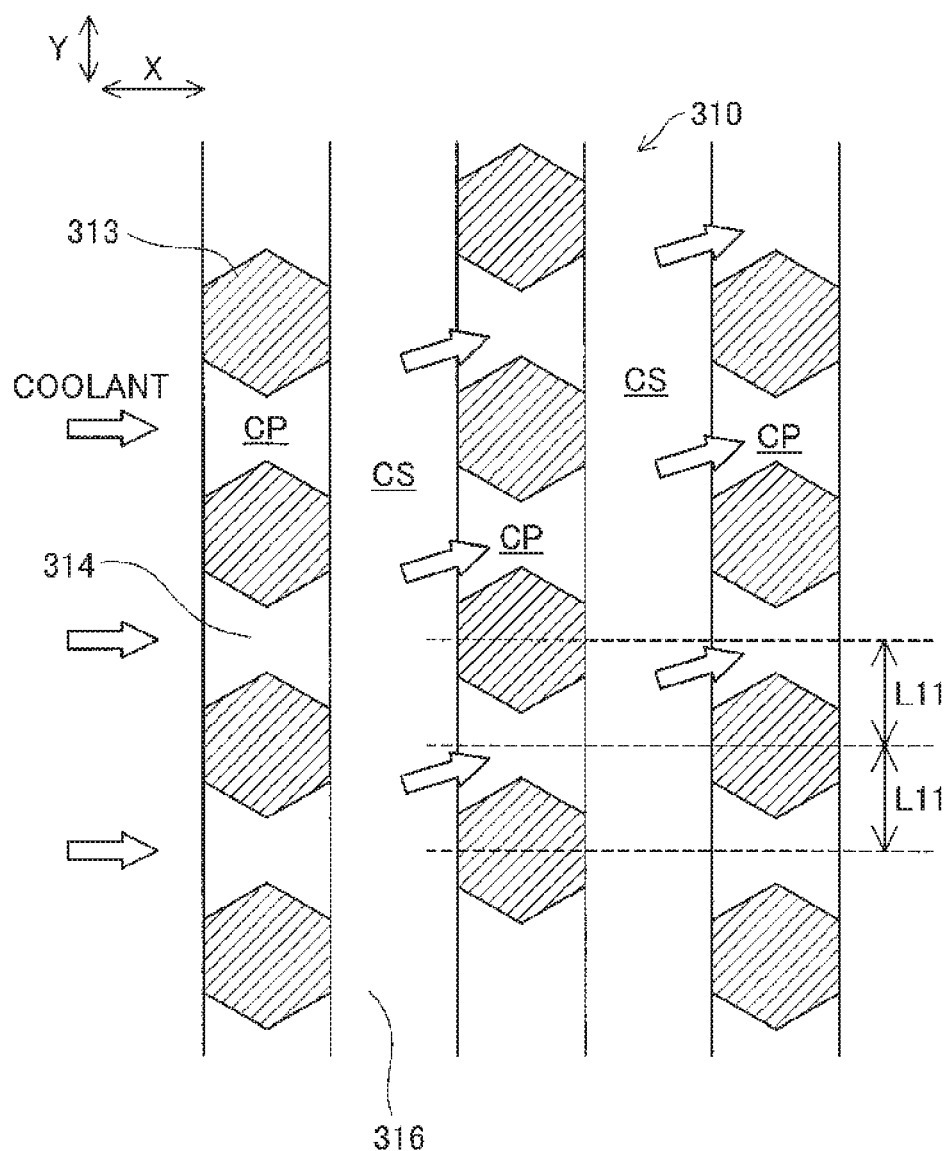
FIG. 27 is an explanatory diagram illustrating the structure of an anode-side separator 310 in a fuel cell 100 according to a fifteenth embodiment.

FIG. 27 is an explanatory diagram illustrating the structure of an anode-side separator 310 in a fuel cell 100 according to a fifteenth embodiment. FIG. 27 shows the planar structure of part of the first surface of the anode-side separator 310 (surface opposed to the cathode-side separator 320).

The fuel cell 100 of the fifteenth embodiment differs from the fuel cell 100 of the first embodiment in the shape of the boundary wall between the deeper groove section 313 and the shallower groove section 314 and the arrangement of the shallower groove sections 314 in the anode-side separator 310, but otherwise has the similar structure to that of the fuel cell 100 of the first embodiment. In the anode-side separator 310 of the fifteenth embodiment, the deeper groove section 313 has a planar shape of approximate regular hexagon. The boundary wall between the deeper groove section 313 and the shallower groove section 314 is accordingly formed to have parts inclined at predetermined angles to the flow direction of the coolant in the communication flow channel CP. In the corrugated portion WSP of the anode-side separator 310, the shallower groove sections 314 are arranged in zigzag. In other words, a distance L11 in the Y direction between the shallower groove sections 314 of two adjacent second grooves 315 is substantially half the pitch (2×L11) of the shallower groove sections 314 in each of the second grooves 315.

In the fuel cell 100 of the fifteenth embodiment, the boundary wall between the deeper groove section 313 and the shallower groove section 314 has inclined parts, so that the flow direction of the coolant is made partly oblique along the inclined parts of the boundary walls between the deeper groove sections 313 and the shallower groove sections 314 in the communication flow channel CP formed at the positions of the shallower groove sections 314. The zigzag arrangement of the shallower groove sections 314 facilitate the coolant in the oblique flow direction to flow into the communication flow channel CP formed at the position of the obliquely-located shallower groove section 314. The structure of the fuel cell 100 of the fifteenth embodiment accordingly allows more flexible arrangement of the flow path for the coolant. For example, in the fuel cell 100, the insufficient flow rate of the coolant or accumulation of the air may degrade the cooling performance in the upper area of each unit cell 140 in the direction of gravity. Using the anode-side separator 310 of this embodiment can, however, guide the flow of the coolant to the obliquely upward direction, thus minimizing the degradation of the cooling performance over the whole area of the unit cell 140.

Figure 28:
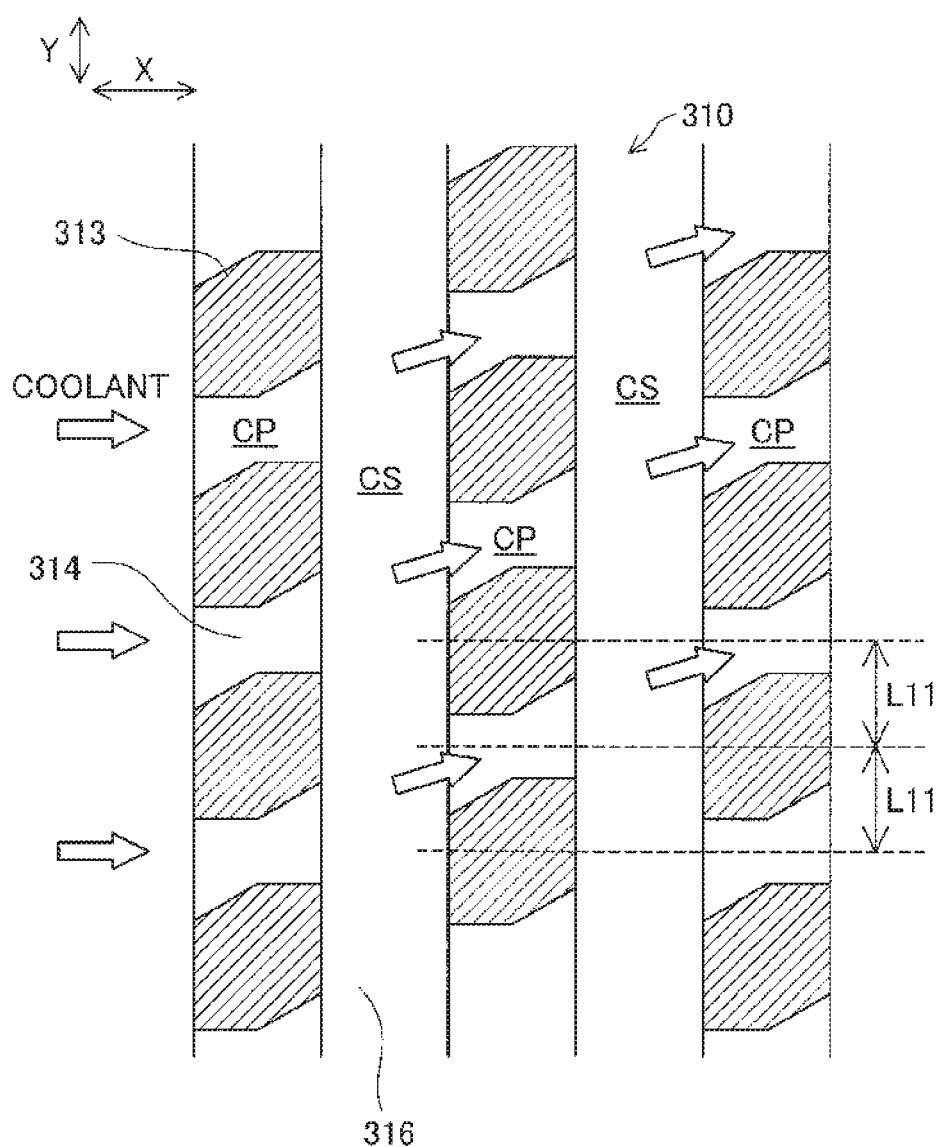
FIG. 28 is an explanatory diagram illustrating the structure of an anode-side separator 310 in a fuel cell 100 according to one modification of the fifteenth embodiment.

FIG. 28 is an explanatory diagram illustrating the structure of an anode-side separator 310 in a fuel cell 100 according to one modification of the fifteenth embodiment. In the modification of the fifteenth embodiment shown in FIG. 28, like the illustrated example of FIG. 27, the shallower groove sections 314 are arranged in zigzag. In the modification of the fifteenth embodiment shown in FIG. 28, however, unlike the illustrated example of FIG. 27, the deeper groove section 313 has a planar shape of rectangle without one set of diagonal corners. Similarly the boundary wall between the deeper groove section 313 and the shallower groove section 314 is formed to have parts inclined at predetermined angles to the flow direction of the coolant in the communication flow channel CP. The structure of the modification of the fifteenth embodiment shown in FIG. 28 thus also allows flexible arrangement of the flow path for the coolant.

In the illustrated examples of FIGS. 27 and 28, the shallower groove sections 314 are arranged in zigzag. Even when the shallower groove sections 314 are not arranged in zigzag, however, forming the boundary wall between the deeper groove section 313 and the shallower groove section 314 to have parts inclined at predetermined angles to the flow direction of the coolant in the communication flow channel CP makes the oblique flow direction of the coolant and thereby allows more flexible arrangement of the flow path for the coolant. In the illustrated examples of FIGS. 27 and 28, the shallower groove sections 314 are arranged in zigzag. Even when the shallower groove sections 314 are not arranged in zigzag, however, arranging the shallower groove section 314 in each of the second grooves 315 at a position shifted in a predetermined direction by a predetermined distance from the position of the shallower groove section 314 in another adjacent second groove 315 also makes the oblique flow direction of the coolant and thereby allows more flexible arrangement of the flow path for the coolant.

P. Sixteenth Embodiment

Figure 29:
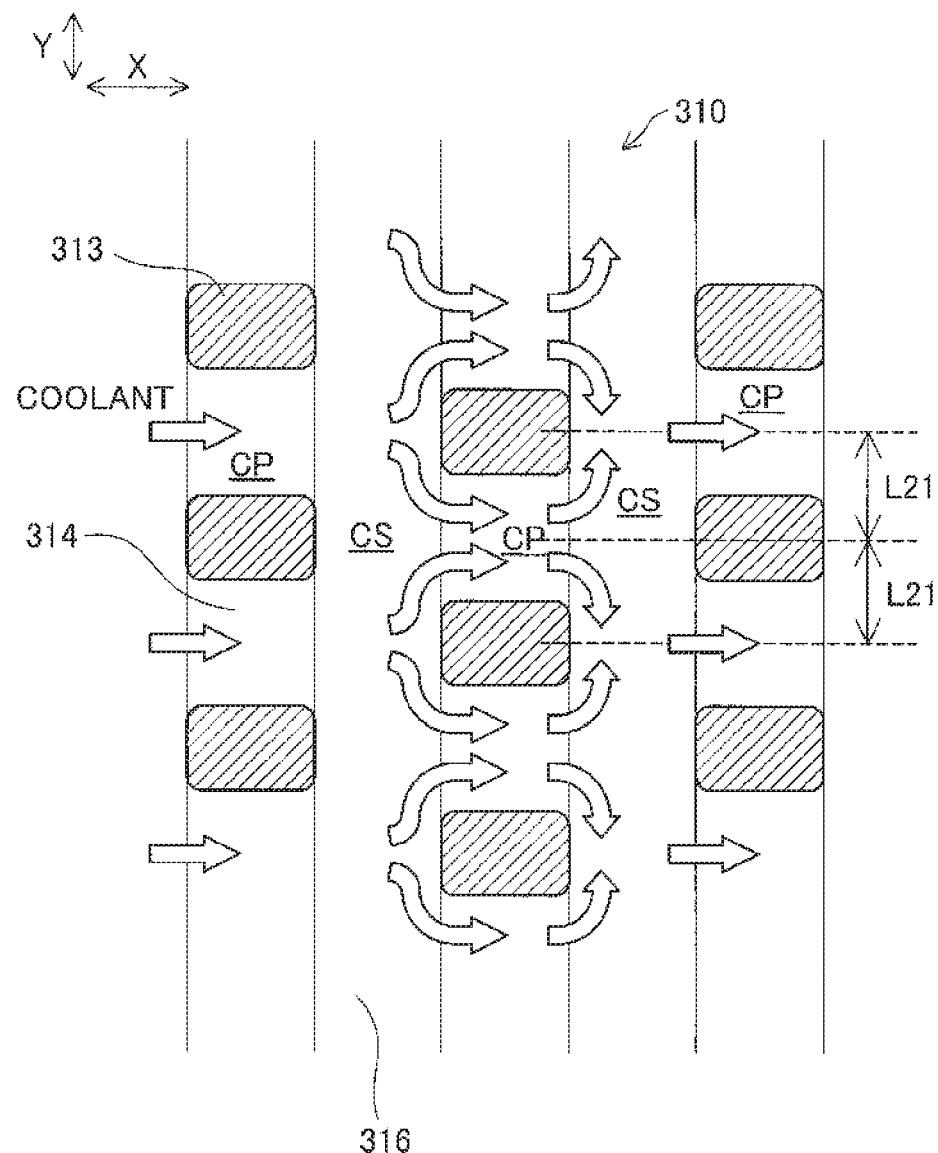
FIG. 29 is an explanatory diagram illustrating the structure of an anode-side separator 310 in a fuel cell 100 according to a sixteenth embodiment.

FIG. 29 is an explanatory diagram illustrating the structure of an anode-side separator 310 in a fuel cell 100 according to a sixteenth embodiment. FIG. 29 shows the planar structure of part of the first surface of the anode-side separator 310 (surface opposed to the cathode-side separator 320).

The fuel cell 100 of the sixteenth embodiment differs from the fuel cell 100 of the first embodiment in the arrangement of the shallower groove sections 314 in the anode-side separator 310, but otherwise has the similar structure to that of the fuel cell 100 of the first embodiment. In the anode-side separator 310 of the sixteenth embodiment, the shallower groove sections 314 are arranged in zigzag. In other words, a distance L21 in the Y direction between the shallower groove sections 314 of two adjacent second grooves 315 is substantially half the pitch (2×L21) of the shallower groove sections 314 in each of the second grooves 315.

In the fuel cell 100 of the sixteenth embodiment, the zigzag arrangement of the shallower groove sections 314 causes the coolant passing through the communication flow channel CP formed at the position of the shallower groove section 314 not to directly move downstream but to flow through the flow path space CS for the coolant into the communication flow channel CP formed at the position of the obliquely-located shallower groove section 314 on the downstream side. The structure of the fuel cell 100 according to the sixteenth embodiment thus prevents stagnation of the coolant in the flow path space CS for the coolant, thereby minimizing the degradation of the cooling performance of the fuel cell 100.

Figure 30:
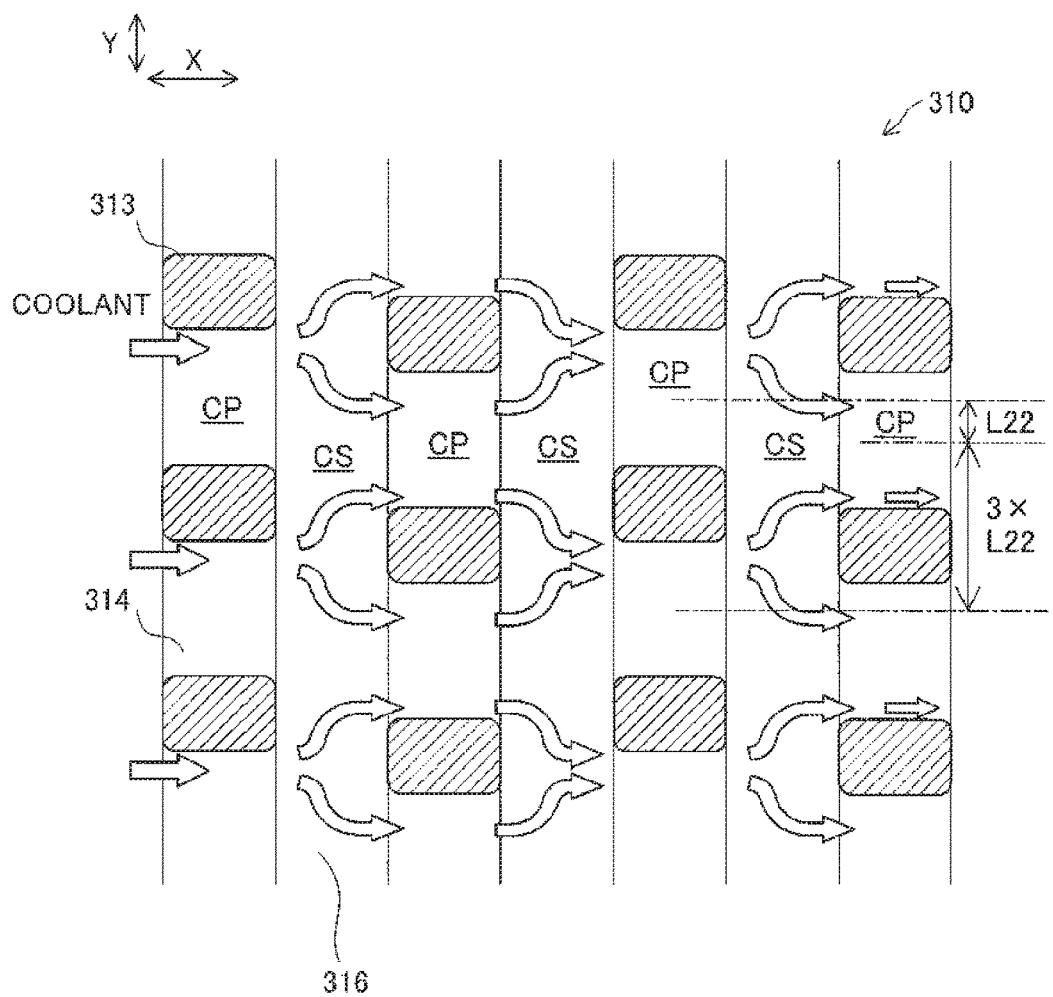
FIG. 30 is an explanatory diagram illustrating the structure of an anode-side separator 310 in a fuel cell 100 according to one modification of the sixteenth embodiment.

In the illustrated example of FIG. 29, the shallower groove sections 314 are arranged in zigzag. Even when the shallower groove sections 314 are not arranged in zigzag, however, arranging the shallower groove section 314 in each of the second grooves 315 at a position shifted in a predetermined direction by a predetermined distance from the position of the shallower groove section 314 in another adjacent second groove 315 prevents stagnation of the coolant in the flow path space CS for the coolant and thereby minimizes the degradation of the cooling performance of the fuel cell 100. FIG. 30 is an explanatory diagram illustrating the structure of an anode-side separator 310 in a fuel cell 100 according to one modification of the sixteenth embodiment. In the illustrated example of FIG. 30, a distance L22 in the Y direction between the shallower groove sections 314 of two adjacent second grooves 315 is substantially one quarter the pitch (4×L22) of the shallower groove sections 314 in each of the second grooves 315. The structure of the fuel cell 100 in the modification of the sixteenth embodiment shown in FIG. 30 also prevents stagnation of the coolant in the flow path space CS for the coolant and thereby minimizes the degradation of the cooling performance of the fuel cell 100.

Q. Seventeenth Embodiment

Figure 31:
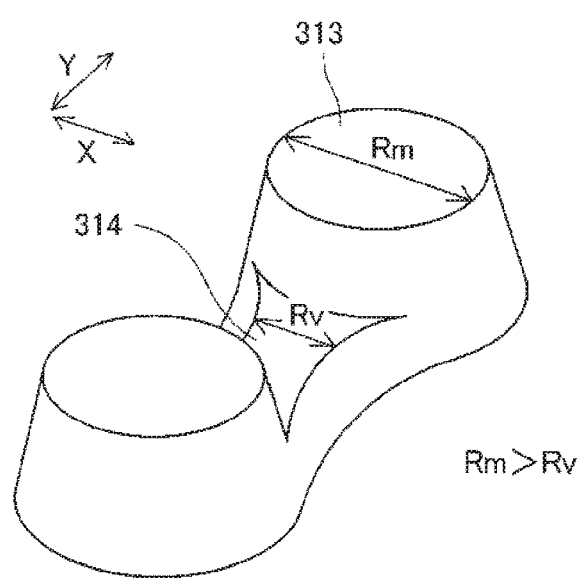
FIG. 31 is an explanatory diagram illustrating the structure of an anode-side separator 310 in a fuel cell 100 according to a seventeenth embodiment.

FIG. 31 is an explanatory diagram illustrating the structure of an anode-side separator 310 in a fuel cell 100 according to a seventeenth embodiment. FIG. 31 shows the enlarged illustration of the second groove 315 (deeper groove section 313 and shallower groove section 314) in the corrugated portion WSP of the anode-side separator 310. The fuel cell 100 of the seventeenth embodiment differs in the structure of the deeper groove section 313 and the shallower groove section 314 from the fuel cell 100 of the first embodiment, but otherwise has the similar structure to that of the fuel cell 100 of the first embodiment.

As shown in FIG. 31, according to the seventeenth embodiment, the deeper groove section 313 has a diameter Rm that is greater than a diameter Rv of the shallower groove section 314. This structure of the seventeenth embodiment reduces the volume of a specific part adjacent to the deeper groove section 313 in the flow path space CS for the coolant formed at the position of the first groove 316 in the anode-side separator 310 (FIG. 6), thus effectively preventing stagnation of the coolant in the flow path space CS for the coolant and minimizing the degradation of the cooling performance of the fuel cell 100. Additionally, in the structure of the seventeenth embodiment, the greater diameter Rm of the deeper groove section 313 of the anode-side separator 310 that is in contact with the cathode-side separator 320 reduces the load stacked per unit area on the surface of the deeper groove section 313. This also prevents the potential damage of the electrodes due to the concentration of the load at a specific position of the power generation layer 200 opposed to the deeper groove section 313, as well as the inequality of the power generation distribution due to the unequal load distribution on the electrode surface.

Figure 32:
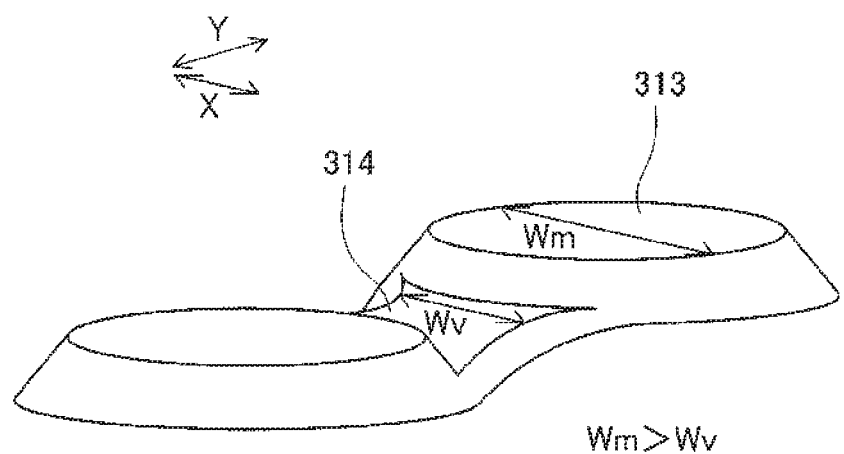
FIG. 32 is an explanatory diagram illustrating the structure of an anode-side separator 310 in a fuel cell 100 according to one modification of the seventeenth embodiment.

FIG. 32 is an explanatory diagram illustrating the structure of an anode-side separator 310 in a fuel cell 100 according to one modification of the seventeenth embodiment. In the modification of the seventeenth embodiment shown in FIG. 32, the deeper groove section 313 has the same width in the Y direction (direction along which the second grooves 315 and the first grooves 316 are extended) as that of the first embodiment but has an enlarged width Wm in the X direction (flow direction of the coolant in the communication flow channel CP) to be greater than a width Wv of the shallower groove section 314. The modification of the seventeenth embodiment shown in FIG. 32 effectively reduces the volume of a specific part adjacent to the deeper groove section 313 in the flow path space CS for the coolant formed at the position of the first groove 316. This prevents stagnation of the coolant in the flow path space CS for the coolant and minimizes the degradation of the cooling performance of the fuel cell 100. Additionally this reduces the load stacked per unit area on the surface of the deeper groove section 313 and prevents the potential damage of the electrodes and the inequality of the power generation distribution.

R. Eighteenth Embodiment

Figure 33:
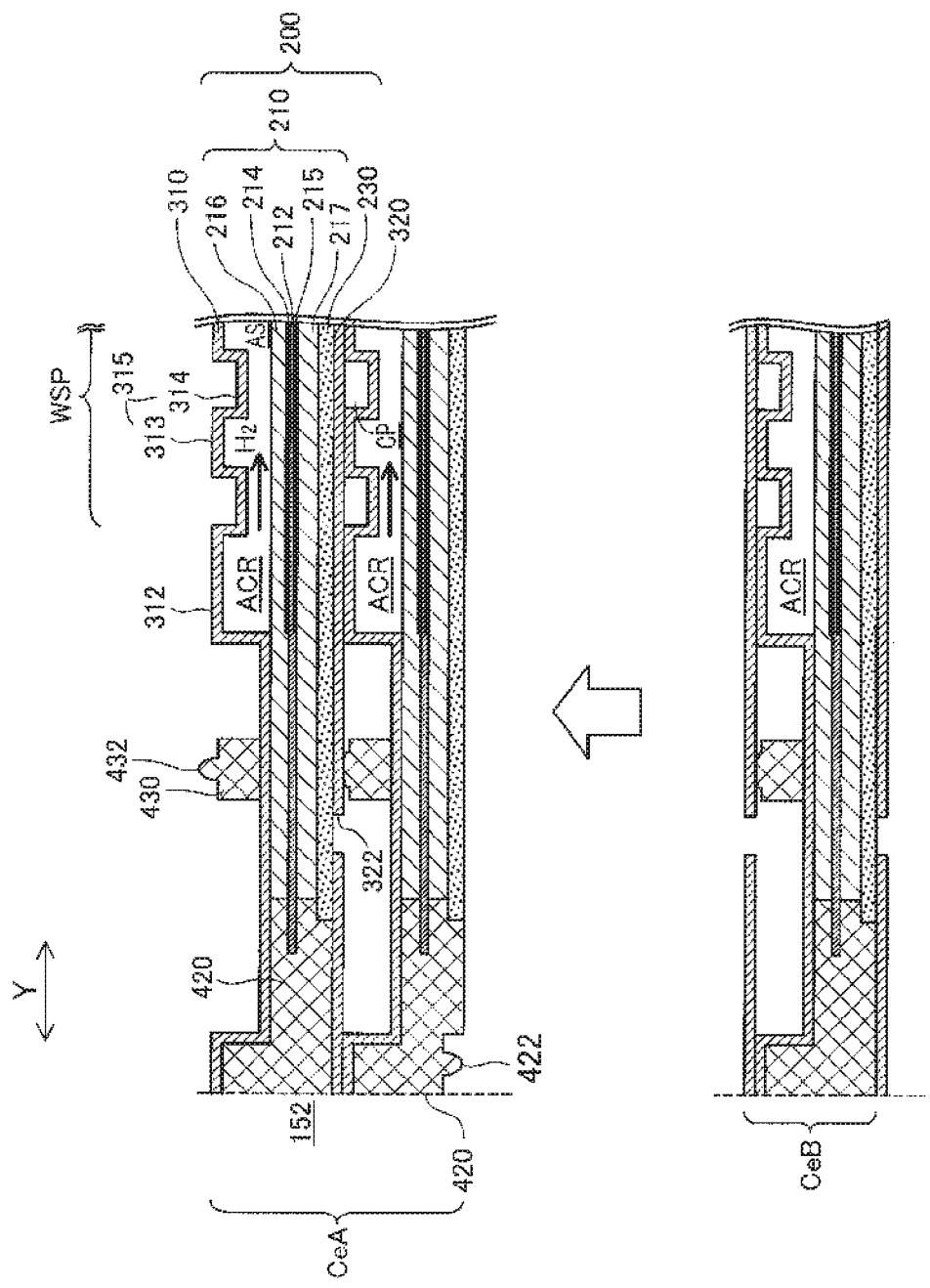
FIG. 33 is an explanatory diagram illustrating the structure of a fuel cell 100 according to an eighteenth embodiment.
Figure 34:
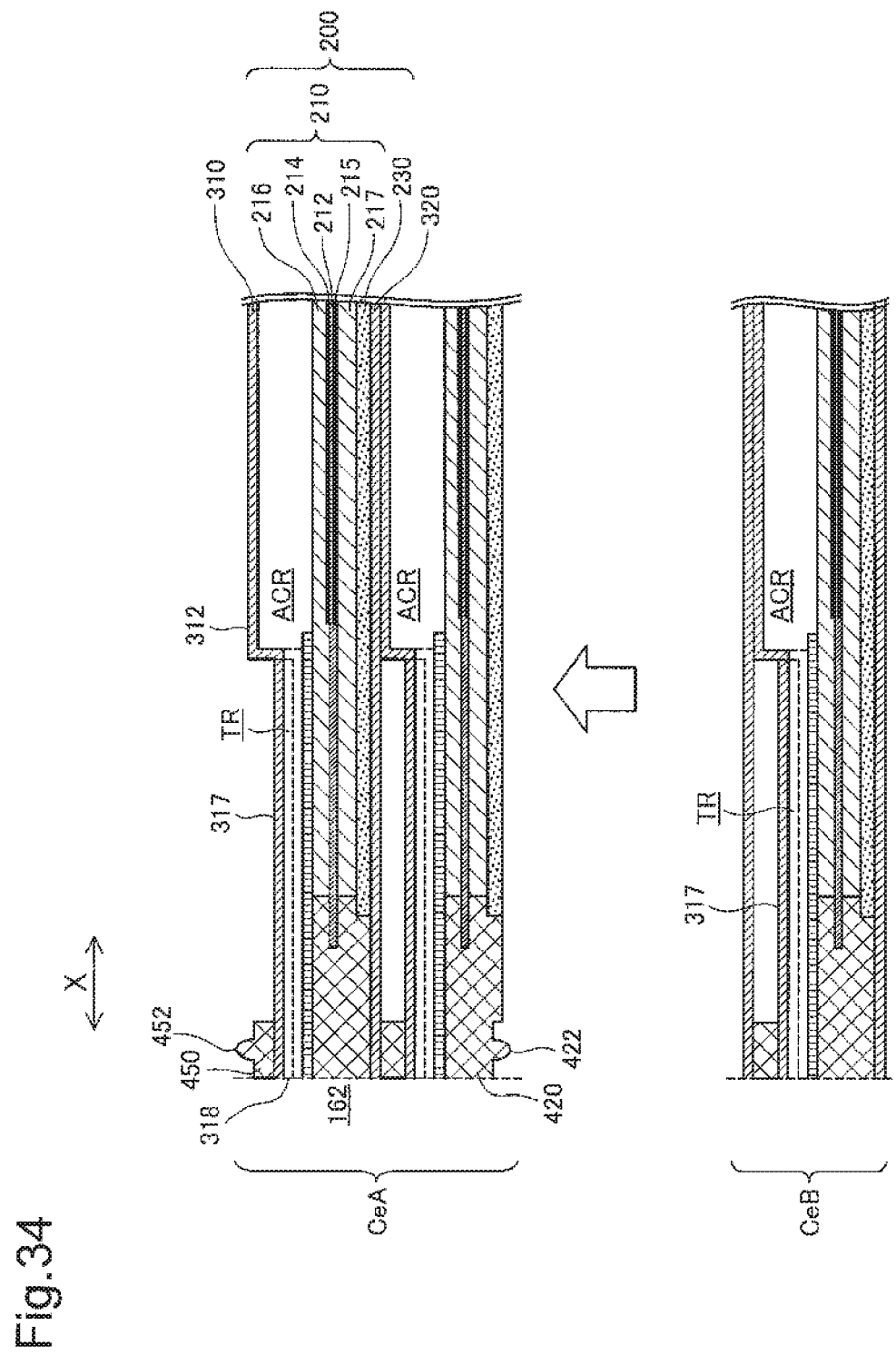
FIG. 34 is an explanatory diagram illustrating the structure of a fuel cell 100 according to an eighteenth embodiment.

FIGS. 33 to 35 are explanatory diagrams illustrating the structure of a fuel cell 100 according to an eighteenth embodiment. The fuel cell 100 of the eighteenth embodiment differs in the structure of seals from the fuel cell 100 of the first embodiment, but otherwise has the similar structure to that of the fuel cell 100 of the first embodiment.

In order to improve the reparability, a manufacturing method of alternately stacking cells with seals and cells without seals is adopted for the fuel cell 100 of the eighteenth embodiment. When this manufacturing method of alternately stacking the cells with seals and the cells without seals is adopted for the fuel cell 100 of the first embodiment, the sufficient sealing should be achieved by pressing the edges 452 and 442 of the seals 450 and 440 provided on the opposed cathode-side separator 320 against the surface of the anode-side separator 310 with the third grooves 317 for forming the tunnel flow paths TR (FIGS. 4 and 5). It is, however, difficult to ensure the sufficient sealing by pressing the seals against the surface of the anode-side separator 310 of the concavo-convex shape.

According to the eighteenth embodiment, as shown in FIGS. 33 to 35, a cell CeA is formed by stacking one anode-side separator 310, one power generation layer 200, one cathode-side separator 320, another anode-side separator 310 and another power generation layer 200. A cell CeB is formed by stacking one cathode-side separator 320, one anode-side separator 310, one power generation layer 200 and another anode-side separator 310. The fuel cell 100 is manufactured by alternately stacking the cells CeA and the cells CeB. As shown in FIGS. 33 to 35, the cell CeA has seals 450 and 420 formed to ensure the sufficient sealing against the opposed cell CeB, while the cell CeB has no seals to ensure the sealing against the opposed cell CeA.

In the structure of the eighteenth embodiment, the seals 450, 430 and 420 provided in the cell CeA are arranged to have their edges 452, 432 and 422 pressed against the flat surface of the cathode-side separator 320 in the opposed cell CeB, thus forming effective seal lines. The seals are not pressed against the surface of the concave-convex shape. As shown in FIG. 35, the seal 450 located between the cathode-side separator 320 and the third grooves 317 of the anode-side separator 310 is formed by filling in the cell CeA and the cell CeB, thus forming an effective seal line at this location. The structure of the eighteenth embodiment thus ensures the sufficient sealing property and adopts the manufacturing method of alternately stacking the cells with seals and the cells without seals to manufacture the fuel cell 100, thus improving the repairability of the fuel cell 100.

The eighteenth embodiment adopts the manufacturing method of stacking the cells CeA including two power generation layers 200 and the cells CeB including one power generation layer 200 to manufacture the fuel cell 100. Any manufacturing method of stacking cells CeA including an even number of power generation layers 200 and cells CeB including an odd number of power generation layers 200 may be adopted to manufacture the fuel cell 100. Like the eighteenth embodiment, this manufacturing method also ensures the sufficient sealing property and improves the repairability of the fuel cell 100.

S. Nineteenth Embodiment

Figure 36:
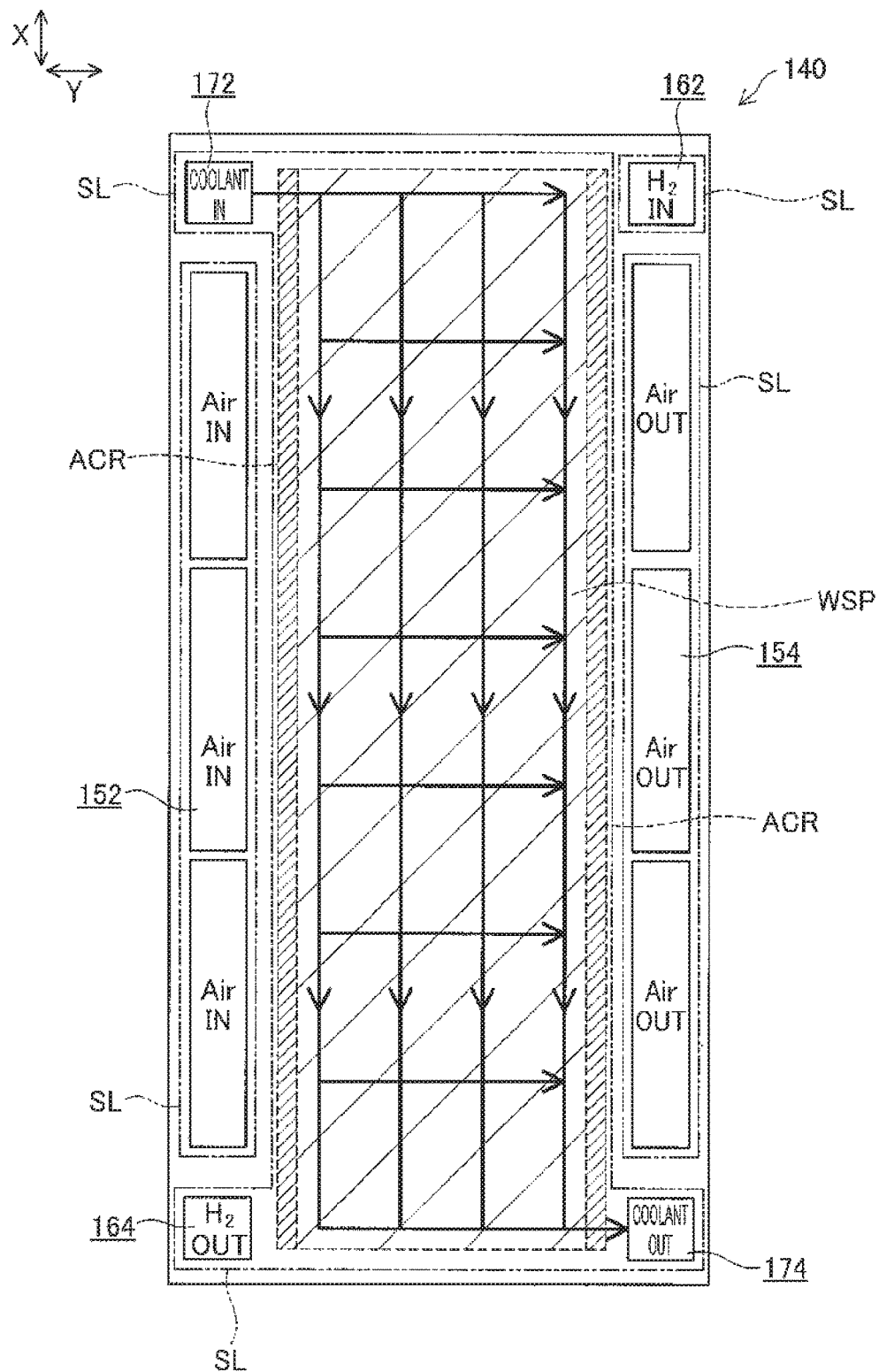
FIG. 36 is an explanatory diagram illustrating the planar structure of a fuel cell 100 according to a nineteenth embodiment.

FIG. 36 is an explanatory diagram illustrating the planar structure of a fuel cell 100 according to a nineteenth embodiment. The fuel cell 100 of the nineteenth embodiment differs in the arrangement of the respective manifolds from the fuel cell 100 of the first embodiment, but otherwise has the similar structure to that of the fuel cell 100 of the first embodiment.

As shown in FIG. 36, in the fuel cell 100 of the nineteenth embodiment, all manifolds are arranged in proximity to two outer circumferential sides (long sides in the illustrated example of FIG. 36) that are opposed to each other across the corrugated portion WSP of the anode-side separator 310 in each unit cell 140, while no manifolds are arranged in proximity to the other two outer circumferential sides (short sides in the illustrated example of FIG. 36). In other words, the fuel cell 100 of the nineteenth embodiment has two-side arrangement of the manifolds. Such two-side arrangement of the manifolds is not readily adoptable for the conventional structure of the fuel cell 100 where the directions of the flow paths formed on the respective sides of the anode-side separator 310 are fixed to the parallel directions, but is adoptable for this embodiment where the anode-side separator 310 forms the flow path that allows the coolant to flow both horizontally and vertically (i.e., the flow path spaces Cs for the coolant and the communication flow channels CP (FIG. 6)). The fuel cell 100 of this embodiment adopting the two-side arrangement of the manifolds improves the rate of utilization of the electrodes and enhances the body power density and the mass output density, compared with the four-side arrangement of the manifolds.

T. Modifications

The invention is not limited to the above embodiments or examples, but a multiplicity of variations and modifications may be made to the embodiments without departing from the scope of the invention. Some examples of possible modifications are given below.

T1. Modification 1

The configuration of the fuel cell system 10 in any of the above embodiments is only illustrative and may be modified or changed in various ways. For example, in the respective embodiments described above, the membrane electrode assembly 210 includes the anode diffusion layer 216 and the cathode diffusion layer 217. The membrane electrode assembly 210 may, however, be structured without at least one of the anode diffusion layer 216 and the cathode diffusion layer 217.

The materials and the manufacturing methods of the respective layers in the fuel cell 100 are specified in the respective embodiments described above. These materials and manufacturing methods are, however, not restrictive but may be replaced by any of other various adequate methods and manufacturing methods. For example, in the above embodiments, the anode-side separator 310 is manufactured by press-forming a metal plate. The anode-side separator 310 may, however, be manufactured by cutting out a metal plate or a carbon resin plate, by etching a metal plate, or by injection molding carbon resin material. Similarly the cathode-side separator 320 may be manufactured by cutting out a carbon resin plate or by injection molding carbon resin material.

The fuel cell 100 is a polymer electrolyte fuel cell in the respective embodiments described above. The present invention is, however, also applicable to other types of fuel cells (e.g., direct methanol fuel cell and phosphoric acid fuel cell).

T2. Modification 2

In the respective embodiments described above, the anode-side separator 310 is formed to have the corrugated portion WSP of the corrugated cross section, while the cathode-side separator 320 is formed in a flat plate-like shape. On the contrary, the cathode-side separator 320 may be formed to have a corrugated portion WSP of a corrugated cross section, while the anode-side separator 310 may be formed in a flat plate-like shape. In this modification, the power generation layer 200 does not include the cathode-side porous flow path layer 230 but has a porous flow path layer on the anode-side. A flow path for the oxidizing gas is formed between the cathode-side separator 320 and the power generation layer 200, and a flow path for the coolant is formed between the cathode-side separator 320 and the anode-side separator 310.

According to another modification, both the anode-side separator 310 and the cathode-side separator 320 may be formed to have corrugated portions WSP of corrugated cross sections. In this modification, the power generation layer 200 does not include any porous flow path layer. A flow path for the fuel gas is formed between the anode-side separator 310 and the power generation layer 200, and a flow path for the oxidizing gas is formed between the cathode-side separator 320 and the power generation layer 200. A flow path for the coolant is formed between the cathode-side separator 320 and the anode-side separator 310. In this modification, the anode-side separator 310 and the cathode-side separator 320 are in contact with each other at the respective second grooves 315 of their corrugated portions WSP. In this modification, the shallower groove sections 314 of each second groove 315 in the corrugated portion WSP may be provided in only either one of or both of the anode-side separator 310 and the cathode-side separator 320.

T3. Modification 3

In the respective embodiments described above, each of the second grooves 315 has a plurality of shallower groove sections 314. Each of the second grooves 315 may be, however, structured to have at least one shallower groove section 314, which does not restrict the flow direction of the coolant to the direction parallel to the flow direction of the fuel gas but enables the flow direction of the coolant to be set freely. The configuration pattern of the shallower groove sections 314 on the plane of the corrugated portion WSP in any of the above embodiments is only illustrative and may be modified or changed arbitrarily.

In the respective embodiments described above, the second grooves 315 and the first grooves 316 in the anode-side separator 310 have the planar shapes extended in a fixed direction (direction parallel to the short sides of the unit cell 140 in the illustrated example of FIG. 2). The second grooves 315 and the first grooves 316 may have any arbitrary planar shapes according to the arrangement of the manifolds, as long as the second grooves 315 and the first grooves 316 are arranged alternately and repeatedly to form the corrugated cross section. For example, the second grooves 315 and the first grooves 316 may be formed in serpentine planar shapes.

T4. Modification 4

In the respective embodiments described above, a plurality of tunnel flow paths TR are formed side by side in proximity to the fuel gas supply manifold 162 and the fuel gas exhaust manifold 164 of the fuel cell 100 (FIG. 5). Alternatively only one tunnel flow path TR may be formed in these locations.

T5. Modification 5

In the respective embodiments described above, the fourth grooves 312 are formed in the anode-side separator 310 to form the common rails ACR for the fuel gas, and the respective flow path spaces AS for the fuel gas are arranged to communicate with the common rails ACR for the fuel gas. Alternatively the respective flow path spaces AS for the fuel gas may be arranged to communicate with the fuel gas supply manifold 162 and the fuel gas exhaust manifold 164 without the common rails ACR for the fuel gas.

T6. Modification 6

In the seventh embodiment described above, the first surface of the corrugated portion WSP of the anode-side separator 310 is subjected to the film-coating treatment to enhance the corrosion resistance in the areas S1 of the first groove 316 adjacent to the shallower groove sections 314, the water repellent treatment to enhance the water repellency in the areas S1 of the first groove 316 adjacent to the shallower groove sections 314, and the hydrophilic treatment to enhance the hydrophilicity in the shallower groove sections 314. The first surface is, however, not required to be subjected to all these three treatments but may be subjected to at least one of these treatments to have the advantageous effects described above corresponding to the treatment.

What is claimed is:

1. A separator for a fuel cell, comprising:
a corrugated portion formed to have a corrugated cross section where a first groove that is concave to a first surface to form a flow path for a first fluid on the first surface and a second groove that is concave to a second surface opposite to the first surface to form a flow path for a second fluid on the second surface are arranged alternately and repeatedly, wherein each of the second grooves has at least one shallower groove section formed to have less depth from the second surface than a depth of a remaining groove section and provided to form a communication flow channel on the first surface side, which is arranged to communicate between two flow path spaces for the first fluid that are adjacent to each other across the shallower groove section, the shallower groove section included in each of the second grooves is formed at a position aligned with the shallower groove section included in another adjacent second groove, and the shallower groove section is formed to have a cross section with a smaller curvature radius or a smaller draft angle on a downstream side of flow of the first fluid in the communication flow channel than a curvature radius or a draft angle on an upstream side.

2. The separator according to claim 1, wherein a combination of the first fluid and the second fluid is a combination of two out of a fuel gas, an oxidizing gas and a coolant.

3. The separator according to claim 1, wherein the first fluid is a coolant.

4. The separator according to claim 1,
the separator being formed in an approximately rectangular planar shape, wherein
a first opening for defining a manifold for the first fluid and a second opening for defining a manifold for the second fluid are formed in proximity to two outer circumferential sides that are opposed to each other across the corrugated portion of the separator.

5. The separator according to claim 3, wherein
the first surface of the corrugated portion is subjected to at least one of film-coating treatment to enhance corrosion resistance in a specific area of the first groove adjacent to the shallower groove section, water repellent treatment to enhance water repellency in the specific area of the first groove adjacent to the shallower groove section, and hydrophilic treatment to enhance hydrophilicity in the shallower groove section.

6. A fuel cell, comprising:
a power generation layer including an electrolyte membrane, an anode formed on one side of the electrolyte membrane and a cathode formed on another side of the electrolyte membrane opposite the one side; and
the separators according to claim 1 that are placed across the power generation layer.

7. The fuel cell according to claim 6, further comprising:
a detector configured to determine that a pressure loss in the flow path for the first fluid is less than a predetermined threshold value and thereby detect an abnormality in the flow path for the first fluid, wherein
the first fluid is a coolant.

8. A method of manufacturing a fuel cell, the fuel cell comprising: a power generation layer including an electrolyte membrane, an anode formed on one side of the electrolyte membrane and a cathode formed on another side of the electrolyte membrane opposite the one side; and the separators according to claim 3 that are placed across the power generation layer, the method comprising the steps of:
exposing the first surface of the first groove in the separator to a coolant; and
stacking the separator and the power generation layer, after the exposing step.

9. A fuel cell, comprising:
a plurality of power generation layers, each including an electrolyte membrane, an anode formed on one side of the electrolyte membrane and a cathode formed on another side of the electrolyte membrane opposite the one side;
the separator according to claim 1 that is located on an anode side of each of the power generation layers; and
a second separator in a flat plate-like shape that is located on a cathode side of each of the power generation layers.

10. The fuel cell according to claim 9, wherein
the separator is manufactured by press-forming a plate-like member, and
the second separator is formed to have less thickness than a thickness of the plate-like member used for manufacturing the separator.

11. The fuel cell according to claim 9, further comprising:
a seal formed to seal between the separator and the second separator opposed to the separator without intervention of the power generation layer at least at a position where the separator has concavity and convexity and arranged to adhere to the separator and to be pressed against the second separator, so as to ensure sealing.

12. The fuel cell according to claim 11,
the fuel cell being manufactured by alternately stacking a first cell including an even number of the power generation layers and a second cell including an odd number of the power generation layers, wherein
the seal is provided on the first cell but is not provided on the second cell, prior to stacking of the first cell and the second cell to manufacture the fuel cell.

13. A fuel cell, comprising:
a plurality of power generation layers, each including an electrolyte membrane, an anode formed on one side of the electrolyte membrane and a cathode formed on another side of the electrolyte membrane opposite the one side;
the separator according to claim 2 that is located on an anode side of each of the power generation layers;
a second separator in a flat plate-like shape that is located on a cathode side of each of the power generation layers;
a first seal formed to seal between the separator and the second separator opposed to the separator without intervention of the power generation layer; and
a second seal formed to seal between the anode side and the cathode side at an edge of each of the power generation layers, wherein
at least one of the separator and the power generation layer has a tunnel flow path-forming member to form a tunnel flow path that runs under a seal line formed by the first seal and communicates between a flow path space for the second fluid and a flow path space opposed to the flow path space for the second fluid across the first seal, and
the tunnel flow path-forming member is located inside of the second seal along a planar direction of the power generation layer.

14. The fuel cell according to claim 13, wherein
the tunnel flow path-forming member includes a third groove that is formed in the separator and is concave to the second surface, and
the third groove is formed to have less depth than a depth of a deeper groove section included in the second groove.

15. The fuel cell according to claim 13, wherein
the tunnel flow path-forming member includes a thin-walled part that has a surface of the power generation layer opposed to the separator and recessed from a surface of a remaining part of the power generation layer.

16. The fuel cell according to claim 13, wherein
the separator has a plurality of the tunnel flow path-forming members, and
the plurality of the tunnel flow path-forming members are arranged, such that the tunnel flow path-forming member located at a lowermost position in a direction of gravity in use of the fuel cell is extended to a location nearest to the flow path space for the second fluid.

* * * * *